United States Patent [19]
Nakamura et al.

[11] Patent Number: 5,857,092
[45] Date of Patent: Jan. 5, 1999

[54] INTERFACE APPARATUS FOR SDH/SONET INTERCONNECTION

[75] Inventors: Yoshinori Nakamura; Tatsuya Oku; Miki Hagino; Nobuo Iguchi; Hiroaki Mori, all of Osaka; Yuuki Tsuji, Yokaichi, all of Japan

[73] Assignee: Fujitsu Limited, Kanagawa, Japan

[21] Appl. No.: 634,430

[22] Filed: Apr. 18, 1996

[30] Foreign Application Priority Data

Sep. 26, 1995 [JP] Japan .................................. 7-248188

[51] Int. Cl.⁶ ...................................................... G06F 15/16
[52] U.S. Cl. ........................................................... 395/500
[58] Field of Search .................................. 395/500, 309; 370/466, 545, 509, 514

[56] References Cited

U.S. PATENT DOCUMENTS

| | | | |
|---|---|---|---|
| 5,189,410 | 2/1993 | Kosugi et al. | 340/825.14 |
| 5,414,707 | 5/1995 | Johnston et al. | 370/79 |
| 5,526,349 | 6/1996 | Diaz et al. | 370/58.1 |
| 5,568,486 | 10/1996 | Huscroft et al. | 370/94.2 |
| 5,623,357 | 4/1997 | Kight et al. | 395/135 |

FOREIGN PATENT DOCUMENTS

| | | |
|---|---|---|
| 1109883 | 4/1989 | Japan . |
| 1251285 | 10/1989 | Japan . |
| 4369058 | 12/1992 | Japan . |

*Primary Examiner*—Kevin J. Teska
*Assistant Examiner*—Ayni Mohamed
*Attorney, Agent, or Firm*—Helfgott & Karas, P.C.

[57] ABSTRACT

An interface apparatus for SDH/SONET interconnection includes a transmission interface section provided at a position where an apparatus of the SDH system and an apparatus of the SONET system face each other and adapted to transmit a signal toward an apparatus of a different system. The interface apparatus for SDH/SONET interconnection further includes a mode setting unit for setting a mode suitable for an apparatus of a counterpart system, a frame synchronization information inserting unit provided in the transmission interface section and adapted to insert frame synchronization information corresponding to the mode set by the mode setting unit, and an overhead information inserting unit provided in the transmission interface section and adapted to insert overhead information corresponding to the mode set by the mode setting unit. This structure makes is possible to easily interconnect apparatuses of different systems (apparatuses of the SDH system and the SONET system) so as to operate them.

49 Claims, 40 Drawing Sheets

FIG. 15

| SDH/SONET | Framing Byte | FORMAT OF FRAMING BYTES | A1(HEX) | A2(HEX) | NUMBER OF PROTECTION STAGES |
|---|---|---|---|---|---|
| STM-64 OF SDH STANDARD | A1, A2 | A1····A1(A1×192)····A2(A2×192) | F6 | 28 | 5 IN FORWARD, 2 IN BACKWARD |
| STS-192 OF SONET STANDARD | A1,$\overline{A1}$,A2,$\overline{A2}$ | A1$\overline{A1}$···A1$\overline{A1}$(A1$\overline{A1}$×96)A2$\overline{A2}$···A2$\overline{A2}$(A2$\overline{A2}$×96) | F6 | 28 | 5 IN FORWARD, 2 IN BACKWARD |

FIG. 23

| | LOWER THAN STM-64/STS-192 | STM-64/STS-192 OR HIGHER |
|---|---|---|
| FRAME PATTERN | SDH AND SONET ARE THE SAME | SDH AND SONET ARE DIFFERENT |
| SOH UNDEFINED BYTE | SDH AND SONET ARE DIFFERENT | SDH AND SONET ARE DIFFERENT |
| LOH UNDEFINED BYTE | SDH AND SONET ARE DIFFERENT | SDH AND SONET ARE DIFFERENT |
| SS BIT | SDH AND SONET ARE DIFFERENT | SDH AND SONET ARE DIFFERENT |

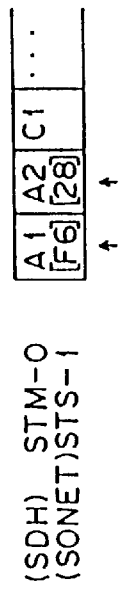
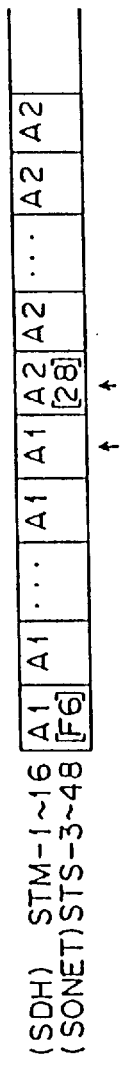
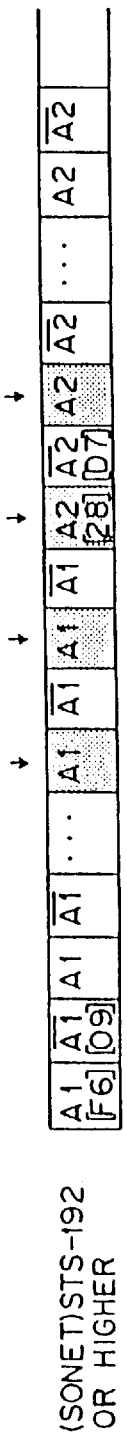
FIG. 24(a) (SDH) STM-0 (SONET) STS-1
FIG. 24(b) (SDH) STM-1~16 (SONET) STS-3~48
FIG. 24(c) (SDH) STM-64 OR HIGHER
FIG. 24(d) (SONET) STS-192 OR HIGHER

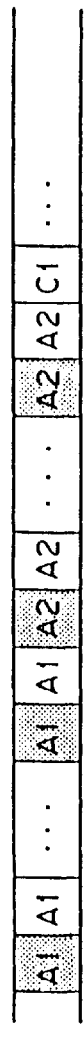
FIG. 28(a) STM-64 DATA OF SDH STANDARD
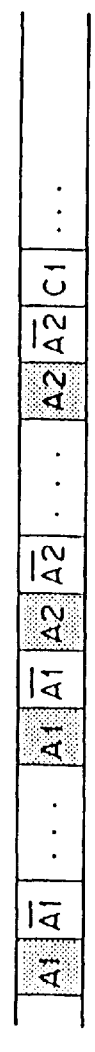
FIG. 28(b) STS-192 DATA OF SONET STANDARD
FIG. 28(c) DETECTION PULSES FROM FDET UNIT
FIG. 28(d) JUDGING BYTE POSITIONS

SDH : STM-1 FORMAT

SONET : STS-3c FORMAT

FIG. 37

| POSITION | SONET | | SDH |
|---|---|---|---|
| 1 ROW | FRAME SYNCHRONIZATION PATTERN<br><br>LOWER THAN STS-192: A1A1..A2A2..<br>STS-192 OR HIGHER: A1$\overline{A1}$..A2$\overline{A2}$.. | =<br><br>x | FRAME SYNCHRONIZATION PATTERN<br><br>LOWER THAN STM-64: A1A1..A2A2..<br>STM-64 HIGHER: A1A1..A2A2.. |
| 4 ROW | POINTER BYTE<br><br>· NDF FLAG :1001 or 0110<br>· SS BIT :00<br>· POINTER VALUE :0-782 | =<br>x<br>= | POINTER BYTE<br><br>· NDF FLAG :1001 or 0110<br>· SS BIT :10<br>· POINTER VALUE :0-782 |
| LOP DEFINITION | UNDEFINED BYTE: ALL "0" | x | UNDEFINED BYTE: ALL "1" |

INTERFACE APPARATUS FOR SDH/SONET INTERCONNECTION

BACKGROUND OF THE INVENTION

1) Field of the Invention

The present invention relates to an interface apparatus for SDH/SONET interconnection for mutually connecting apparatuses of two different systems SDH and SONET.

2) Description of the Related Art

Presently, user network interfaces for realizing a B-ISDN (Broadband aspects of Integrated Services Digital Network) are standardized in accordance with a unified standard called SDH (Synchronous Digital Hierarchy) so as to unify digital hierarchies existing in various countries throughout the world.

Under SDH, all information signals from different countries throughout the world, which have different transmission speeds (frame formats), are converted into information signals having a transmission speed of 150 Mbps (more specifically, 155.52 Mbps) series and are multiplexed, thereby making it possible to transmit freely among various countries information signals having different transmission speeds.

Before introduction of SDH as a worldwide standard, Japan employed a hierarchy based on a transmission speed of 1.5 Mbps (24×64 kbps) series in which 24 signals of 64 kbps each resulting from digital conversion of a voice signal of 4 kHz were multiplexed, while European countries employed a hierarchy based on a transmission speed of 2 Mbps (30×64 kbps) series in which 30 signals of 64 kbps were multiplexed.

In the U.S., SONET (Synchronous Optical Network) based on a transmission speed of 50 Mbps (13×60×64 kbps) series was independently used as a standard hierarchy.

Since the base transmission speeds differ among the countries as described above, information could not be freely transmitted among the countries.

To solve this problem, SDH employs a method for unifying the various digital hierarchies. In this method, a virtual "box" called a virtual container (VC) is defined, and several information signals having low transmission speeds (information of a lower order) are put into the "box", and a plurality of such "boxes" are collected and put into a larger "box". Using this method, information signals having different transmission speeds can ultimately be inserted into a single large "box" for transmission.

For example, when information signals are of 1.5 Mbps series, four information signals are inserted into a "box" having a capacity of 6 Mbps, and seven of such 6 Mbps "boxes" are inserted into a "box" having a capacity of 50 Mbps. Further, three of such 50 Mbps "boxes" are inserted into a single "box" having a capacity of 150 Mbps and then transmitted.

When information signals are of 2 Mbps series, three information signals are inserted into a "box" having a capacity of 6 Mbps, and several such 6 Mbps "boxes" are inserted into a larger "box". This procedure is repeated, so that the information signals are ultimately inserted into a single "box" having a capacity of 150 Mpps and are transmitted. Similarly, three information signals of 50 Mbps series standardized under SONET of the U.S. are inserted into a "box" having a capacity of 150 Mbps and then transmitted.

Information having a converted transmission speed (frame format) of 150 Mbps series is called STM-1 (Synchronous Transport Module Level 1) under SDH, and is called STS-3c under SONET.

FIGS. 36(a) and 36(b) are diagrams showing examples of the frame formats of STM-1 and STS-3c signals, respectively. As shown in FIGS. 36(a) and 36(b), the frame format of the STM-1 and the frame format of the STS-3c are basically the same, and each has a format structure of 9 rows×270 bytes consisting of an overhead portion called SOH (Section Overhead) of 9 rows×9 bytes, and a data portion (SPE) of 9 rows×261 bytes.

Information having a transmission speed equal to or greater than 150 Mbps has a frame format in which a plurality of STM-1 signals or STS-3c signals (total number is an integer) are multiplexed, and is represented as STM-n or STS-m (n and m are degrees of multiplexing) as shown below:

| SDH | | SONET |
|---|---|---|
| STM-1 | = | STS-3c |
| STM-4 | = | STS-12 |
| . | | . |
| . | | . |
| STM-64 | = | STS-192 |
| . | | . |
| . | | . |
| STM-n | = | STS-m |

SDH and SONET are basically the same in their frame lengths and frame formats, as shown in FIGS. 36(a) and 36(b). However, in a high speed mode whose operating speed is equal to or higher than that of STM-64/STS-192, they differ from each other in the definition of a frame synchronization pattern included in the first row of the SOH. Further, they differ from each other in the definition of a portion called SS bits in a pointer byte which is included in the fourth row of SOH and represents the leading position of the SPE (the SS bits are "00" in SONET but "10" in SDH), and also differ from each other in the definition of an undefined byte (the undefined bytes are all "0" in SONET but all "1" in SDH).

Therefore, when an apparatus of the SDH system and an apparatus of the SONET system are mutually connected for operation, an alarm is generated due to a partial disagreement between their formats, so that it becomes impossible to perform communication. Consequently, it becomes impossible to interconnect these apparatuses of different systems.

An example is assumed in which apparatuses of the SDH system (an interface apparatus for SDH) such as an SDH multiplexing apparatus 101A and an STM-1 format conversion apparatus 102A are interconnected with apparatuses of the SONET system (an interface apparatus for SONET) such as a SONET multiplexing apparatus 101B and an STS-3c format conversion apparatus 102B, while a signal having a transmission capacity of 150 Mbps is transmitted through the multiplexing apparatuses 101A and 101B.

As shown in FIG. 39, each of the SDH multiplexing apparatus 101A and the SONET multiplexing apparatus 101B comprises a transmission section 107 consisting of a multiplexing unit 103, an overhead inserting unit 104, a frame pattern inserting unit 105 and an electricity/light converting unit 106; and a reception section 113 consisting of a light/electricity converting unit 108, a frame synchronization processing unit 109, an overhead processing unit 110, a separating unit 111 and an alarm processing unit 112.

In the transmission section 107 of the SDH multiplexing apparatus 101A, a plurality of STM-1 signals to be transmitted are multiplexed by the multiplexing unit 103 together with other equivalent signals (STM-1 signals), so that they are converted into an STM-n signal (n is the degree of multiplexing). For this STM-n signal, overhead inserting processing and frame synchronization pattern inserting processing are performed in an SDH mode within the overhead inserting unit 104 and the frame pattern inserting unit 105, respectively. Consequently, the STM-n signal is converted into a light signal by the electricity/light converting unit 106 and is transmitted toward the counterpart apparatus.

Similarly, in the transmission section 107 of the SONET multiplexing apparatus 101B, a plurality of STS-3c signals to be transmitted are multiplexed by the multiplexing unit 103 together with other equivalent signals (STS-3c signals), so that they are converted into an STS-m signal (m is the degree of multiplexing). For this STS-m signal, overhead inserting processing and frame synchronization pattern inserting processing are performed in a SONET mode within the overhead inserting unit 104 and the frame pattern inserting unit 105, respectively. Consequently, the STS-m signal is converted into a light signal by the electricity/light converting unit 106 and is transmitted toward the counterpart apparatus.

In the reception section 113 of the SDH multiplexing apparatus 101A and the reception section 113 of the SONET multiplexing apparatus 101B, an STM-n signal or an STS-m signal transmitted from a counterpart multiplexing apparatus is converted into an electrical signal by the light/electricity converting unit 108. The frame synchronization of the converted signal is detected by the frame synchronization processing unit 109 so that synchronization is established. After the signal is subjected to processing for replacing the overhead or other processing performed by the overhead processing unit 110, the signal is separated by the separating unit 111 into a plurality of STM-1 signals or STS-3c signals which correspond to those existing before multiplexing.

As described above, the frame formats of the STM-1 and STS-3c differ from each other in the definition of the SS bits of the pointer byte in the overhead section. That is, the SS bits are "10" in SDH but "00" in SONET. Therefore, each of the reception sections 113 of SDH multiplexing apparatus 101A and the SONET multiplexing apparatus 101B receives an SS bit value different from the defined value therefor.

Therefore, in the reception section 113, when a received signal is processed by the overhead processing unit 110, it is judged that the value of the SS bits is an invalid pointer value. In this case, an LOP (Loss of Pointer) alarm is generated by the alarm processing unit 112, so that it becomes impossible to continue communication.

In a high speed mode in which signals each having a transmitting capacity equal to or greater than that of STM-64 (STS-192) are exchanged, SDH and SONET differ from each other in their frame synchronization patterns, as has been described with reference to FIG. 37. Therefore, there is a possibility that frame synchronization cannot be established within the frame synchronization processing unit 109, resulting in lack of synchronization.

Accordingly, as shown in FIG. 40(c), it is practically impossible to interconnect an apparatus of the SONET system with an apparatus of the SDH system so as to operate them, although it is possible to establish interconnection between apparatuses of the same system, i.e., the SONET system or the SDH system so as to operate them (or establish communication therebetween), as shown in FIG. 40(a) and FIG. 40(b).

SUMMARY OF THE INVENTION

The present invention was conceived to solve the above mentioned problems, and a first object of the present invention is to provide an interface apparatus for SDH/SONET interconnection which can interconnect apparatuses of two different systems, i.e. an apparatus of the SDH system and an apparatus of the SONET system so as to operate them.

To this end, the present invention provides an interface apparatus for SDH/SONET interconnection which includes a transmission interface section provided at a position where an apparatus of the SDH system and an apparatus of the SONET system face each other and adapted to transmit a signal toward an apparatus of a different system. The interface apparatus for SDH/SONET interconnection comprises: a mode setting unit for setting a mode suitable for an apparatus of a counterpart system; a frame synchronization information inserting unit provided in the transmission interface section and adapted to insert frame synchronization information corresponding to the mode set by the mode setting unit; and an overhead information inserting unit provided in the transmission interface section and adapted to insert overhead information corresponding to the mode set by the mode setting unit.

The present invention also provides an interface apparatus for SDH/SONET interconnection which includes a reception interface section provided at a position where an apparatus of the SDH system and an apparatus of the SONET system face each other, and adapted to receive a signal from an apparatus of a different system. The interface apparatus for SDH/SONET interconnection comprises: a frame synchronization information detecting unit provided in the reception interface section and adapted to detect frame synchronization information from a reception signal; an overhead information detecting unit provided in the reception interface section and adapted to detect overhead information from the reception signal; a judging unit for judging the kind of an apparatus of a counterpart system based on the frame synchronization information detected by the frame synchronization information detecting unit and the overhead information detected by the overhead information detecting unit; an alarm processing unit for generating an alarm or cancelling the alarm based on a result of the judgment performed within the judging unit; and a format conversion processing unit provided in the reception interface section and adapted to cause the reception signal to undergo format conversion processing corresponding to a desired mode.

Further, the present invention provides an interface apparatus for SDH/SONET interconnection which includes a transmission interface section provided at a position where an apparatus of the SDH system and an apparatus of the SONET system face each other and adapted to transmit a signal toward an apparatus of a different system, and a reception interface section provided at a position where the apparatus of the SDH system and the apparatus of the SONET system face each other and adapted to receive a signal from the apparatus of the different system. The interface apparatus for SDH/SONET interconnection comprises: a mode setting unit for setting a mode suitable for an apparatus of a counterpart system; a frame synchronization information inserting unit provided in the transmission interface section and adapted to insert frame synchronization information corresponding to the mode set by the mode setting unit; an overhead information inserting unit provided in the transmission interface section and adapted to insert overhead information corresponding to the mode set by the mode setting unit; a frame synchronization information detecting unit provided in the reception interface section and adapted to detect frame synchronization information from a reception signal; an overhead information detecting unit provided in the reception interface section and adapted to detect overhead information from the reception signal; a judging unit for judging the kind of an apparatus of a counterpart system based on the frame synchronization information detected by the frame synchronization information detecting unit and the overhead information detected by the overhead information detecting unit; an alarm processing unit for generating an alarm or cancelling the alarm based on a result of the judgment performed within the judging unit; and a format conversion processing unit provided in the reception interface section and adapted to cause the reception signal to undergo format conversion processing corresponding to a desired mode.

Accordingly, in the interface apparatus for SDH/SONET interconnection of the present invention, a signal from the apparatus of the different system is converted by the reception interface section into a format suitable for the apparatus of the system at the same side. Therefore, the reception can be normally performed. This makes it possible to considerably easily interconnect apparatuses of different systems (the SDH system and the SONET system) so as to operate them, which are originally impossible to connect with each other because of generation of an alarm caused by disagreement of various kinds of information contained in transmission and reception signals.

Also, the present invention provides an interface apparatus for SDH/SONET interconnection which includes a transmission interface section provided at a position where an apparatus of the SDH system and an apparatus of the SONET system face each other and adapted to transmit a signal toward an apparatus of a different system. The interface apparatus for SDH/SONET interconnection comprises: a frame synchronization information detecting unit for detecting frame synchronization information from a reception signal; an overhead information detecting unit for detecting overhead information from the reception signal; a judging unit for judging the kind of an apparatus of a counterpart system based on the frame synchronization information detected by the frame synchronization information detecting unit and the overhead information detected by the overhead information detecting unit; a format conversion processing unit provided in the transmission interface section and adapted to cause the transmission signal to undergo format conversion processing corresponding to the mode judged by the judging unit; a frame synchronization information inserting unit provided in the transmission interface section and adapted to insert frame synchronization information corresponding to the mode judged by the judging unit; and an overhead information inserting unit provided in the transmission interface section and adapted to insert overhead information corresponding to the mode judged by the judging unit.

Moreover, the present invention also provides an interface apparatus for SDH/SONET interconnection which includes a reception interface section provided at a position where an apparatus of the SDH system and an apparatus of the SONET system face each other and adapted to receive a signal from an apparatus of a different system. The interface apparatus for SDH/SONET interconnection comprises: a frame synchronization information detecting unit provided in the reception interface section and adapted to detect frame synchronization information from a reception signal; an overhead information detecting unit provided in the reception interface section and adapted to detect overhead information from the reception signal; a judging unit for judging the kind of an apparatus of a counterpart system based on the frame synchronization information detected by the frame synchronization information detecting unit and the overhead information detected by the overhead information detecting unit; an alarm processing unit for generating an alarm or cancelling the alarm based on a result of the judgment performed within the judging unit; and a format conversion processing unit provided in the reception interface section and adapted to cause the reception signal to undergo format conversion processing corresponding to a mode judged by the judging unit.

Further, the present invention provides an interface apparatus for SDH/SONET interconnection which includes a transmission interface section provided at a position where an apparatus of the SDH system and an apparatus of the SONET system face each other and adapted to transmit a signal toward an apparatus of a different system, and a reception interface section provided at a position where the apparatus of the SDH system and the apparatus of the SONET system face each other and adapted to receive a signal from the apparatus of the different system. The interface apparatus for SDH/SONET interconnection comprises: a frame synchronization information detecting unit provided in the reception interface section and adapted to detect frame synchronization information from a reception signal; an overhead information detecting unit provided in the reception interface section and adapted to detect overhead information from the reception signal; a judging unit for judging the kind of an apparatus of a counterpart system based on the frame synchronization information detected by the frame synchronization information detecting unit and the overhead information detected by the overhead information detecting unit; an alarm processing unit for generating an alarm or cancelling the alarm based on a result of the judgment performed within the judging unit; a first format conversion processing unit provided in the reception interface section and adapted to cause the reception signal to undergo format conversion processing corresponding to a mode judged by the judging unit; a second format conversion processing unit provided in the transmission interface section and adapted to cause the transmission signal to undergo format conversion processing corresponding to the mode judged by the judging unit; a frame synchronization information inserting unit provided in the transmission interface section and adapted to insert frame synchronization information corresponding to the mode judged by the judging unit; and an overhead information inserting unit provided in the transmission interface section and adapted to insert overhead information corresponding to the mode judged by the judging unit.

Accordingly, in the interface apparatus for SDH/SONET interconnection of the present invention, it is possible to considerably easily interconnect apparatuses of different systems (the SDH system and the SONET system) so as to operate them. In addition, since the processing is performed in accordance with a mode judged by the judging unit, apparatuses of different systems can be flexibly interconnected in a simplified structure.

BRIEF DESCRIPTION OF THE DRAWINGS

FIG. 15 is a diagram for explaining the difference between the frame pattern of SDH and the frame pattern of SONET;

FIG. 23 is a diagram for explaining the difference in the standard of the frame formats between SDH and SONET;

FIG. 24(a)–FIG. 24(d) are diagrams for explaining the operation of the multiplexing apparatus according to the present embodiment for detecting a frame pattern;

FIG. 28(a)–FIG. 28(d) are timing charts for explaining the operation of the common byte detecting unit of the multiplexing apparatus of the present embodiment;

FIG. 37 is a diagram for explaining the difference in the standard of the frame format between SDH and SONET;

DESCRIPTION OF THE PREFERRED EMBODIMENTS (a) Aspects of the Present Invention First, aspects of the present invention will be described with reference to the drawings.

Figure 1:
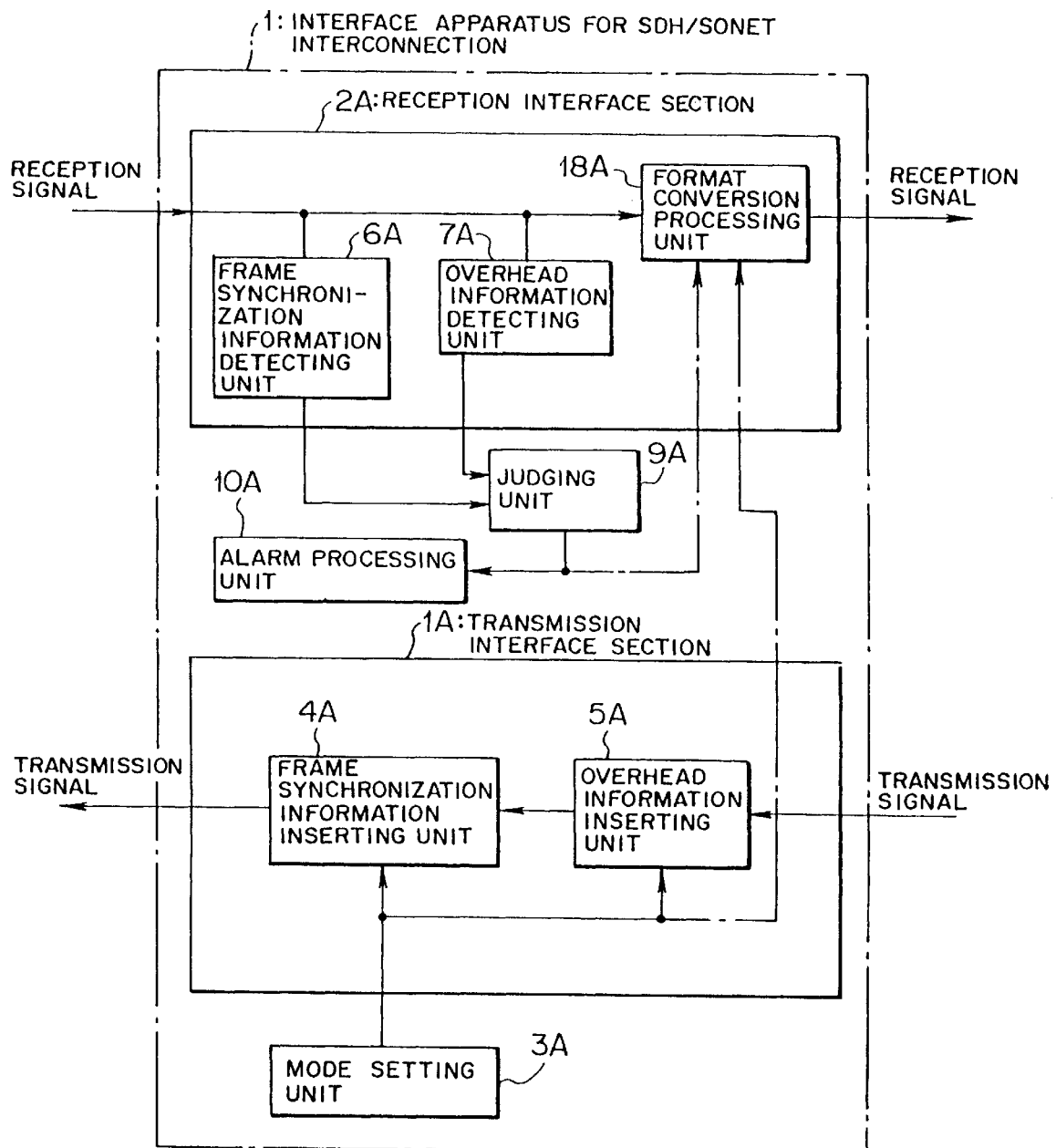
FIG. 1 and FIG. 2 are block diagrams respectively showing aspects of the present invention.

FIG. 1 is a block diagram showing an aspect of the present invention. In FIG. 1, numeral 1 denotes an interface apparatus for SDH/SONET interconnection. As shown in FIG. 1, the interface apparatus for SDH/SONET interconnection 1 comprises a transmission interface section 1A, a reception interface section 2A, a mode setting unit 3A, a judging unit 9A, and an alarm processing section 10A. In the transmission interface section 1A, a frame synchronization information inserting unit 4A, and an overhead information inserting unit 5A are provided. In the reception interface section 2A, a frame synchronization information detecting unit 6A, an overhead information detecting unit 7A and a format conversion processing unit 8A are provided.

Each of the transmission interface section 1A and the reception interface section 2A is provided at a position where an apparatus of the SDH system and an apparatus of the SONET system face each other. The transmission interface section 1A transmits a signal toward an apparatus of a different system (the SDH system or the SONET system). The reception interface section 2A receives a signal from the apparatus of the different system.

The mode setting unit 3A sets a mode suitable for the apparatus of the counterpart system. The frame synchronization information inserting unit 4A provided in the transmission interface section 1A inserts frame synchronization information corresponding to the mode set by the mode setting unit 3A. The overhead information inserting unit 5A provided in the transmission interface section 1A inserts overhead information corresponding to the mode set by the mode setting unit 3A.

In the reception interface section 2A, the frame synchronization information detecting unit 6A detects frame synchronization information from a reception signal (a signal from the apparatus of the counterpart system), the overhead information detecting unit 7A detects overhead information from the reception signal, and the format conversion processing unit 8A performs format conversion processing for the reception signal in accordance with a desired mode (a mode set by the mode setting unit 3A or a result of judgment by the judging unit 9A, which will be described later).

The judging unit 9A judges the kind of the apparatus of the counterpart system based on the frame synchronization information detected by the frame synchronization information detecting unit 6A and the overhead information detected by the overhead information detecting unit 7A. The alarm processing unit 10A generates an alarm or cancels the alarm based on a result of the judgment performed within the judging unit 9A.

Namely, when attention is paid on the transmission side, the interface apparatus for SDH/SONET interconnection 1 shown in FIG. 1 comprises the transmission interface section 1A, the mode setting unit 3A, and the frame synchronization information inserting unit 4A and the overhead information inserting unit 5A both provided in the transmission interface section 1A.

When attention is paid on the reception side, the interface apparatus for SDH/SONET interconnection 1 comprises the reception interface section 2A, the frame synchronization information detecting unit 6A provided in the reception interface section 2A, and the overhead information detecting unit 7A provided in the reception interface section 2A, the judging unit 9A, the alarm processing unit 10A, and the format conversion processing unit 8A provided in the reception interface section 2A.

In the interface apparatus for SDH/SONET interconnection 1 having the above-described structure, when a signal is transmitted from the transmission interface section 1A to the apparatus of the different system, frame synchronization information and overhead information corresponding to the mode set by the mode setting unit 3A are respectively inserted into the transmission signal by the frame synchronization information inserting unit 4A and the overhead information inserting unit 5A. After that, the transmission signal is transmitted from the transmission interface section 1A to the apparatus of the counterpart system.

When a signal is received by the reception interface section 2A from the apparatus of the different system, the frame synchronization information and overhead information are detected from the reception signal by the frame synchronization information detecting unit 6A and the overhead information detecting unit 7A. The kind of the apparatus of the counterpart system is judged by the judging unit 9A based on the frame synchronization information detected by the frame synchronization information detecting unit 6A and the overhead information detected by the overhead information detecting unit 7A.

In the alarm processing unit 10A, processing for generating an alarm or processing for cancelling the alarm is performed based on the result of judgment by the judging unit 9A. Specifically, when the result of judgment by the judging unit 9A indicates that abnormality exists in information included in the reception signal except for the frame synchronization information and the overhead information, the processing for generating an alarm is performed. However, when only the format of a part of the reception signal such as the frame synchronization information and the overhead information differs from that of the system at the same side, the processing for cancelling the alarm is performed, and the reception signal is subjected to format conversion processing by the format conversion processing unit 8A in accordance with a desired mode (the mode set by the mode setting unit 3A or the result of judgment by the judging unit 9A). As a result, the signal from the apparatus of the counterpart system can be normally received without generation of an alarm.

As described above, according to the interface apparatus for SDH/SONET interconnection 1 of the present invention, a signal from the apparatus of the different system SDH or SONET is converted by the reception interface section 2A into a format suitable for the apparatus of the system at the same side. Therefore, the reception can be normally performed. This makes it possible to considerably easily interconnect apparatuses of the different systems (the SDH system and the SONET system) so as to operate them, which are originally impossible to connect with each other because of generation of an alarm caused by disagreement of various kinds of information contained in transmission and reception signals.

More specifically, the judging unit 9A has a structure such that when the reception signal is of a high speed mode and has a transmission speed equal to or greater than that of STM-64/STS-192, the kind of the apparatus of the counterpart system is judged utilizing a disagreement in the frame synchronization information detected by the frame synchronization information detecting unit 6A. With this structure, the kind of the apparatus of the counterpart system is judged based on the disagreement in the frame synchronization information of the reception signal.

Accordingly, it becomes possible to easily judge the kind of the apparatus of the counterpart system without additionally using a signal or the like for judging the kind of the apparatus of the counterpart system.

In this case, the overhead information detecting unit 7A may include an SS bit detecting unit for detecting SS bit information, and an undefined byte detecting unit for detecting undefined byte information, and the judging unit 9A may judge the kind of the apparatus of the counterpart system by using difference in the SS bit information detected by the SS bit detecting unit of the overhead information detecting unit 7A or difference in the undefined byte information detected by the undefined byte detecting unit of the overhead information detecting unit 7A. In this case, the kind of the apparatus of the counterpart system can be judged based on difference in the SS bit information or the undefined byte information of the reception signal.

Accordingly, the above structure also makes it possible to easily judge the kind of the apparatus of the counterpart system without additionally using a signal for judgment or the like.

In the above-described case where the overhead information detecting unit 7A includes the SS bit detecting unit for detecting SS bit information, and the undefined byte detecting unit for detecting undefined byte information, the judging unit 9A may judge the kind of the apparatus of the counterpart system by using difference in the SS bit information detected by the SS bit detecting unit of the overhead information detecting unit 7A and difference in the undefined byte information detected by the undefined byte detecting unit of the overhead information detecting unit 7A. In this case, the judging unit 9A can judge the kind of the apparatus of the counterpart system based on both difference in the SS bit information of the reception signal and difference in the undefined byte information of the reception signal.

In this case, the kind of the apparatus of the counterpart system can be judged more reliably.

Similarly, in the case where the overhead information detecting unit 7A includes the SS bit detecting unit for detecting SS bit information, and the undefined byte detecting unit for detecting undefined byte information, the judging unit 9A may put the order of priority on the frame synchronization information detected by the frame synchronization information detecting unit 6A, the SS bit information detected by the SS bit detecting unit of the overhead information detecting unit 7A and the undefined byte information detected by the undefined byte detecting unit of the overhead information detecting unit 7A, and judge the kind of the apparatus of the counterpart system by using information having the high priority.

In this case, the judging unit 9A can judge the kind of the apparatus of the counterpart system based on difference in information having a high priority among the frame synchronization information, the SS bit information, and the undefined byte information of the reception signal.

Accordingly, even when the reception signal incudes the same information as that of the apparatus of the counterpart system, the kind of the apparatus of the counterpart system can be judged reliably.

Further, the frame synchronization information detecting unit 6A may detect only common portion of partially different frame synchronization information. In this case, the judging unit 9A judges the kind of the apparatus of the counterpart system based on the overhead information detected by the overhead information detecting unit 7A. With this structure, even when SDH and SONET differ from each other in the frame synchronization information of the reception signal, the frame synchronization of the reception signal can be established by detecting the common information only. In addition, the kind of the apparatus of the counterpart system can be judged based on the overhead information of the reception signal.

Accordingly, even when SDH and SONET differ from each other in the frame synchronization information of the reception signal, the kind of the apparatus of the counterpart system can be judged considerably easily without generating an alarm.

Specifically, the format conversion processing unit 8A performs format conversion processing for the reception signal in accordance with a mode set by the mode setting section 3A for setting a mode suitable for the apparatus of the counterpart system. Therefore, even when a signal having a different format is transmitted from the counterpart different system, the format conversion processing unit 8A can perform proper format conversion processing for the signal, so that the signal can be normally received.

Accordingly, the apparatus of the different system can be connected securely.

The format conversion processing unit 8A may perform format conversion processing for the reception signal in accordance with a mode judged by the judging unit 9A. In this case, format conversion processing corresponding to the mode judged by the judging unit 9A is automatically performed for the reception signal by the format conversion processing unit 8A without previously setting a mode suitable for the apparatus of the counterpart system by using the mode setting section 3A. As a result, a signal having a different format transmitted from the different system can be normally received.

Accordingly, processing for receiving a signal can easily be performed without considering the system of an apparatus which is connected as a counterpart. This increases flexibility of the interconnection between apparatuses of different systems.

Moreover, when the format conversion processing unit 8A performs format conversion processing for the reception signal by rewriting the SS bit information or the undefined byte information, the format conversion processing is performed only by rewriting either the SS bit information or the undefined byte information of the reception signal. Actually, the format conversion processing unit 8A performs format conversion processing for the reception signal by rewriting both the SS bit information and the undefined byte information, so that the format conversion processing is performed by rewriting both the SS bit information and the undefined byte information.

Accordingly, the format conversion processing can be performed at a considerably high speed and with improved reliability.

Specifically, the alarm processing unit 10A comprises an SDH alarm detecting condition extracting unit, a SONET alarm detecting condition extracting unit, an SDH alarm cancelling condition extracting unit, a SONET alarm cancelling condition extracting unit, an alarm detecting/cancelling condition control unit, and an alarm detecting/cancelling unit. These portions are not illustrated in FIG. 1.

The SDH alarm detecting condition extracting unit extracts an alarm detecting condition for the apparatus of the SDH system from the reception signal, and the SONET alarm detecting condition extracting unit extracts an alarm detecting condition for the apparatus of the SONET system from the reception signal. The SDH alarm cancelling condition extracting unit extracts an alarm cancelling condition for the apparatus of the SDH system from the reception signal, and the SONET alarm cancelling condition extracting unit extracts an alarm cancelling condition for the apparatus of the SONET system from the reception signal.

The alarm detecting/cancelling condition control unit receives the result of judgment performed within the judgment unit 9A. When the result of the judgment indicates that the mode is SDH, the alarm detecting/cancelling condition control unit outputs the SDH alarm detecting condition and the SDH alarm cancelling condition extracted by the SDH alarm detecting condition extracting unit and the SDH alarm cancelling condition extracting unit. When the result of the judgment indicates that the mode is SONET, the alarm detecting/cancelling condition control unit outputs the SONET alarm detecting condition and the SONET alarm cancelling condition extracted by the SONET alarm detecting condition extracting unit and the SONET alarm cancelling condition extracting unit. The alarm detecting/cancelling unit receives the outputs from the alarm detecting/cancelling condition control unit and outputs an alarm result.

In the alarm processing unit 10A having the above-described structure, an alarm result corresponding to the result of judgment by the judging unit 9A, i.e., the result indicating whether the kind of the apparatus of the counterpart system is of the SDH system or of the SONET system is output from the alarm detecting/cancelling unit. Therefore, even when the reception interface section 2A receives a signal from the apparatus of the different system, which has a different format, the processing can be normally continued by cancelling the alarm.

As described above, even when the reception interface section 2A receives a signal from the apparatus of the different system, which has a different format, the processing can be normally continued by securely cancelling the alarm. This makes it possible to readily interconnect the apparatuses of the different systems so as to operate them.

Figure 2:
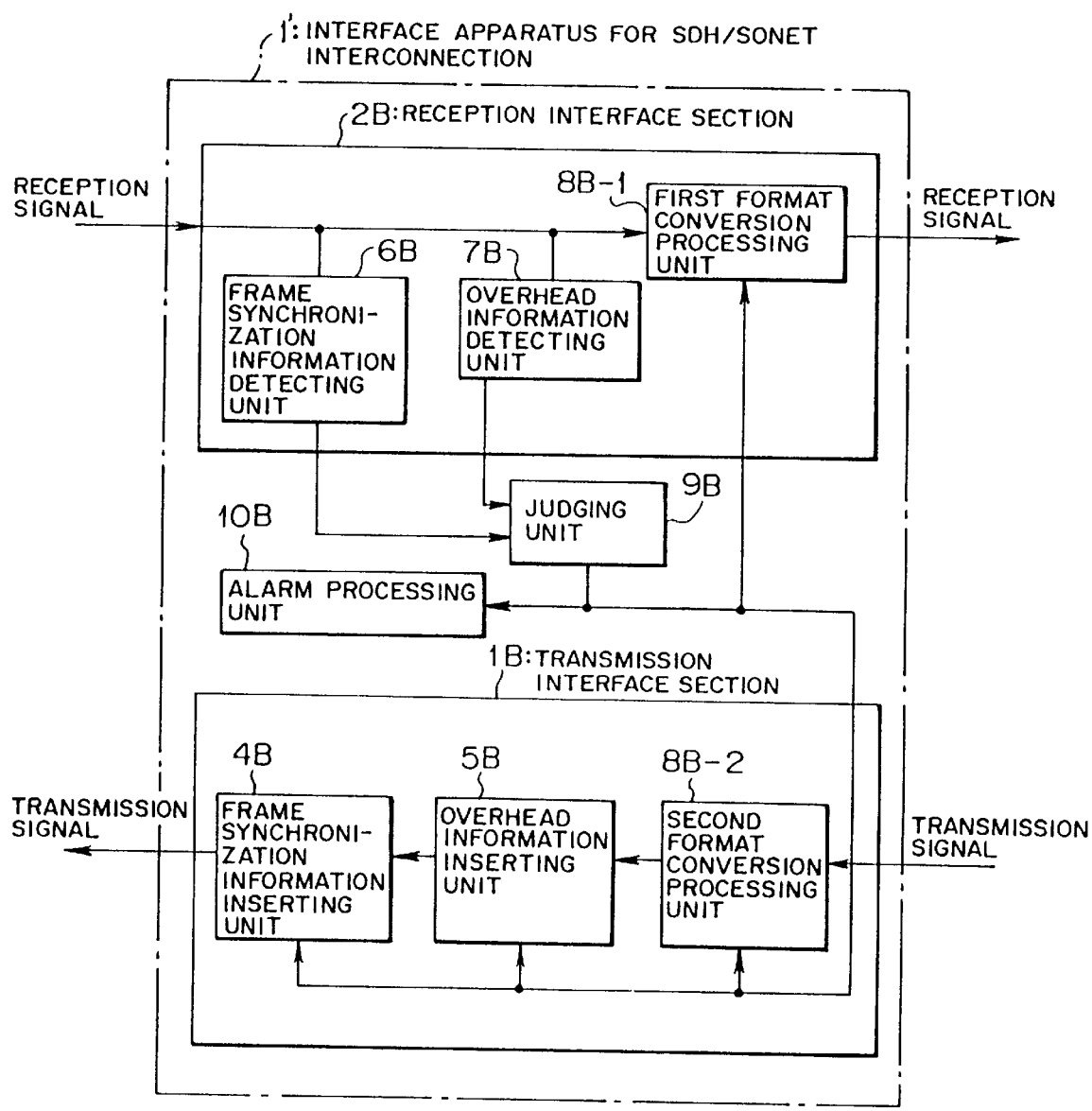

FIG. 2 is also a block diagram showing an aspect of the present invention. An interface apparatus for SDH/SONET interconnection 1' shown in FIG. 2 comprises a transmission interface section 1B, a reception interface section 2B, a judging unit 9B, and an alarm processing section 10B. In the transmission interface section 1B, a frame synchronization information inserting unit 4B, an overhead information inserting unit 5B and a second format conversion processing unit 8B-2 are provided. In the reception interface section 2B, a frame synchronization information detecting unit 6B, an overhead information detecting unit 7B and a first format conversion processing unit 8B-1 are provided.

As in the first aspect, the transmission interface section 1B is provided at a position where an apparatus of the SDH system and an apparatus of the SONET system face each other and adapted to transmit a signal toward an apparatus of the counterpart system. The reception interface section 2B is provided at a position where the apparatus of the SDH system and the apparatus of the SONET system face each other and adapted to receive a signal from the apparatus of the counterpart system.

The frame synchronization information detecting unit 6B and the overhead information detecting unit 7B provided in the reception interface section 2B respectively detect frame synchronization information and overhead information from the reception signal. The judging unit 9B judges the kind of the apparatus of the counterpart system based on the frame synchronization information detected by the frame synchronization information detecting unit 6B and the overhead information detected by the overhead information detecting unit 7B. The alarm processing unit 10B generates an alarm or cancels the alarm based on a result of the judgment performed within the judging unit 9B.

The first format conversion processing unit 8B-1 provided in the reception interface section 2B performs format conversion processing for the reception signal in accordance with a mode judged by the judging unit 9B. The second format conversion processing unit 8B-2 provided in the transmission interface section 1B performs format conversion processing for the transmission signal in accordance with the mode judged by the judging unit 9B.

The frame synchronization information inserting unit 4B and the overhead information inserting unit 5B provided in the transmission interface section 1B insert into the transmission signal frame synchronization information and overhead information corresponding to the mode judged by the judging unit 9B.

Namely, when attention is paid on the transmission side, the interface apparatus for SDH/SONET interconnection 1' shown in FIG. 2 comprises the transmission interface section 1B, frame synchronization information inserting unit 4B, the overhead information insertion unit 5B, and the format conversion processing unit (second format conversion processing unit) 8B-2.

When attention is paid on the reception side, the interface apparatus for SDH/SONET interconnection 1' comprises the reception interface section 2B, the frame synchronization information detecting unit 6B, the overhead information detecting unit 7B, the judging unit 9B, the alarm processing unit 10B, and the format conversion processing unit (first format conversion processing unit) 8B-1.

In the interface apparatus for SDH/SONET interconnection 1' having the above-described structure, when a signal is received by the reception interface section 2B from the apparatus of the different system, the frame synchronization information and overhead information are detected from the reception signal by the frame synchronization information detecting unit 6B and the overhead information detecting unit 7B. The kind of the apparatus of the counterpart system is judged by the judging unit 9B based on the frame synchronization information detected by the frame synchronization information detecting unit 6B and the overhead information detected by the overhead information detecting unit 7B.

In the alarm processing unit 10B, processing for generating an alarm or processing for cancelling the alarm is performed based on the result of judgment by the judging unit 9B. Specifically, when the result of judgment by the judging unit 9B indicates that abnormality exists in information included in the reception signal except for the frame synchronization information and the overhead information, the processing for generating an alarm is performed. However, when only the frame synchronization information and/or the overhead information differs from that of the system at the same side, the processing for cancelling the alarm is performed, and the reception signal is subjected to format conversion processing by the (first) format conversion processing unit 8B-1 in accordance with the mode judged by the judging unit 9B. As a result, the signal from the apparatus of the counterpart system can be normally received without generation of an alarm.

When a signal is transmitted from the transmission interface section 1B to the apparatus of the different system, the transmission signal is first subjected to format conversion processing by the (second) format conversion processing unit 8B-2 in accordance with the mode judged by the judging unit 9B. After that, frame synchronization information and overhead information corresponding to the mode judged by the judging unit 9B are respectively inserted into the transmission signal by the frame synchronization information inserting unit 4B and the overhead information inserting unit 5B. Therefore, a signal suitable for the apparatus of the counterpart different system is transmitted from the transmission interface section 1B to the apparatus of the counterpart system.

Accordingly, in the above-described interface apparatus for SDH/SONET interconnection 1' of the present invention, it is possible to considerably easily interconnect the apparatuses of the different systems so as to operate them. In addition, since the processing is performed in accordance with a mode judged by the judging unit, the apparatuses of the different systems can be flexibly interconnected in a simplified structure.

More specifically, like the judging unit 9A previously described with reference to FIG. 1, the judging unit 9B has a structure such that when the reception signal is of a high speed mode and has a transmission speed equal to or greater than that of STM-64/STS-192, the kind of the apparatus of the counterpart system is judged utilizing a disagreement in the frame synchronization information detected by the frame synchronization information detecting unit 6B. With this structure, the kind of the apparatus of the counterpart system is judged based on the disagreement in the frame synchronization information of the reception signal.

Accordingly, this structure also makes it possible to easily judge the kind of the apparatus of the counterpart system without additionally using a signal or the like for judging the kind of the apparatus of the counterpart system.

In this case, the overhead information detecting unit 7B may include an SS bit detecting unit for detecting SS bit information, and an undefined byte detecting unit for detecting undefined byte information, and the judging unit 9B may judge the kind of the apparatus of the counterpart system by using difference in the SS bit information detected by the SS bit detecting unit of the overhead information detecting unit 7B or difference in the undefined byte information detected by the undefined byte detecting unit of the overhead information detecting unit 7B. In this case, the kind of the apparatus of the counterpart system can be judged based on difference in the SS bit information or the undefined byte information of the reception signal.

Accordingly, the above structure also makes it possible to easily judge the kind of the apparatus of the counterpart system without additionally using a signal for judgment or the like.

In the above-described case where the overhead information detecting unit 7B includes the SS bit detecting unit for detecting SS bit information, and the undefined byte detecting unit for detecting undefined byte information, the judging unit 9B may judge the kind of the apparatus of the counterpart system by using difference in the SS bit information detected by the SS bit detecting unit of the overhead information detecting unit 7B and difference in the undefined byte information detected by the undefined byte detecting unit of the overhead information detecting unit 7B. In this case, the judging unit 9B can judge the kind of the apparatus of the counterpart system based on both difference in the SS bit information of the reception signal and difference in the undefined byte information of the reception signal.

In this case, the kind of the apparatus of the counterpart system can be judged more reliably.

Similarly, in the case where the overhead information detecting unit 7B includes the SS bit detecting unit for detecting SS bit information, and the undefined byte detecting unit for detecting undefined byte information, the judging unit 9B may put the order of priority on the frame synchronization information detected by the frame synchronization information detecting unit 6B, the SS bit information detected by the SS bit detecting unit of the overhead information detecting unit 7B and the undefined byte information detected by the undefined byte detecting unit of the overhead information detecting unit 7B, and judge the kind of the apparatus of the counterpart system by using information having a high priority.

In this case, the judging unit 9B can judge the kind of the apparatus of the counterpart system based on difference in information having a high priority among the frame synchronization information, the SS bit information, and the undefined byte information of the reception signal.

Accordingly, even when the reception signal incudes the same information as that of the apparatus of the counterpart system, the kind of the apparatus of the counterpart system can be judged reliably.

Further, the frame synchronization information detecting unit 6B may detect only common portion of partially different frame synchronization information. In this case, the judging unit 9B judges the kind of the apparatus of the counterpart system based on the overhead information detected by the overhead information detecting unit 7B. With this structure, even when the frame synchronization information of the reception signal has a portion which would cause disagreement, the kind of the apparatus of the counterpart system can be judged based on the overhead information of the reception signal.

Accordingly, even when the frame synchronization information of the reception signal is different, the kind of the apparatus of the counterpart system can be judged considerably easily without generating an alarm.

Specifically, the format conversion processing unit (first and second format conversion processing units) 8B-1 and 8B-2 may perform format conversion processing for the reception signal by rewriting either the SS bit information or the undefined byte information based on the result of judgment by the judging unit 9B. Using this operation, the desired format conversion processing can be performed only by rewriting either the SS bit information or the undefined byte information of the reception signal.

Accordingly, the format conversion processing can be performed by simple processing at a high speed.

Also, the format conversion processing unit (first and second format conversion processing units) 8B-1 and 8B-2 may perform format conversion processing for the reception signal by rewriting both the SS bit information and the undefined byte information based on the result of judgment by the judging unit 9B. Using this operation, the desired format conversion processing can be performed by rewriting both the SS bit information and the undefined byte information of the reception signal.

Accordingly, the format conversion processing can be performed with increased reliability.

Like the alarm processing unit 10A previously described with reference to FIG. 1, the alarm processing unit 10B comprises an SDH alarm detecting condition extracting unit, a SONET alarm detecting condition extracting unit, an SDH alarm cancelling condition extracting unit, a SONET alarm cancelling condition extracting unit, an alarm detecting/cancelling condition control unit, and an alarm detecting/cancelling unit. These portions are not illustrated in FIG. 2.

The SDH alarm detecting condition extracting unit extracts an alarm detecting condition for the apparatus of the SDH system from the reception signal, and the SONET alarm detecting condition extracting unit extracts an alarm detecting condition for the apparatus of the SONET system from the reception signal. The SDH alarm cancelling condition extracting unit extracts an alarm cancelling condition for the apparatus of the SDH system from the reception signal, and the SONET alarm cancelling condition extracting unit extracts an alarm cancelling condition for the apparatus of the SONET system from the reception signal.

The alarm detecting/cancelling condition control unit receives the result of judgment performed within the judgment unit 9B. When the result of the judgment indicates that the mode is SDH, the alarm detecting/cancelling condition control unit outputs the SDH alarm detecting condition and the SDH alarm cancelling condition extracted by the SDH alarm detecting condition extracting unit and the SDH alarm cancelling condition extracting unit. When the result of the judgment indicates that the mode is SONET, the alarm detecting/cancelling condition control unit outputs the SONET alarm detecting condition and the SONET alarm cancelling condition extracted by the SONET alarm detecting condition extracting unit and the SONET alarm cancelling condition extracting unit. The alarm detecting/cancelling unit receives the outputs from the alarm detecting/cancelling condition control unit and outputs an alarm result.

In the alarm processing unit 10B having the above-described structure, an alarm result corresponding to the result of judgment by the judging unit 9B, i.e., the result indicating whether the kind of the apparatus of the counterpart system is of the SDH system or of the SONET system is output from the alarm detecting/cancelling unit. Therefore, even when the reception interface section 2B receives a signal from the apparatus of the different system, which has a different format, the processing can be normally continued by cancelling the alarm.

As described above, even when the reception interface section 2B receives a signal from the apparatus of the different system, which has a different format, the processing can be normally continued by securely cancelling the alarm. This makes it possible to readily interconnect the apparatuses of the different systems so as to operate them.

(b) Embodiment of the Present Invention

Next, an embodiment of the present invention will be described with reference to the drawings.

(b1) General Description of Multiplexing Apparatus

Figure 3:
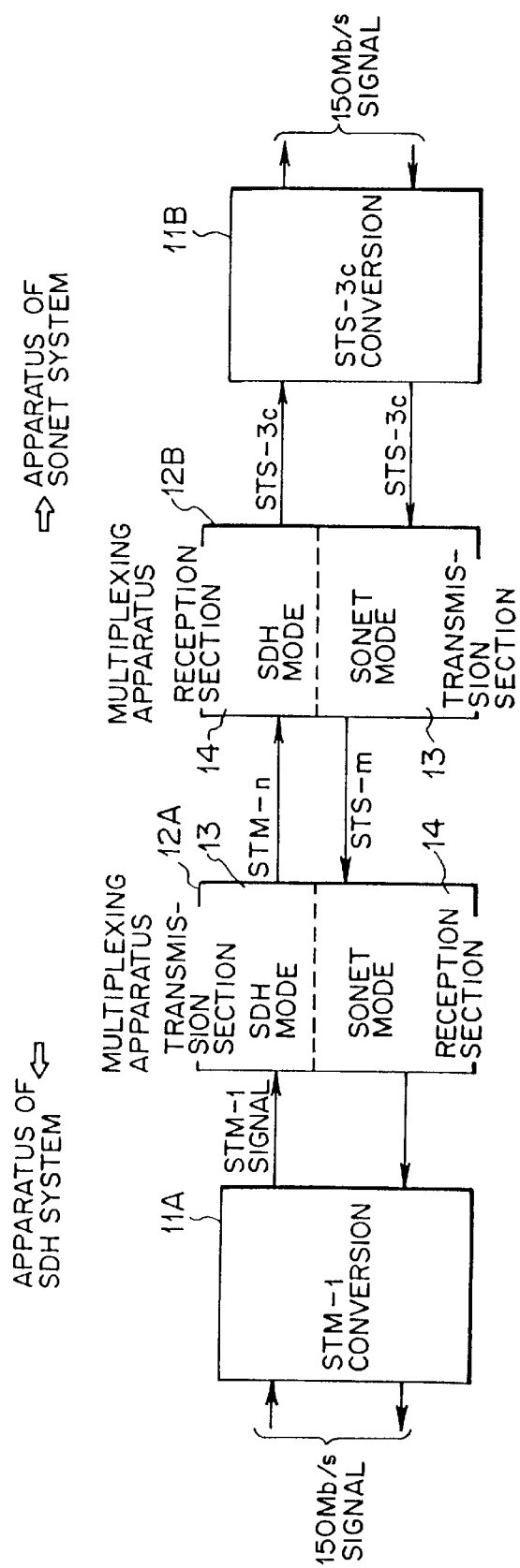
FIG. 3 is a block diagram showing an example of a network to which a multiplexing apparatus (interface apparatus for SDH/SONET interconnection) according to an embodiment of the present invention is applied.

FIG. 3 is a block diagram showing an example of a network to which a multiplexing apparatus (interface apparatus for SDH/SONET interconnection) according to an embodiment of the present invention is applied. In FIG. 3, numeral 11A denotes an STM-1 format converting apparatus, which is an apparatus of the SDH system, and numeral 11B denotes an STS-3c format converting apparatus, which is an apparatus of the SONET system. Each of numerals 12A and 12B denotes a multiplexing apparatus.

Figure 4:
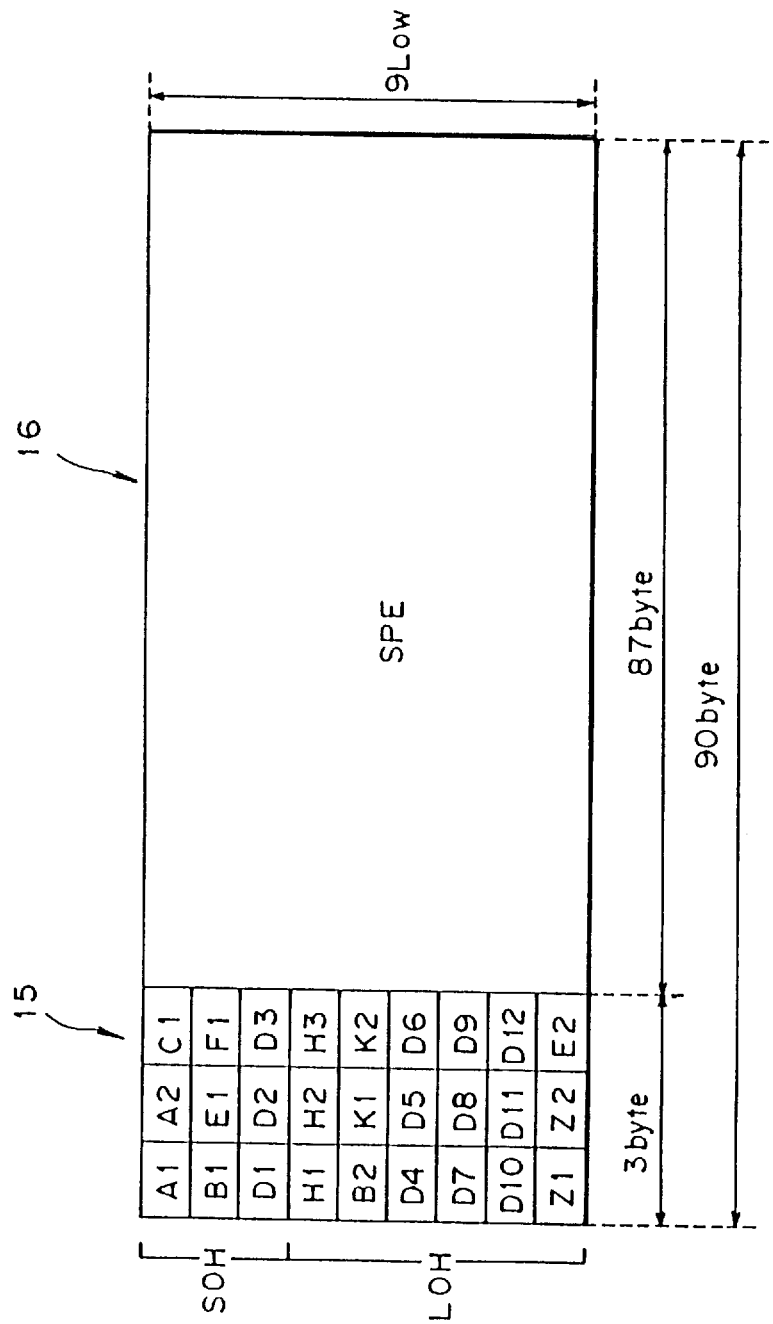
FIG. 4 is a diagram showing an example of the frame format of STM-1/STS-3c signals in the present embodiment.
Figure 5:
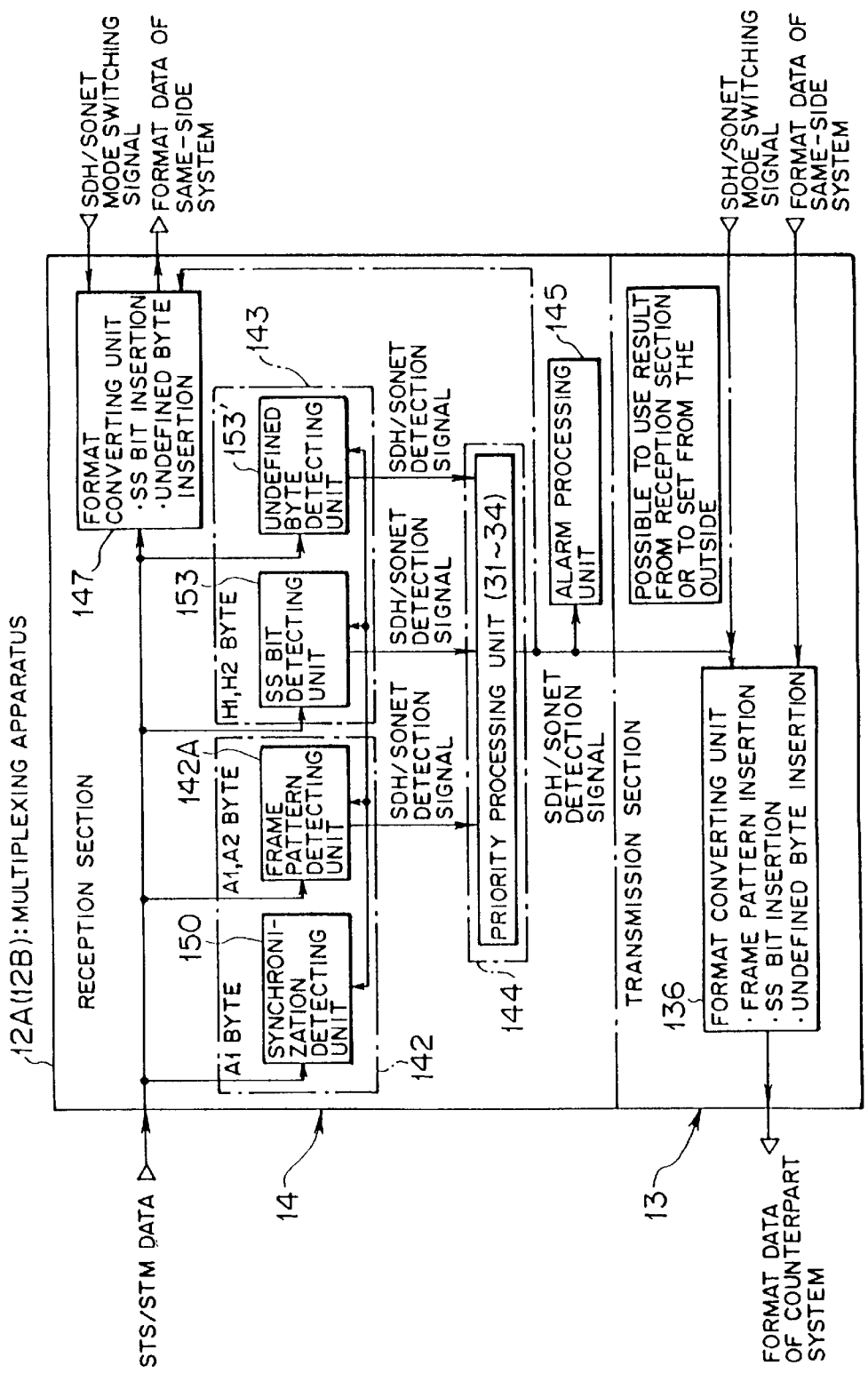
FIG. 5 is a block diagram showing an example of the structure of a main portion of the multiplexing apparatus according to the present embodiment.

The STM-1 format converting apparatus 11A converts the frame format of an inputted signal (electrical signal) of 150 Mbps series into the frame format of an STM-1 signal for SDH, which consists of an overhead portion 15 and a data portion (SPE) 16, as shown in FIG. 4. The STM-1 format converting apparatus 11A also converts the frame format of an STM-1 signal transmitted from the multiplexing apparatus 12A, which will be described later, into a data format which is used for transmission to the user side.

Similarly, the STS-3c format converting apparatus 11B converts an inputted signal (electrical signal) of 150 Mbps series into an STS-3c signal for SONET, which has the same frame format as that shown in FIG. 4. The STS-3c format converting apparatus 11B also converts the frame format of an STS-3c signal transmitted from the multiplexing apparatus 12B, which will be described later, into a data format which is used for transmission to the user side.

In the frame format of an STM-1 signal (or an STS-3c signal) shown in FIG. 4, the overhead portion 15 includes a section overhead SOH and a pass overhead POH. In the section overhead SOH and the pass overhead POH, symbols A1 and A2 denote frame patterns (frame synchronization information) used for establishing frame synchronization, symbol C1 denotes a byte representing an identification number of the STM-1 signal, symbol B1 denotes a byte used for monitoring occurrence of a character error at a relay section (between relay units), symbol E1 denotes a byte used for voice communication between relay sections, symbol F1 denotes a byte used for specifying a trouble of a relay section, symbols D1–D3 denote bytes used for data communication between relay sections.

Further, symbols H1–H3 denote pointer bytes indicating leading positions of data which are included in the data portion 16 and have various transmission speeds, symbol B2 denotes a byte used for monitoring occurrence of an error at a section, symbol K1 denotes a byte used for controlling the system to be switched, symbol K2 denotes a byte used for transferring the status of the multiplexing section (between terminal station relay apparatuses), symbols D4–D12 denote bytes used for data communication between multiplexing sections, symbols Z1 and Z2 denote spare bytes, and symbol E2 denotes a byte for voice communication between the multiplexing sections.

The multiplexing apparatus (interface apparatus for SDH/SONET interconnection) 12A (12B) multiplexes a plurality of STM-1 signals (or STS-3c signals: electrical signals) obtained in the format converting apparatus 11A (or format converting apparatus 11B) and transmits them to an apparatus of the counterpart SONET system (or SDH system) as an STM-n signal (or as an STS-m signal). Further, the multiplexing apparatus 12A (12B) separates an STS-m signal (or an STM-n signal: a light signal), which is a multiplexed signal transmitted from the apparatus of the counterpart SONET system (or SDH system), into a plurality of STS-3c signals (or STM-1 signals) which correspond to those existing before multiplexing. These signals are converted into electrical signals and outputted to the format converting apparatus 11A (or the format converting apparatus 11B).

To carry out the above-described operation, the the multiplexing apparatus 12A (12B) comprises a transmission section 13 for transmitting data toward the apparatus of the counterpart system, and a reception section 14 for receiving data (STM/STS) from the apparatus of the counterpart system. The transmission section 13 comprises a format converting unit 136. The reception section 14 comprises a frame synchronization processing unit 142 consisting of a synchronization detecting unit 150 and a frame pattern detecting unit 142A, an SS bit detecting unit 153, an overhead processing unit 143 consisting of an undefined byte detecting unit 153', an automatic judgment processing unit 144 formed as a priority processing unit, which will be described later, and an alarm processing unit 145.

In the reception section 13, the frame pattern detecting unit 142A detects the frame pattern (bytes A1 and A2) of the reception data (STS/STM), and judges whether the apparatus of the counterpart system is SDH or SONET. This judgment is made taking advantage of the fact that SDH and SONET have different standards regarding the bytes A1 and A2. Similarly, the SS bit detecting unit 153 detects SS bit information included in the bytes H1 and H2 in the LOH of the reception data, and judges whether the apparatus of the counterpart system is SDH or SONET, taking advantage of the fact that SDH and SONET have different standards regarding the SS bit information.

The undefined byte detecting unit 153' detects unidentified byte information included in the SOH and LOH of the reception data, and judges whether the apparatus of the counterpart system is SDH or SONET, taking advantage of the fact that SDH and SONET have different standards regarding the undefined byte information. The automatic judgment processing unit 144 automatically judges the kind (SDH/SONET) of the apparatus of the counterpart system by using respective SDH/SONET detection signals obtained by the frame pattern detecting unit 142A, the SS bit detecting unit 153 and the undefined byte detecting unit 153'.

The format converting unit [(first) format conversion processing unit] 147 inserts SS bit information for SDH/SONET and unidentified byte information for SDH/SONET into the reception data in accordance with an SDH/SONET mode switching signal (setting signal), thereby converting the format of the reception data into a format suitable for the apparatus of the system at the same side (self system). The alarm processing unit 145 performs processing for generating an alarm or processing for cancelling the generation of an alarm in accordance with the result of the SDH/SONET mode automatic judgment performed in the automatic judgment processing unit 144.

In the transmission section 13, the format converting section [(second) format conversion processing unit] 136 inserts a frame pattern for SDH/SONET, SS bit information, and unidentified byte information for SDH/SONET into the transmission data in accordance with the SDH/SONET mode switching signal (mode setting signal) supplied from the outside or the result of the SDH/SONET mode automatic judgment performed in the automatic judgment processing unit 144, thereby converting the format of the transmission data into a format suitable for the apparatus of the counterpart system.

In the multiplexing apparatus 12A (12B) having the above-described structure, when the reception section 14 receives data (STM/STS) from the apparatus of the counterpart system, the frame pattern, SS bit information and undefined byte information of the reception data are detected by the frame pattern detecting unit 142A, the SS bit detecting unit 153 and the undefined byte detecting unit 153', respectively, and the kind (SDH or SONET) of the apparatus of the counterpart system is automatically judged by the automatic judgment processing unit 144 based on the detected information.

In the format converting unit 147, the reception data is subjected to format conversion processing (insertion of SS bit information and unidentified byte information) corresponding to the SDH/SONET mode switching signal supplied from the outside or the result of the SDH/SONET mode automatic judgment performed in the automatic judgment processing unit 144, so that the format of the reception data is converted into a format suitable for the apparatus of the same-side system. As a result, data from the apparatus of the different system can be normally received by ordinary processing.

When data are transmitted to the apparatus of the counterpart system, the format converting section 136 of the transmission section 13 performs format conversion processing (insertion of a frame pattern, SS bit information and undefined byte information) for the transmission data in accordance with the SDH/SONET mode switching signal (mode setting signal) supplied from the outside or the result of the SDH/SONET mode automatic judgment performed in the automatic judgment processing unit 144, so that transmission data having a format suitable for the apparatus of the counterpart system are transmitted. As a result, the apparatus of the counter system can normally receive data by ordinary processing.

Figure 6:
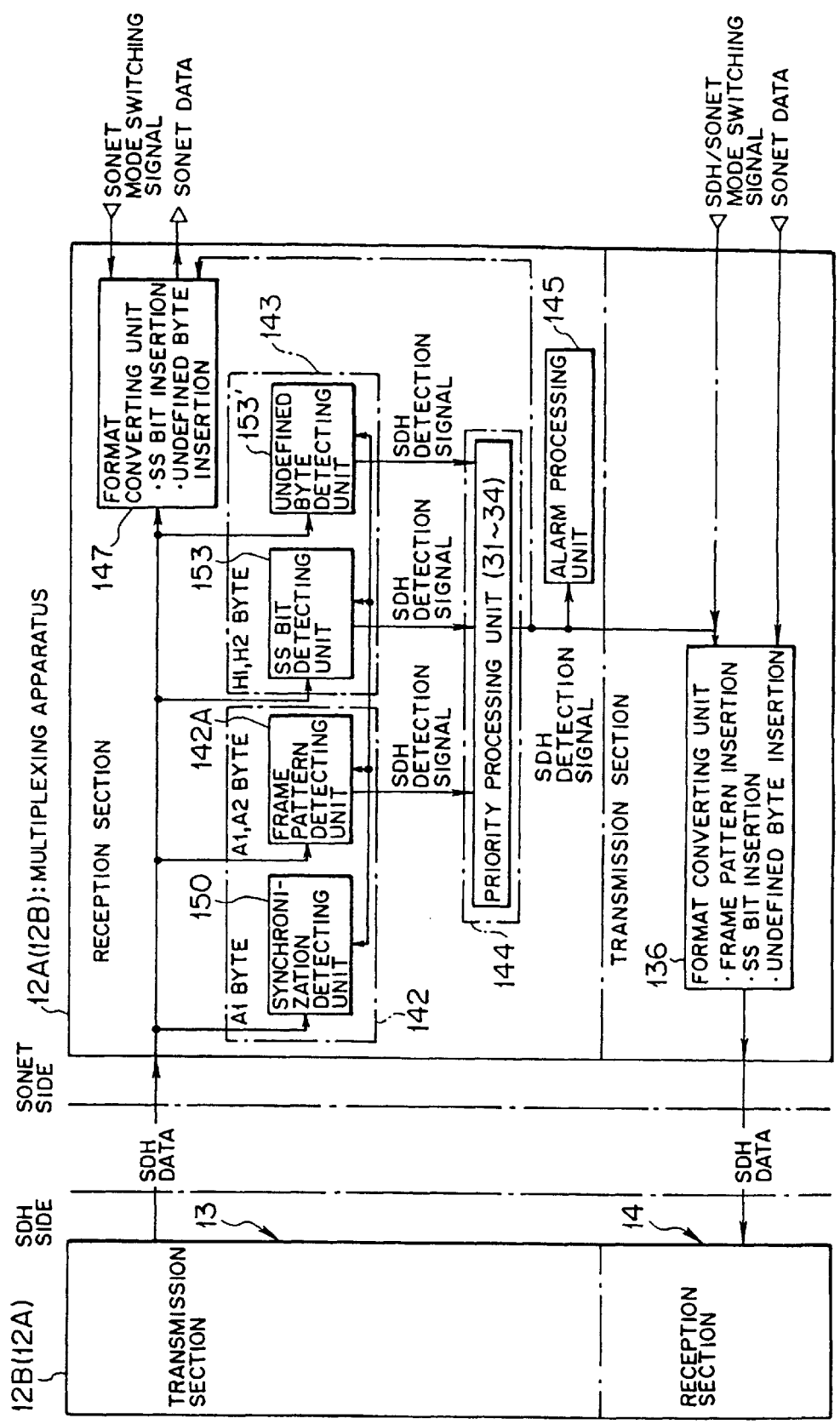
FIG. 6 is a block diagram showing an example of application of the multiplexing apparatus according to the present embodiment.
Figure 7:
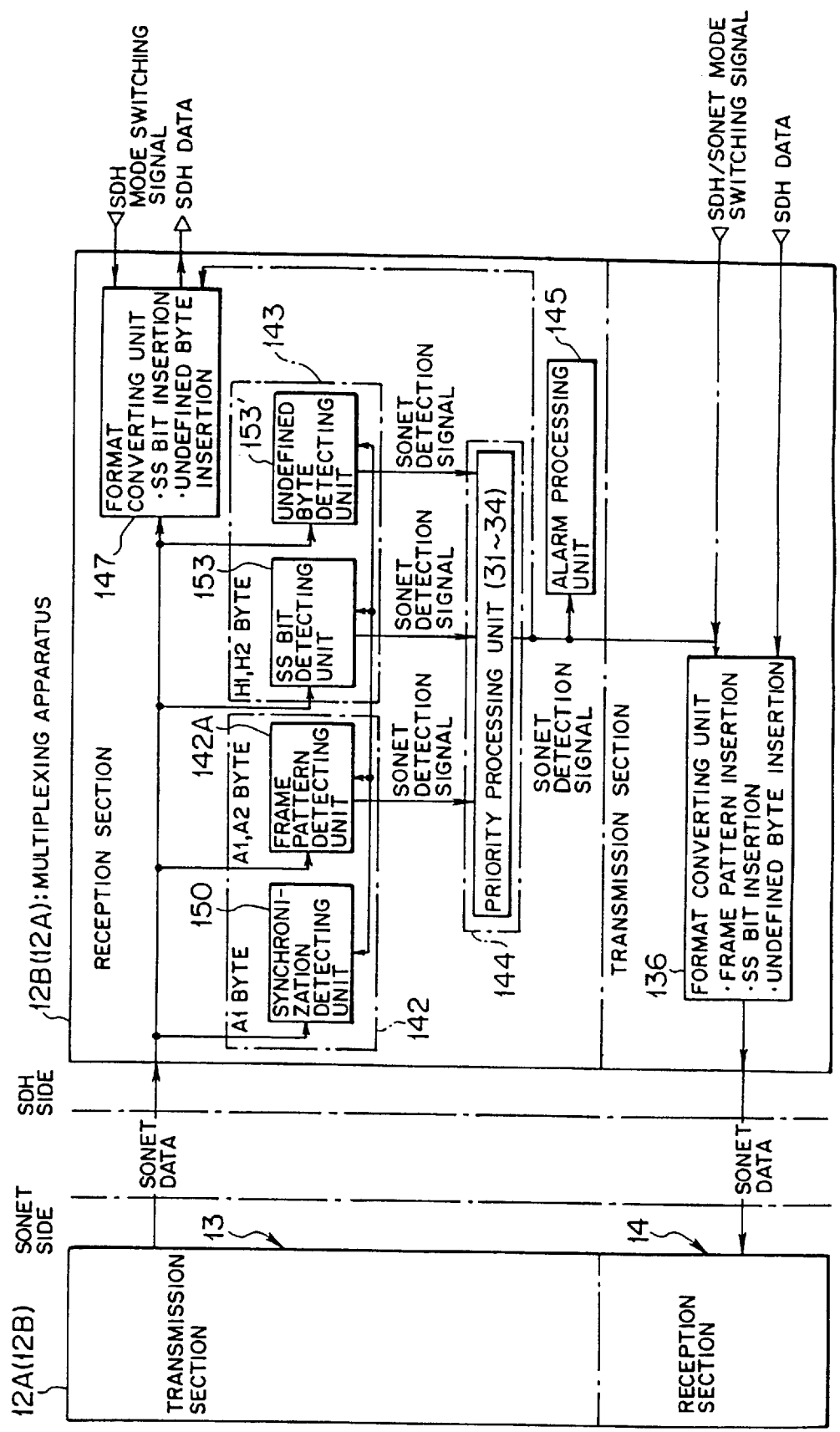
FIG. 7 is a block diagram showing an example of application of the multiplexing apparatus according to the present embodiment.
Figure 8:
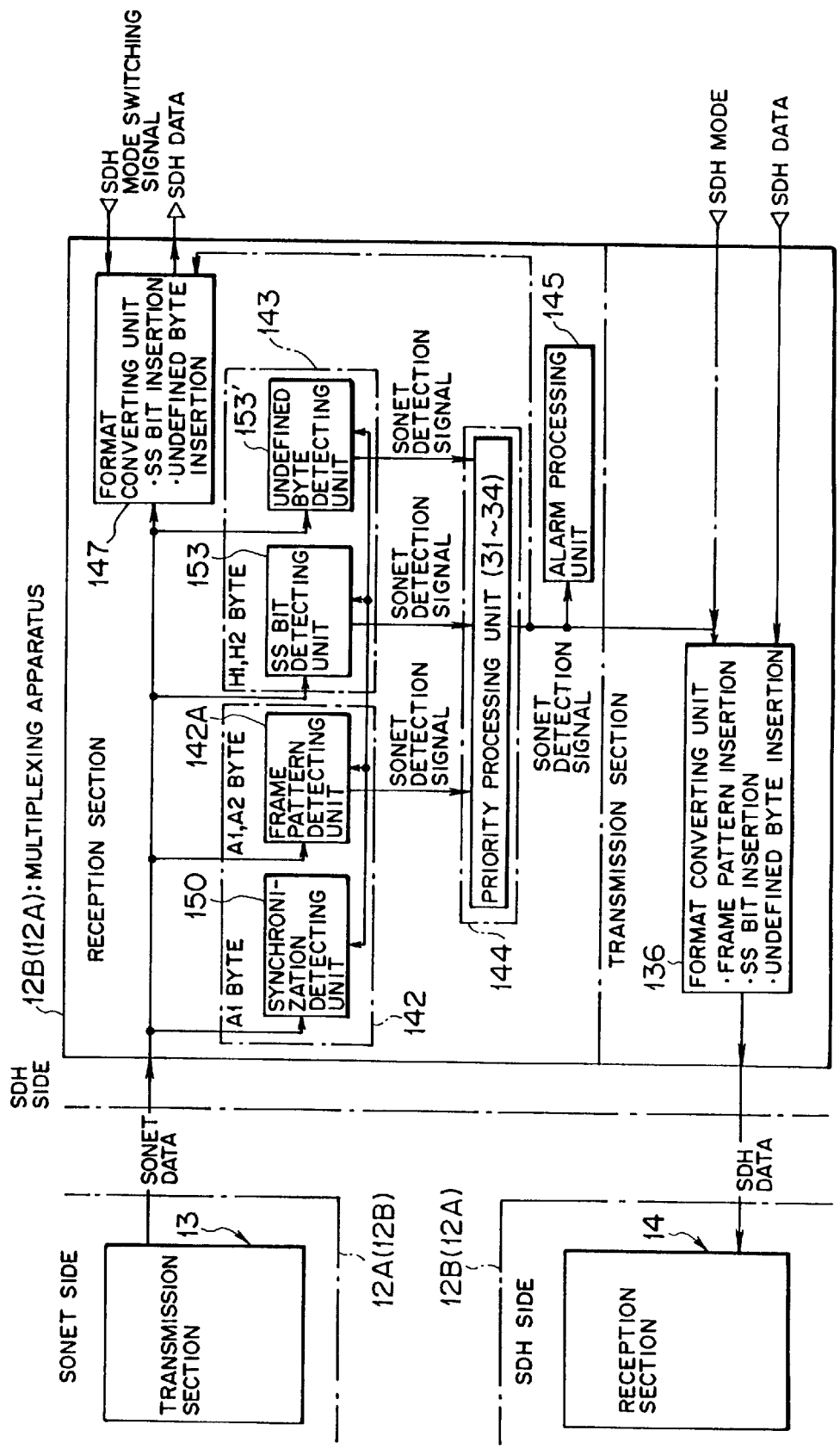
FIG. 8 is a block diagram showing an example of application of the multiplexing apparatus according to the present embodiment.

Accordingly, when the multiplexing apparatus 12A (12B) is used, apparatuses of different systems, for example, apparatuses of the SDH system and the SONET system, can be connected with each other so as to operate them, as shown in FIG. 6 and FIG. 7. In addition, even when a plurality of apparatuses of the SDH system and the SONET system mixedly exist as counterparts, as shown in FIG. 8, these apparatuses can be connected with each other so as to operate them. Each multiplexing apparatus serving as a counterpart may be a multiplexing apparatus identical to the multiplexing apparatus 12A (12B) of the present embodiment, as shown in FIG. 6–FIG. 8. Alternatively, the multiplexing apparatus serving as a counterpart may be an existing multiplexing apparatus.

Next, the multiplexing apparatus 12A (12B) will be described in more detail.

Figure 9:
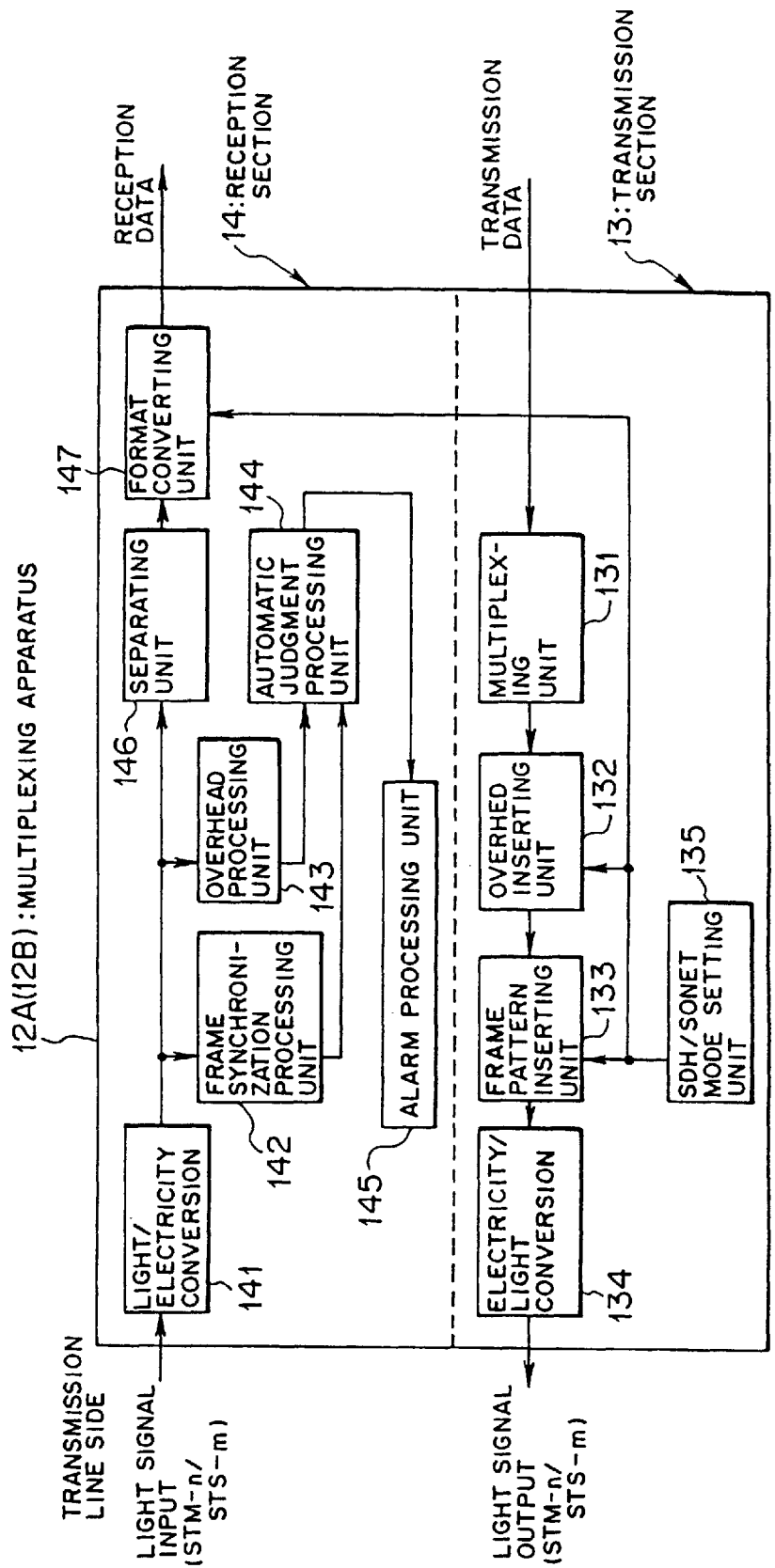
FIG. 9 is a block diagram showing the detailed structure of the multiplexing apparatus according to the present embodiment.

FIG. 9 is a block diagram showing the detailed structure of the above-described multiplexing apparatus 12A (12B). The multiplexing apparatus 12A (12B) shown in FIG. 9 includes a transmission section (transmission interface section) 13 which is provided at a position where the apparatus of the SDH system and the apparatus of the SONET system face each other and adapted to transmit a signal toward the apparatus of the different system, and a reception section (reception interface section) 14 which is provided at a position where the apparatus of the SDH system and the apparatus of the SONET system face each other and adapted to receive a signal from the apparatus of the different system.

The transmission section 13 comprises a multiplexing unit 131, an overhead inserting unit 132, a frame pattern inserting unit 133 and an electricity/light converting unit 134, and an SDH/SONET mode setting unit 135. The reception section 14 comprises a light/electricity converting unit 141, a frame synchronization processing unit 142, an overhead processing unit 143, an automatic judgment processing unit 144, an alarm (ALARM) processing unit 145, a separating unit 146, and a format converting unit 147.

In the transmission section 13, the multiplexing unit 131 multiplexes a plurality of STM-1 signals (or STS-3c signals) transmitted from the STM-1 format converting apparatus 11A (or STS-3c format converting apparatus 11B) so as to obtain an STM-n signal (or STS-m signal). The overhead insertion processing unit (overhead information inserting unit) 132 performs insertion of various kinds of overhead information, previously described with reference to FIG. 4, in accordance with the mode (SDH mode or SONET mode) set by the SDH/SONET mode setting unit 135, which will be described later.

The frame pattern inserting unit (frame synchronization information inserting unit) 133 performs insertion of a frame synchronization pattern (frame synchronization information A1 and A2: see FIG. 4) corresponding to the mode set by the SDH/SONET mode setting unit 135. The electricity/light converting unit 134 converts the STM-n signal (electrical signal) into a light signal so as to generate transmission data. The SDH/SONET mode setting unit (mode setting unit) 135 sets a mode suitable for the apparatus of the counterpart system.

In the reception section 14, the light/electricity converting unit 141 converts the STM-n signal (or STS-m signal)

inputted through a transmission line (mainly an optical fiber) into an electrical signal. The frame synchronization processing unit (frame synchronization information detecting unit) 142 detects the frame synchronization information from a reception signal (signal from the different system). The overhead processing unit (overhead information detecting unit) 143 performs processing for receiving various kinds of overhead bytes, and detects overhead information from the reception signal.

The automatic judgment processing unit (judging unit) 144 judges the kind of the apparatus of the counterpart system based on the frame synchronization information detected by the frame synchronization processing unit 142 and the overhead information detected by the overhead processing unit 143. The alarm processing unit 145 performs processing for generating an alarm or processing for cancelling the generation of an alarm based on the result of judgment by the automatic judgment processing unit 144.

The separating unit 146 separates the STM-n signal (or STS-m signal), which is a multiplexed signal transmitted from the apparatus of the counterpart system, into a plurality of STM-1 signals (STS-3c signals) which correspond to those existing before multiplexing. The format converting unit (format conversion processing unit) 147 performs format conversion processing for the reception signal in accordance with a mode set by the mode setting unit 135.

That is, when attention is paid on the transmission side, the multiplexing apparatus 12A (12B) shown in FIG. 9 comprises the transmission section (transmission interface section) 13, the SDH/SONET mode setting unit 135, the overhead inserting unit 132 and the frame pattern inserting unit 133, both provided in the transmission section 13. When attention is paid on the reception side, the multiplexing apparatus 12A (12B) comprises the reception section (reception interface section) 14, the frame synchronization processing unit 142 and the overhead processing unit 143, both provided in the reception section 14, the automatic judgment processing unit 144, the alarm processing unit 145, and the format converting unit 147 provided in the reception section 14.

In FIG. 9, the SDH/SONET mode setting unit 135 is provided in the transmission section 13, and the automatic judgment processing unit 144 and the alarm processing unit 145 are provided in the reception section 14. However, these units are not necessarily required to be provided in the transmission section 13 and the reception section 14.

The operation of the multiplexing apparatuses 12A and 12B having the above-described structure will be described in detail by using an example in which data (STM-n signals) are transmitted from the STM-1 format converting apparatus 11A, which is an apparatus of the SDH system, to the STS-3c format converting apparatus 11B, which is an apparatus of the SONET system, via the multiplexing apparatuses 12A and 12B.

In each of the multiplexing apparatus 12A and 12B, a mode suitable for the apparatus of the counterpart system is first set by the SDH/SONET mode setting unit 135. In the present example, the format converting apparatus 11A connected to the multiplexing apparatus 12A is an apparatus of the SDH system, while the STS-3c format converting apparatus 11B opposed to the multiplexing apparatus 12A is an apparatus of the SONET system. Therefore, the SDH mode is set in the transmission section 13 of the multiplexing apparatus 12A and the SONET mode is set in the reception section 14 of the multiplexing apparatus 12A. In contrast, the SONET mode is set in the transmission section 13 of the multiplexing apparatus 12B and the SDH mode is set in the reception section 14 of the multiplexing apparatus 12B.

When an STM-1 signal whose format has been converted into a format shown in FIG. 4 by the STM-1 format converting apparatus 11A is inputted to the transmission section 13 of the multiplexing apparatus 12A, for example, the multiplexing unit 131 of the multiplexing apparatus 12A multiplexes the STM-1 signal together with other simultaneously inputted STM-1 signals, so that an STM-n signal is obtained.

After that, overhead information (C1, B1, E1, F1, D1–D3, etc.) and frame synchronization information (A1 and A2) corresponding to the SDH mode set by the SDH/SONET mode setting unit 135 are inserted into the STM-n signal by the overhead inserting unit 132 and the frame pattern inserting unit 133. The STM-n signal (electrical signal) is converted to a light signal by the electricity/light converting unit 134 and is transmitted to the counterpart multiplexing apparatus 12B.

When the STM-n signal from the multiplexing apparatus 12A (apparatus of the different system) is received by the reception section 14 of the multiplexing apparatus 12B, the STM-n signal (reception signal: light signal) is converted into an electrical signal by the light/electricity converting unit 141. After that, frame synchronization information (A1 and A2) and overhead information are detected from the reception signal by the frame synchronization processing unit 142 and the overhead processing unit 143.

In the automatic judgment processing unit 144, the kind (SDH in this example) of the apparatus of the counterpart system is judged based on the frame synchronization information detected by the frame synchronization processing unit 142 and the overhead information detected by the overhead processing unit 143. In the alarm processing unit 145, processing for generating an alarm or processing for cancelling the alarm is performed based on the result of judgment by the automatic judgment processing unit 144.

In detail, when the result of the judgment in the automatic judgment processing unit 144 indicates that abnormality exists in information included in the STM-1 signal excepting for the frame synchronization information (A1 and A2) or the overhead information, processing for generating an alarm is performed. However, when only the format of a part of the STM-n signal such as the frame synchronization information (A1 and A2) and the overhead information differs from the format defined in the system at the same side, processing for cancelling an alarm is performed.

After that, in the frame synchronization processing unit 142 and the overhead processing unit 143, frame synchronization processing, overhead processing and the like are performed for the received STM-n signal in a conventional manner, in accordance with the mode (SDH mode) corresponding to the result of judgment. In the separating unit 146, the STM-n signal is separated into a plurality of STM-1 signals which correspond to those existing before multiplexing.

For the respective STM-1 signals, format conversion processing corresponding to the mode (SONET mode) set by the SDH/SONET mode setting unit 135 is performed by the format converting unit 147. With this operation, the format of the STM-1 signals for SDH is converted into the format of STS-3c signals for SONET.

As a result, the multiplexing apparatus 12B to which an apparatus of the SONET system is connected can normally receive a signal from the apparatus of the different system, i.e., the SDH system, without producing an alarm signal.

When a signal is reversely transmitted from the multiplexing apparatus 12B (apparatus of the SONET system) to the multiplexing apparatus 12A (apparatus of the SDH system), the format of STS-3c signals for SONET are converted into the format of the STM-1 signals for SDH by the format converting unit 147 in the reception section 14 of the multiplexing apparatus 12A. As a result, a signal from an apparatus of the different system, i.e., the SONET system can be normally received without producing an alarm signal.

Accordingly, when the multiplexing apparatuses (SDH/SONET interconnection interface apparatuses) 12A and 12B according to the embodiment of the present invention are used, it becomes possible to considerably easily interconnect the apparatuses of the different systems (the SDH system and the SONET system) so as to operate them, while following the standards of SDH/SONET, which interconnection was originally impossible because of generation of an alarm caused by difference in part of information (frame synchronization information, overhead information, etc.) contained in the format of the transmission and reception signals (STM-n signal and STS-m signal) which are exchanged between the multiplexing apparatuses 12A and 12B. Such difference in the information is produced due to difference in the standard between SDH and SONET.

(b1-1) First Modification of Multiplexing Apparatus

Figure 10:
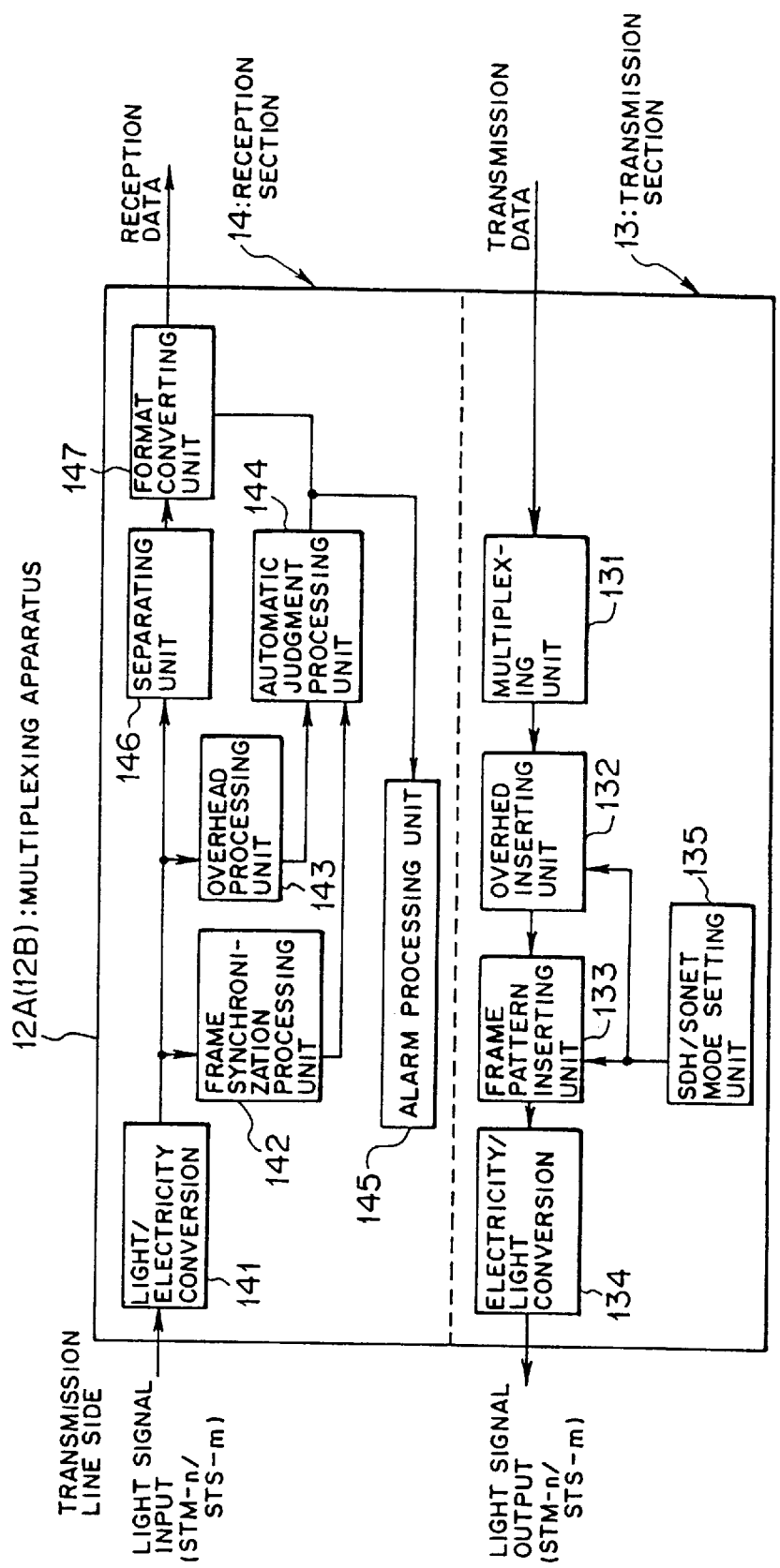
FIG. 10 is a block diagram showing a first modification of the multiplexing apparatus according to the present embodiment.

FIG. 10 is a block diagram showing a first modification of the multiplexing apparatus 12A (12B) which has been described with reference to FIG. 9. In the multiplexing apparatus 12A (12B) shown in FIG. 10, the transmission section (transmission interface section) 13 comprises a multiplexing unit 131, an overhead inserting unit 132, a frame pattern inserting unit 133, an electricity/light converting unit 134, and an SDH/SONET mode setting unit 135. The reception section (reception interface section) 14 comprises a light/electricity converting unit 141, a frame synchronizing unit 142, an overhead processing unit 143, an automatic judgment processing unit 144, an alarm (ALARM) processing unit 145, a separating unit 146, and a format converting unit 147. These units are the identical to the units shown in FIG. 9.

The multiplexing apparatus 12A (12B) differs from that shown in FIG. 9 in that the format converting unit 147 does not perform processing corresponding to the mode set by the SDH/SONET mode setting unit 135, but performs processing corresponding to the result of automatic judgment in the automatic judgment processing unit 144.

Therefore, in the multiplexing apparatus 12A (12B) according to the present modification, the kind (SDH system or SONET system) of the apparatus of the counterpart system is judged by the automatic judgment processing unit 144 based on the reception signal (STM-n signal or STS-m signal). Subsequently, format conversion processing (process for format conversion from an STS-1 signal to an STM-3c signal, or from an STM-3c signal to an STS-1 signal) corresponding to the result of judgment in the automatic judgment processing unit 144 is performed by the format converting unit 147. As a result, a signal from an apparatus of the different system, i.e., the SONET or SDH system can be normally received without producing an alarm signal.

The remaining portions perform the same processing as the processing described in relation to FIG. 9, and the alarm processing unit 145 also performs processing for cancelling an alarm in this case.

Accordingly, even when the multiplexing apparatuses 12A and 12B according to the present modification are used, it becomes possible to considerably easily interconnect the apparatuses of the different systems (the SDH system and the SONET system) so as to operate them, while following the standards of SDH/SONET, which interconnection was originally impossible because of generation of an alarm.

(b1-2) Second Modification of Multiplexing Apparatus

Figure 11:
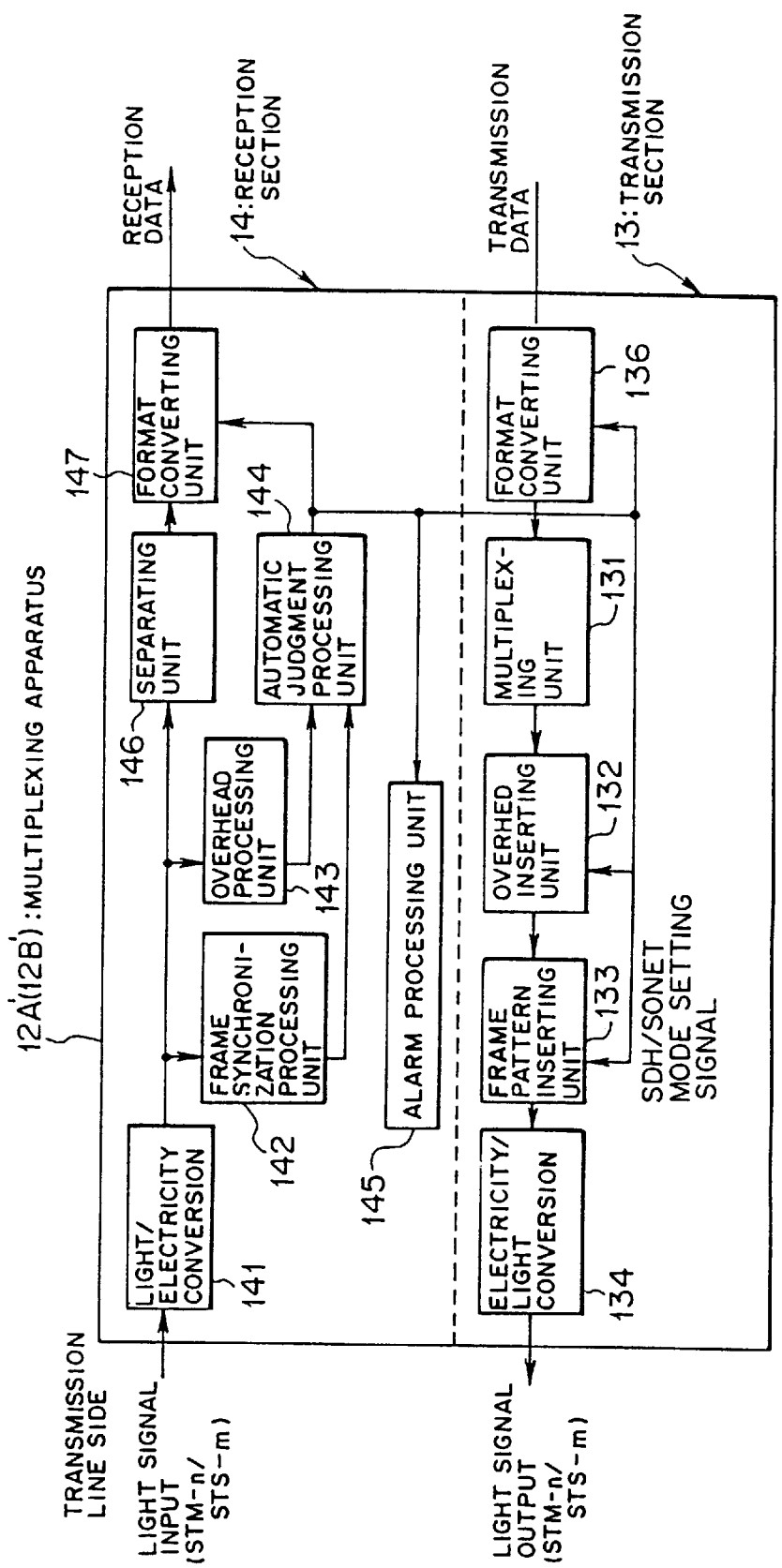
FIG. 11 is a block diagram showing a second modification of the multiplexing apparatus according to the present embodiment.
Figure 12:
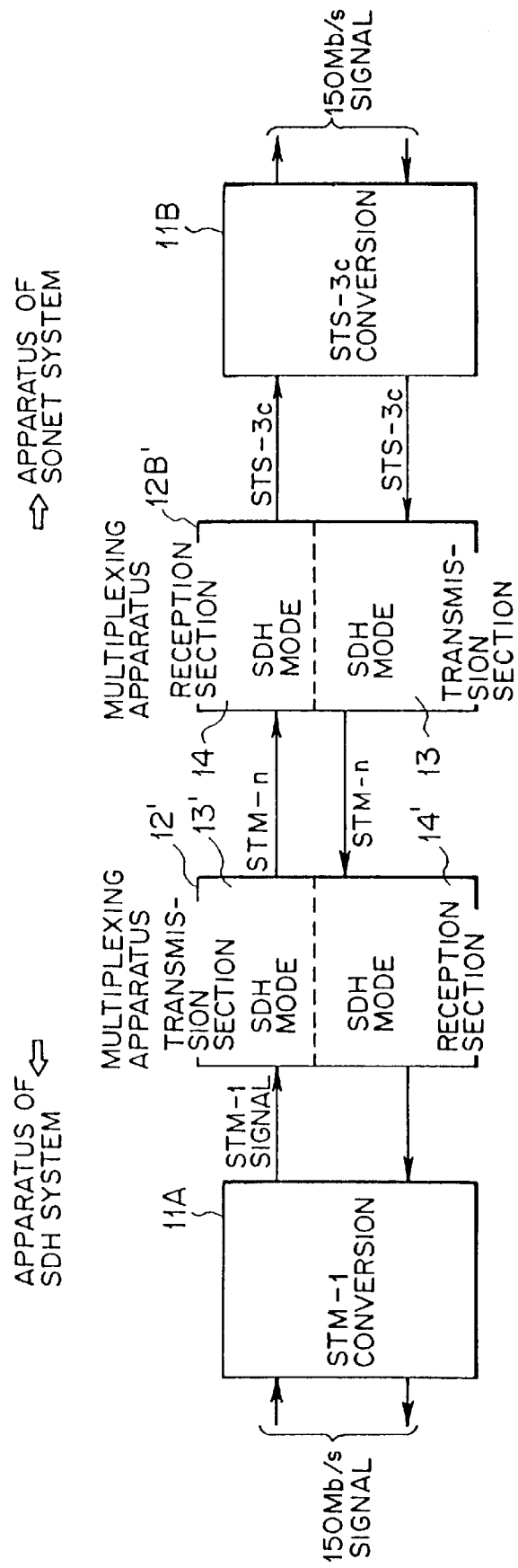
FIG. 12 is a diagram for explaining the operation of the multiplexing apparatus according to the present embodiment.

FIG. 11 is a block diagram showing a second modification of the multiplexing apparatus 12A (12B) which has been described with reference to FIG. 9. In the multiplexing apparatus 12A' (12B') shown in FIG. 11, the transmission section 13 comprises a multiplexing unit 131, an overhead inserting unit 132, a frame pattern inserting unit 133, and an electricity/light converting unit 134. These units are identical to the units shown in FIG. 9 or FIG. 10. The transmission section 13 of the present modification further comprises a format converting unit 136. The reception section 14 has the same structure as that previously described with reference to FIG. 10.

That is, when attention is paid on the transmission side, the multiplexing apparatus 12A' (12B') shown in FIG. 11 comprises the transmission section (transmission interface section) 13, the overhead inserting unit (overhead information inserting unit) 132, the frame pattern inserting unit (frame synchronization information inserting unit) 133, and the format converting unit (second format converting unit) 136. When attention is paid on the reception side, the multiplexing apparatus 12A' (12B') comprises the reception section (reception interface section) 14, the frame synchronization processing unit (frame synchronization information detecting unit) 142, the overhead processing unit (overhead information detecting unit) 143, the automatic judgment processing unit (judging unit) 144, the alarm processing unit 145, and the format converting unit (first format conversion processing unit) 147.

Like the multiplexing apparatus 12A (12B) shown in FIG. 10, the multiplexing apparatus 12A' (12B') has such a structure that the overhead inserting unit 132 and the frame pattern inserting unit 133 of the transmission section 13 and the format converting unit 147 of the reception section 14 perform processing corresponding to the result of judgment (kind of the apparatus of the counterpart system) by the automatic judgment processing unit 144. Further, the format converting unit 136 added to the transmission section 13 also performs processing corresponding to the result of judgment by the automatic judgment processing unit 144.

The operation of the multiplexing apparatuses 12A' and 12B' of the present modification having the above-described structure will be described. When the reception section 14 receives an STM-1 signal or an STS-m sinal from the apparatus of the counterpart different system, the frame synchronization information (A1 and A2) and overhead information are detected from the reception signal (STM-n or STS-m signal) by the frame synchronization processing unit 142 and the overhead processing unit 143. By the automatic judgment processing unit 144, the kind (SDH or SONET) of the apparatus of the counterpart system is judged based on the frame synchronization information (A1 and A2) detected by the frame synchronization processing unit 142 and the overhead information detected by the overhead processing unit 143.

In the alarm processing unit 145, processing for generating an alarm or processing for cancelling the alarm is performed based on the result of judgment by the automatic judgment processing unit 144. In detail, when the result of judgement by the automatic judgment processing unit 144 indicates that only the format of a part of the frame synchronization information (A1 and A2) and the overhead information differs from the format of the system at the same side, the alarm processing unit 145 performs processing for cancelling an alarm. After that, in the frame synchronization processing unit 142 and the overhead processing unit 143, processing is continued in the mode (SDH mode or SONET mode) corresponding to the result of judgment by the automatic judgment processing unit 144.

Moreover, in the format converting unit 147, the reception signal (STM-n or STS-m signal) undergoes format conversion processing corresponding to the mode judged by the automatic judgment processing unit 144. As a result, a signal from the apparatus of the different system can be normally received without producing an alarm signal.

When a signal is transmitted from the transmission section 13 to the apparatus of the counterpart different system, format conversion processing corresponding to the mode judged by the automatic judgment processing unit 144 is first performed for the transmission signal (STM-1 or STS-3c signal) by the format converting unit 136. Subsequently, the transmission signal is multiplexed by the multiplexing unit 131 to obtain an STM-n or STS-m signal.

Frame synchronization information (A1 and A2) and overhead information, both corresponding to the mode judged by the automatic judgment processing unit 144, are inserted into the STM-n or STS-m signal by the overhead inserting unit 132 and the frame pattern inserting unit 133. With this operation, the STM-n or STS-m signal is converted into a signal having a format suitable for the apparatus of the counterpart different system. After that, the STM-n or STS-m signal is converted into a light signal by the electricity/light converting unit 134 to be transmitted to the counterpart system.

That is, in order to operate in the same state as that of the apparatus of the counterpart system (SDH or SONET), the multiplexing apparatus 12A' (12B') of the present modification takes advantage of the fact that the SDH system (STM-1) and the SONET system (STS-3c) differ from each other in the standard regarding part of the format of a signal received from the apparatus of the counterpart system. The multiplexing apparatus 12A' (12B') causes the automatic judgment processing unit 144 to judge, based on the reception signal, whether the counterpart system is SDH or SONET so as to set the transmission section 13 of the system at the same side into the same mode as that of the reception section 14 [In the multiplexing apparatus 12A (12B) shown in FIG. 9 or FIG. 10, the mode of the transmission section 13 is arbitrarily set by the SDH/SONET mode setting unit 135].

An example is assumed in which an STM-1 format converting apparatus 11A, which is an apparatus of the SDH system, and an STS-3c format converting apparatus 11B, which is an apparatus of the SONET system, are provided at a position where they face each other, and in which an existing multiplexing apparatus 12' for SDH is connected to the STM-1 format converting apparatus 11A while the above-described multiplexing apparatus 12B' is connected to the STS-3c format converting apparatus 11B.

When transmission is performed from the apparatus of the SDH system (multiplexing apparatus 12') to the apparatus of the SONET system (multiplexing apparatus 12B'), an STM-n signal, which has been obtained by multiplexing STM-1 signals, is transmitted from the transmission section 13' of the multiplexing apparatus 12' toward the apparatus of the counterpart system (SONET system), because the multiplexing apparatus 12' is of the SDH system. In the multiplexing apparatus 12B' which has received the STM-n signal, the automatic judgment processing unit 144 judges from the reception signal that the apparatus of the counterpart system is SDH. After that, the transmission section 13 and the reception section 14 are both set into the SDH mode automatically.

Subsequently, in the transmission section 13, the received STM-n signal is subjected to frame synchronization processing, overhead processing and the like performed in the SDH mode by the frame synchronization processing unit 142 and the overhead processing unit 143 and is converted into an STS-m signal, which is then transmitted to the apparatus of the SONET system.

When transmission is performed from the apparatus of the SONET system (multiplexing apparatus 12B') to the apparatus of the SDH system (multiplexing apparatus 12'), STS-3c signals of SONET are transmitted from the STS-3c format converting apparatus 11B. However, since the transmission section 13 of the multiplexing apparatus 12B' is set so as to perform processing corresponding to the result of judgment (SDH mode) in the automatic judgment processing unit 144, the STS-3c signals are converted into STM-1 signals of SDH and then multiplexed for transmission.

With this operation, the reception section 14' of the existing multiplexing apparatus 12' serving as a counterpart can normally receive the signal from the apparatus of the SONET system by ordinary processing, without performing special processing such as format conversion from STS-3c signals to STM-1 signals.

Accordingly, even when the existing multiplexing apparatus 12' for SDH is connected to the apparatus of the SDH system, the apparatuses of the different systems, i.e., the SDH system and the SONET system, can be connected with each other so as to operate them by connecting the multiplexing apparatus 12B' according to the present modification to the apparatus of the counterpart SONET system. This eliminates the necessity of considering whether the system of the apparatus connected as a counterpart is SDH or SONET system, and greatly contributes to the flexibility in constructing a network.

Figure 13:
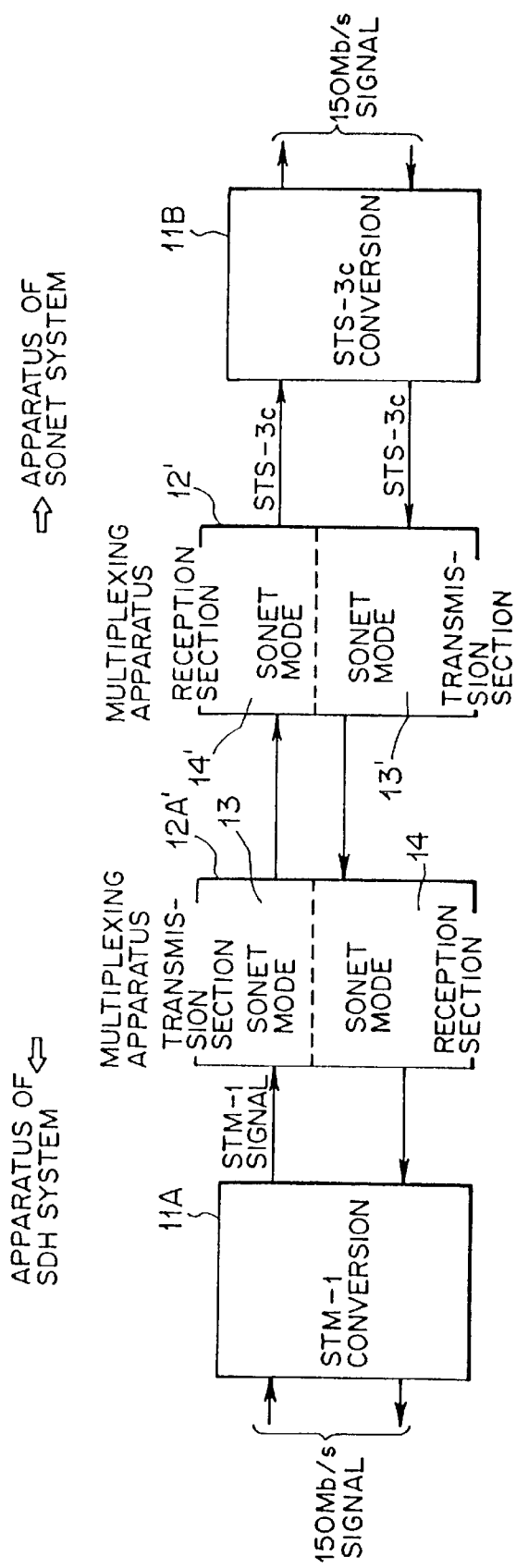
FIG. 13 is a diagram for explaining the operation of the multiplexing apparatus according to the present embodiment.

Even when the existing multiplexing apparatus 12' for SONET is connected to the apparatus of the SONET system (STS-3c format converting apparatus 11B) contrary to the above-described case, as shown in FIG. 13, the apparatuses of the different systems, i.e., the SDH system and the SONET system, can be connected with each other so as to operate them if the multiplexing apparatus 12A' of the present modification is connected to the apparatus (STM-1 format converting apparatus 11A) of the counterpart SDH system.

(b2) Automatic Judgment Processing Unit

It has been described that the automatic judgment processing apparatus 144 judges the kind of the apparatus of the counterpart system from difference in the standard regarding the format of a part of the reception signal (STM-1, STS-3c). More specifically, the standards of SDH (STM-1 signals) and SONET (STS-3c signals) differ from each other at three points as has been described with reference to FIG. 37: (1) frame synchronization pattern (bytes A1 and A2) in a high speed mode equal to or higher than STM-64/STS-192; (2) definition of SS bits in pointer bytes (bytes H1 and H2) (the SS bits are "10" in SDH but "00" in SONET); and (3) definition of undefined bytes (the undefined bytes are all "1" in SDH but all "0" in SONET), which are included in the overhead information. The automatic judgment processing unit 144 judges whether the apparatus of the counterpart system is SOH or SONET system, taking advantage of the above-described differences in their standards.

Now, the automatic judgment by the automatic judgment processing unit 144 will be described in detail for the case (1) of utilizing difference in the frame synchronization pattern, the case (2) of utilizing difference in the definition of SS bits, and the case (3) of utilizing difference in the definition of undefined bytes.

(1) Case of Using Difference in Frame Synchronization Pattern

Figure 14:
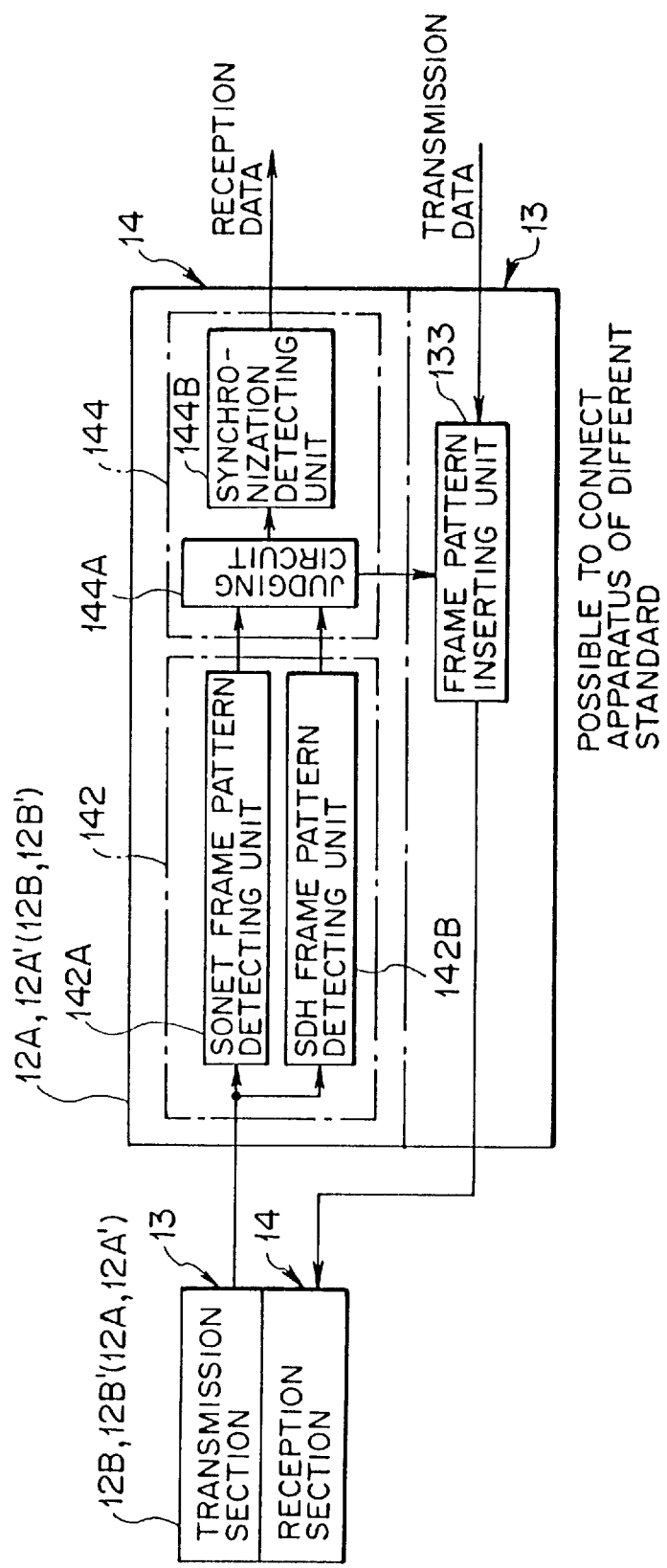
FIG. 14 is a block diagram showing the structure of a main portion of the multiplexing apparatus according to the present embodiment in the case where the multiplexing apparatus judges the kind of an apparatus of the counterpart system utilizing difference in the frame synchronization pattern.

FIG. 14 is a block diagram showing the structure of a main portion of the above-described multiplexing apparatus 12A, 12A' (or 12B, 12B') which utilizes difference in the frame synchronization pattern when the mode of the reception signal is high speed mode equal to or higher than STM-64/STS-192. As shown in FIG. 14, the frame synchronization processing unit 142 of the reception section 14 used in this case comprises a SONET frame pattern detecting unit 142A and an SDH frame pattern detecting unit 142B so as to detect frame patterns from both STS-3c signals of SONET and STM-1 signals of SDH. The automatic judgment processing unit 144 used in this case comprises a judging circuit 144A and a synchronization detecting unit 144B so as to judge the kind of the apparatus of the counterpart system using difference in the frame pattern detected by the SONET frame pattern detecting unit 142A or the SDH frame pattern detecting unit 142B.

Since FIG. 14 shows the structure of the main portion only, the light/electricity converting units 134 and 141, the overhead inserting unit 132, the overhead processing unit 143, the multiplexing unit 131, the separating unit 146, and the like shown in FIG. 9–FIG. 11 are omitted.

In the frame synchronization processing unit 142 of the reception section 14, the SONET frame pattern detecting unit 142A and the SDH frame pattern detecting unit 142B are selectively operated in accordance with the received STM-64 signal or STS-192 signal, and the frame synchronization pattern of the STM-64 signal or the STS-192 signal is detected.

The standards of the STM-64 signal and the STS-192 signal are shown in FIG. 15. When the STM-64 signal is received by the reception section 14, a frame pattern continuously including 192 framing bytes A1 and 192 framing bytes A2 is detected by the SDH frame pattern detecting unit 142B. When the STS-192 signal is received, a frame pattern continuously including 96 pairs of framing bytes A1 and inverted framing bytes $\overline{A1}$ and 96 pairs of framing bytes A2 and inverted framing bytes $\overline{A2}$ is detected by the SONET frame pattern detecting unit 142A.

In the automatic judgment processing unit 144, the kind (SDH or SONET) of the apparatus of the counterpart system is judged by the judging circuit 144A taking advantage of difference the frame pattern of the reception signal. In other words, in the automatic judgment processing unit 144, for example, the kind of the apparatus of the counterpart system is automatically judged by only receiving a signal from the apparatus of the counterpart system, without exchanging with the apparatus of the counterpart system a special signal or the like for judging the kind of the apparatus of the counterpart system.

With this operation, in the multiplexing apparatus 12A, 12A' (or 12B, 12B'), the reception section 14 or both the transmission section 13 and the reception section 14 are set into a mode judged by the automatic judgment processing unit 144, as described above, so that they perform processing corresponding to the result of the judgment. This makes it possible to normally receive a signal from a different system even in a high speed mode equal to or higher than STM-64/STS-192. In such a higher speed mode, it was impossible to establish communication because an alarm indicating lack of synchronization is generated due to difference in the frame pattern between SDH and SONET, as shown in FIG. 15.

Figure 16A:
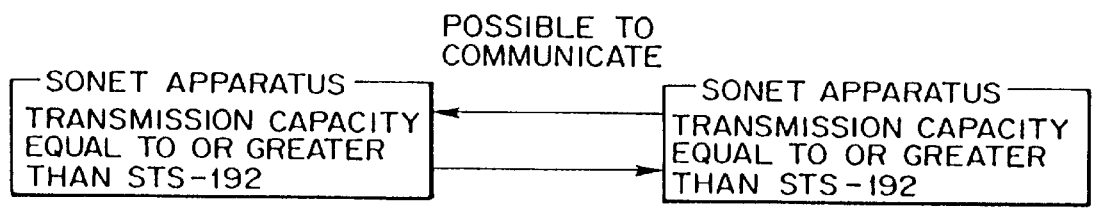
FIG. 16(a)–FIG. 16(c) are diagrams showing examples of communication patterns in which the multiplexing apparatus according to the present embodiment can provide interconnection.
Figure 16B:
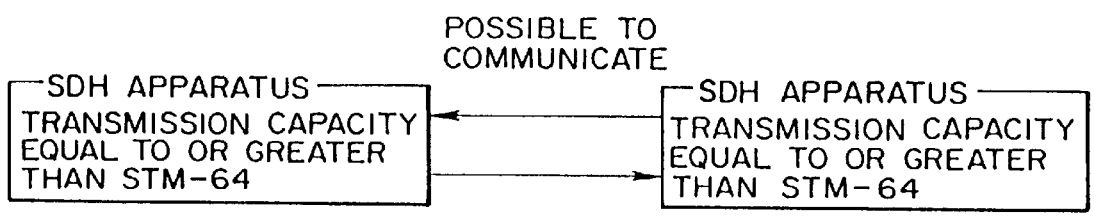
Figure 16C:
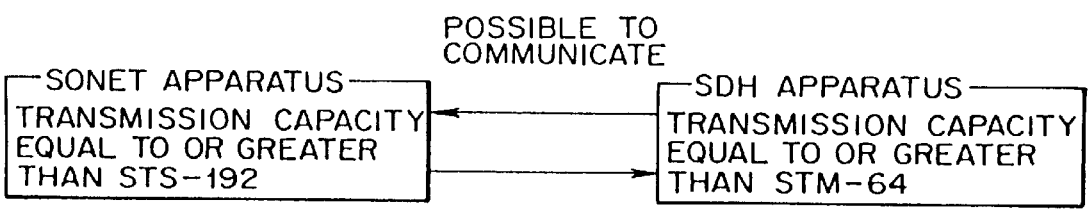

Accordingly, as shown in FIG. 16(a)–FIG. 16(c), it becomes possible to interconnect an apparatus of the SONET system with an apparatus of the SDH system so as to operate them, as well as to establish interconnection between apparatuses of the same system, i.e., the SONET system or the SDH system so as to operate them.

When the mode of the reception signal is a mode equal to or lower than STM-64/STS-192, the frame synchronization pattern of SDH and the frame synchronization pattern of SONET are identical to each other, as shown in FIG. 37. In this case, the kind of the apparatus of the counterpart system can be judged using difference in the definition of SS bits or undefined bytes, as will be described in detail hereinafter.

(2) Case of Using Difference in Definition of SS bits

Figure 17:
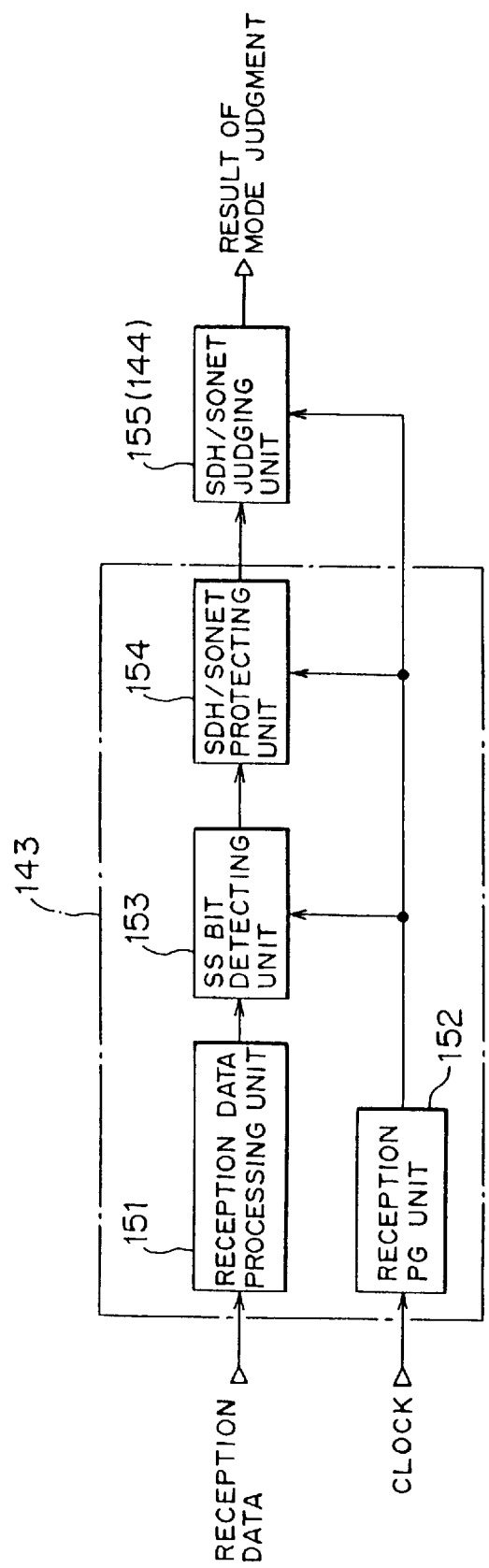
FIG. 17 is a block diagram showing the structure of the reception section in the case where the multiplexing apparatus according to the present embodiment judges the kind of the apparatus of the counterpart system utilizing difference in the definition of SS bits.

FIG. 17 is a block diagram showing the structure of the reception section 14 when the kind of the apparatus of the counterpart system is judged taking advantage of the fact that SDH and SONET differ from each other in the definition of SS bits within the frame formats of SDH/SONET reception signals. In the reception section 14 shown in FIG. 17, the overhead processing unit 143 comprises a reception data processing unit 151, a reception pulse generating unit (reception PG unit) 152, an SS bit detecting unit 153 and an SDH/SONET protecting unit 154, and the automatic judgment processing unit 144 comprises an SDH/SONET judging unit 155.

The reception data processing unit 151 extracts SS bits included in bytes H1 and H2 (see FIG. 4) of the LOH (Line Overhead) within the frame format of the reception data (STM-n or STS-3c). The reception pulse generating unit 152 generates timing pulses for commanding the timing of judging operation to the SS bit detecting unit 153, the SDH/SONET protecting unit 154, and SDH/SONET judging unit 155.

The SS bit detecting unit 153 detects whether the values of the SS bits conform to the SDH standard ("10") or the SONET standard ("00"), using the timing pulses generated by the reception pulse generating unit 152. The SDH/SONET protecting unit 154 protects the output of the SS bit detecting unit 153. The SDH/SONET judging unit 155 judges whether the apparatus of the counterpart system is of the SDH system or the SONET system based on the data protected by the SDH/SONET protecting unit 154 and outputs the result of the judgment as a result of mode judgment for judging whether the mode is SDH or SONET.

That is, in the reception section 14 in this case, the overhead processing unit (overhead information detecting unit) 143 comprises an SS bit detecting unit 153 for detecting SS bit information, while the automatic judgment processing apparatus 144 judges the kind of the apparatus of the counterpart system based on difference in the SS bit information detected by the SS bit detecting unit 153 of the overhead processing unit 143.

In the reception section 14, the data of SS bits included in bytes H1 and H2 of the LOH are extracted from reception data (the frame format of SDH/SONET) by the reception data processing unit 151. The extracted SS bit data are supplied to the SS bit detecting unit 153 in which it is detected whether the apparatus of the counterpart system is of the SDH system or the SONET system, using timing pulses which are generated by the reception pulse generating unit 152 and indicate the positions of the SS bits within the LOH.

The detected result is protected by the SDH/SONET protecting unit 154, and based on the protected result, it is judged by the SDH/SONET judging unit 155 whether the received data is an STM-n signal transmitted in the SDH mode or an STS-m signal transmitted in the SONET mode. The result of this judgment is output as a result of mode judgment.

Accordingly, the kind of the apparatus of the counterpart system can automatically be judged by only receiving a signal from the apparatus of the counterpart system, without exchanging with the apparatus of the counterpart system a judging signal or the like for judging the kind of the apparatus of the counterpart system.

Figure 18:
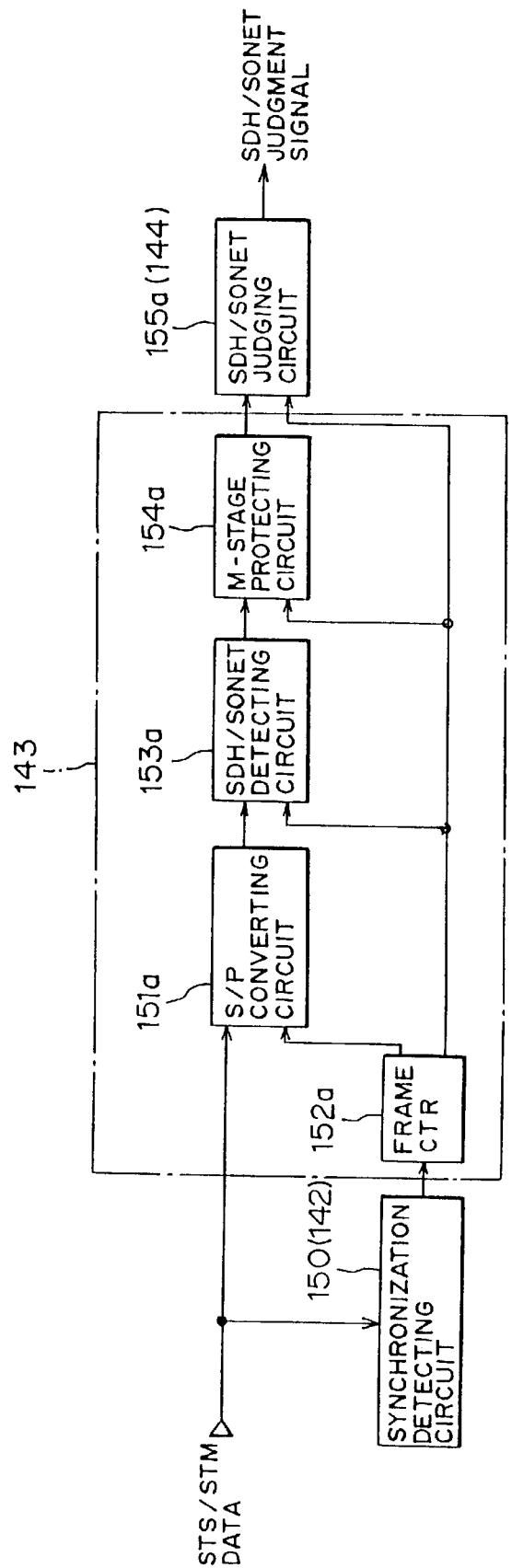
FIG. 18 is a block diagram showing the structure of the reception section in the case where the multiplexing apparatus according to the present embodiment judges the kind of the apparatus of the counterpart system utilizing difference in the definition of SS bits.

FIG. 18 is a block diagram showing a concrete example of the overhead processing unit 143 and the automatic judgment processing unit 144 (SDH/SONET judging unit 155) previously described with reference to FIG. 17. As shown in FIG. 18, the reception data processing unit 151, the reception pulse generating unit 152, the SS bit detecting unit 153, the SDH/SONET protecting unit 154, and the SDH/SONET judging unit 155 are formed by a serial/parallel (S/P) converting circuit 151a, a frame counter (frame CTR) 152a, an SDH/SONET detecting circuit 153a, an M-stage protecting circuit 154a and an SDH/SONET judging circuit 155a, respectively.

The synchronization detecting circuit 150 corresponds to the frame synchronization processing unit 142 shown in FIG. 9–FIG. 11, and detects frame synchronization of reception data (STS/STM data) so as to establish data synchronization.

Figure 19:
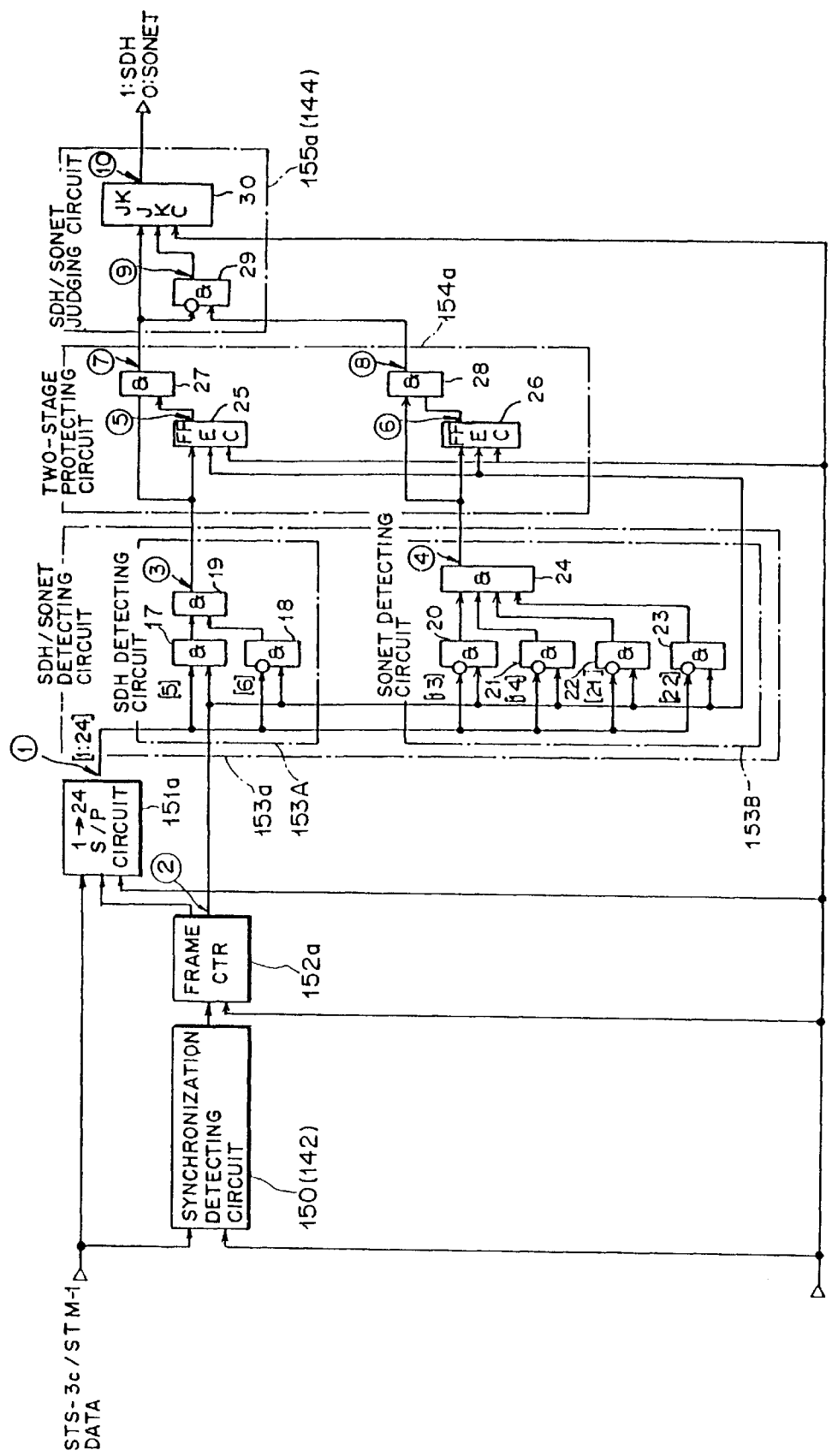
FIG. 19 is a block diagram showing the detailed structure of the reception section in the case where the multiplexing apparatus according to the present embodiment judges the kind of the apparatus of the counterpart system utilizing difference in the definition of SS bits.

Further, as shown in FIG. 19, the serial/parallel (S/P) converting circuit 151a consists of a circuit for converting serial reception data (STM-1/STS-3c) into 24 sets of parallel data. The SDH/SONET detecting circuit 153a consists of an SDH detecting circuit 153A formed by AND (&) gates 17–19, and a SONET detecting circuit 153B formed by AND (&) gates 20–24. The AND gates 18 and 20–23 are the type having one noninverted input and one inverted input.

The M-stage protecting circuit 154a is constructed as a two-stage protecting circuit consisting of flip flop (FF) circuits 25 and 26 and AND (&) gates 27 and 28. The SDH/SONET judging circuit 155a consists of AND (&) gate 29 and a J-K flip flop (JK) circuit 30.

The synchronization detecting circuit 150 detects the frame leading position (frame synchronization pattern) of the reception signal (STS-3c or STM-1) and informs the frame counter 152a of the detected frame leading position. The frame counter 152a generates timing pulses for H1 byte detection in accordance with the frame leading position informed by the synchronization detecting circuit 150 and supplies the timing pulses to the S/P (serial/parallel) converting circuit 151a, the SDH/SONET detecting circuit 153a, the M-stage (two-stage) protecting circuit 154a and the SDH/SONET judging circuit 155a, respectively. The timing pulses are used to detect-SS bit information included in the byte H1 (see FIG. 4) within the overhead.

In this case, the S/P converting circuit 151a converts the reception signal into 24 sets of parallel data in accordance with the timing pulses from the frame counter 152a. In the SDH detecting circuit 153A and the SONET detecting circuit 153B, the AND gates 17–19 and the AND gates 20–24 perform operations for obtaining logical product of the timing pulses for H1 byte detection supplied from the frame counter 152a and part of the reception signal which has undergone serial/parallel conversion by the S/P converting circuit 151a. As a result, SS bit information is detected according to the timing pulses from the frame counter 152a. Based on the detected SS bit information, it is detected whether the received signal is an STM-1 signal from an apparatus of the SDH system or an STS-3c signal from an apparatus of the SONET system.

In the two-stage protecting circuit 154a, the flip flop circuit 25 and the AND gate 27 or the flip flop circuit 26 and the AND gate 28 provide two-stage protection for the result of the detection by the SDH detecting circuit 153A or the SONET detecting circuit 153B so as to prevent the occurrence of bit shift (bit error) of the reception data (reception signal). The SDH/SONET judging circuit 155a judges, based on the reception data protected by the two-stage protection circuit 154, whether the data is an STM-1 signal of SDH or an STS-3c signal of SONET. In this case, when the result of the mode judgment indicates that the reception data is an STM-1 signal of SDH, "1" is output from the J-K flip flop circuit 30, and when the result of the mode judgment indicates that the reception data is an STS-3c signal of SONET, "0" is output from the J-K flip flop circuit 30.

Next, the operation of the above-described circuits 150 and 151a–155a for judging the mode of the apparatus of the counterpart system will be described in detail. In the following description, the detection timing corresponds to the position of SS bits. That is, for the SDH mode, a point in time when the SS bits of the leading CH (channel) is "10" is used as the detection timing. For the SONET mode, a point in time when the SS bits of the next CH is "00" is used as the detection timing.

In the synchronization detecting circuit 150, the leading position of the frame is detected from the reception data (STS-3c or STM-1 signal), and this frame leading position is notified to the frame counter 152a. The frame counter 152a generates timing pulses for H1 byte detection in accordance with the notified frame leading position. In the S/P conversion circuit 151a, the reception data are converted into 24-bit parallel data in accordance with the timing pulses generated by the frame counter 152a. The parallel data are then outputted to the SDH/SONET detecting circuit 153a.

An example is assumed in which two frames of data including #1-SS bits (="10"), #2-SS bits (="00") and #3-SS bits (="00") are inputted as reception data, as shown in FIGS. 20(a)–20(f). Signals (①) shown in FIGS. 20(a)–20(f) are first inputted from the S/P converting circuit 151a to the SDH/SONET detecting circuit 153a as reception data ([5], [6], [13], [14], [21], [22]), and timing pulses for H1 byte detection (②) shown in FIG. 20(g) are inputted from the frame counter 152a to the SDH/SONET detecting circuit 153a.

The above-described symbols [5], [6], [13], [14], [21] and [22] represent the data inputted from the S/P converting circuit 151a to the AND gates 17, 18, and 20–23, as shown in FIG. 19.

In the SDH detecting circuit 153A of the SDH/SONET detecting circuit 153a, the AND gates 17–19 obtain logical product of the reception data ([5] and [6]) and the timing pulses for H1 byte detection. As a result, #1-SS bits (="10") are detected as an SDH detection signal (③) shown in FIG. 20(h).

Simultaneously with this, in the SONET detecting circuit 153B, the AND gates 20–24 obtain logical product of the reception data ([13], [14], [21] and [22]) and the timing pulses for H1 byte detection (②). As a result, #2-SS bits (="00") and #3-SS bits (="00") are detected as a SONET detection signal (④) shown in FIG. 20(i).

Figure 20:
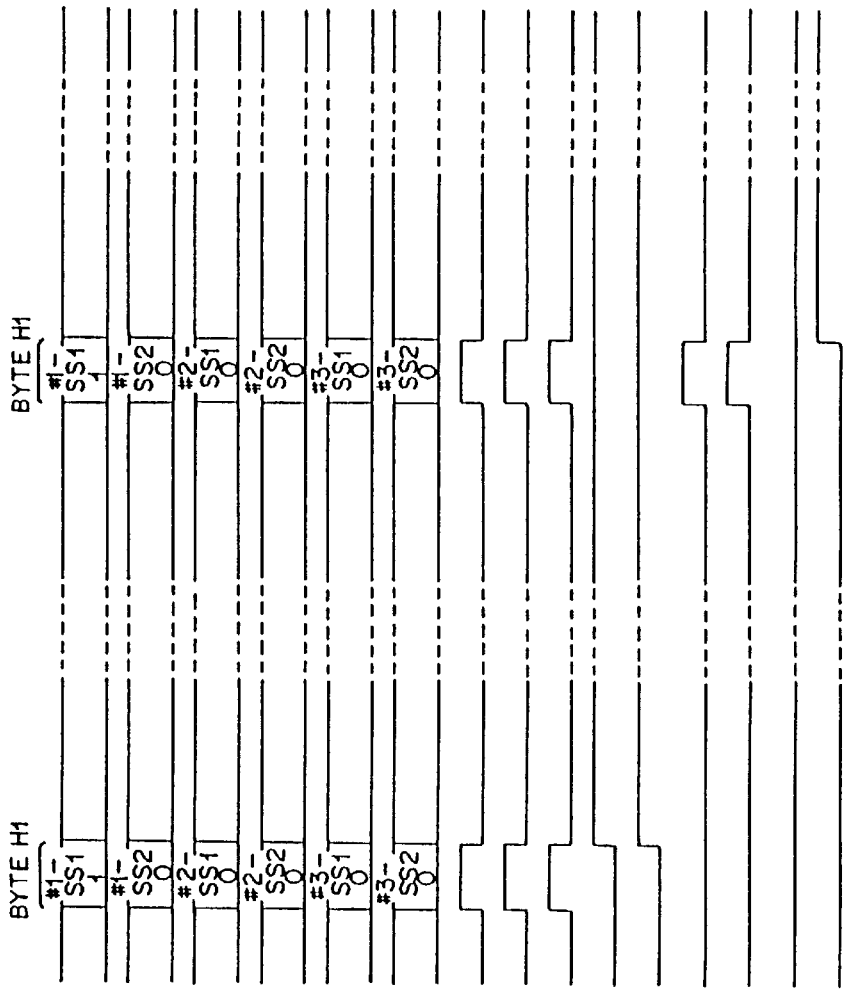
FIG. 20(a)–FIG. 20(o) are timing charts for explaining the operation of the multiplexing apparatus according to the present embodiment for judging the kind of the apparatus of the counterpart system utilizing difference in the definition of SS bits.

With this operation, the SDH detection signal (③) and the SONET detection signal (④) shown in FIG. 20(h) and FIG. 20(i) are inputted into the two-stage protection circuit 154a, so that signals shown in FIG. 20(j) and FIG. 20(k) are outputted from the flip flop circuits 25 and 26 as detection information of SDH and SONET and (⑤) and (⑥), and signals (⑦) and (⑧) shown in FIG. 20(l) and FIG. 20(m) are outputted from the AND gates 27 and 28, respectively.

The signals (⑦) and (⑧) shown in FIG. 20(l) and FIG. 20(m) are inputted to the AND gate 29 having one inverted input in the SDH/SONET judging circuit 155a, so that a signal (⑨) shown in FIG. 20(n) is outputted from the AND gate 29. Consequently, a signal (SDH: 1, SONET: 0) shown in FIG. 20(o) is output from the J-K flip flop circuit 30 as a result of judgment, thereby judging the kind of the apparatus of the counterpart system.

(3) Case of Using Difference in Undefined Bytes

Figure 21:
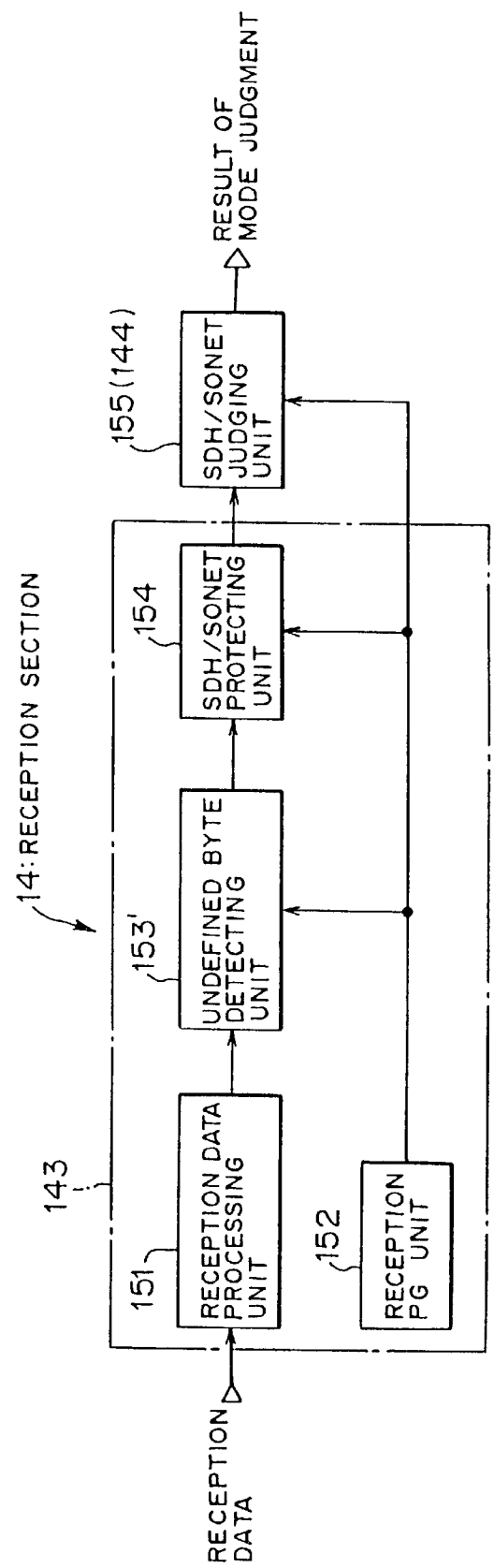
FIG. 21 is a block diagram showing the structure of the reception section in the case where the multiplexing apparatus according to the present embodiment judges the kind of the apparatus of the counterpart system utilizing difference in the definition of an undefined byte.
Figure 22:
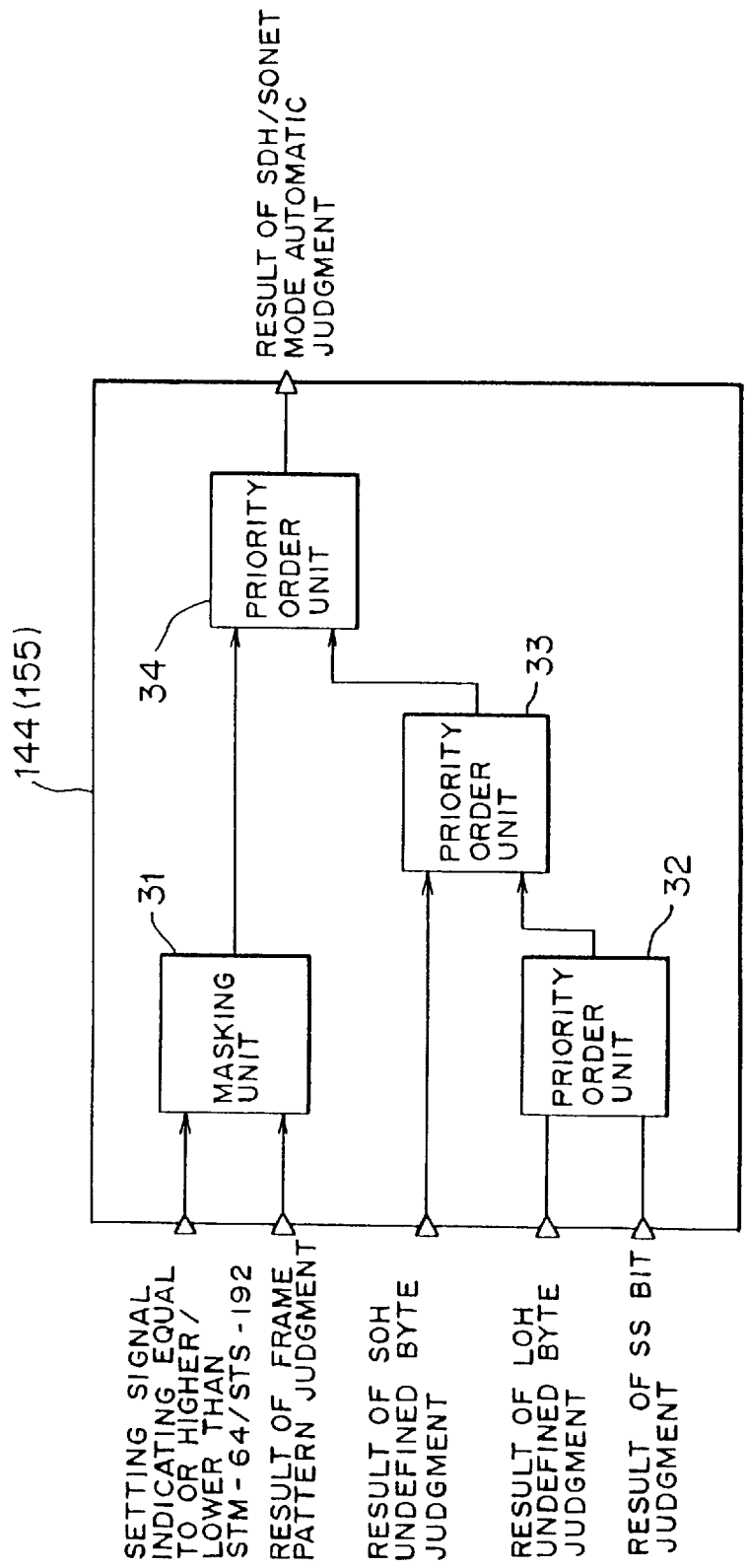
FIG. 22 is a block diagram showing the structure of the reception section in the case where the multiplexing apparatus according to the present embodiment judges the kind of the apparatus of the counterpart system in accordance with the order of priority.

FIG. 21 is a block diagram showing the structure of an example of the reception section 14 when the kind of the apparatus of the counterpart system is judged taking advantage of the fact that SDH and SONET differ from each other in the value of undefined bytes within the frame formats of reception signals (STM-1/STS-3c). In the reception section 14 shown in FIG. 21, the overhead processing unit 143 comprises an unidentified byte detecting unit 153' instead of the SS bit detecting unit 153 shown in FIG. 18.

The unidentified byte detecting unit 153' judges, using timing pulses generated by the reception pulse generating unit (reception PG unit) 152, whether the value of unidentified bytes of the SOH and LOH within the frame format of a reception signal is "1", which is the standard of SDH, or "0", which is the standard of SONET.

That is, in the reception section 14 in this case, the overhead processing unit (overhead information detecting unit) 143 comprises the undefined byte detecting unit 153' for detecting undefined byte information, while the automatic judgment processing unit 144 judges the kind of the apparatus of the counterpart system based on difference in the undefined byte information detected by the undefined byte detecting unit 153' of the overhead processing unit 143.

In the reception section 14, unidentified byte information is extracted from reception data (the frame format of STM-1/STS-3c) by the reception data processing unit 151. The extracted unidentified byte information is supplied to the unidentified byte detecting unit 153' in which it is detected whether the standard of the unidentified byte information conform to SDH ("1") or SONET ("0"), using the timing pulses which are generated by the reception pulse generating unit 152 and represent the positions of unidentified bytes in the SOH and LOH.

The result of the detection in the unidentified byte detecting unit 153' is subjected to protection processing by the SDH/SONET protecting unit 154 so as to prevent occurrence of a bit error of data or the like, and is supplied to the SDH/SONET judging unit 155 in which it is judged whether the received data is an STM-1 signal of SDH or an STS-3c signal of SONET. The result of this judgment is output as a result of automatic judgment regarding the mode (SDH mode/SONET mode).

Accordingly, the kind of the apparatus of the counterpart system can automatically be judged by only receiving a signal from the apparatus of the counterpart system, without exchanging with the apparatus of the counterpart system a judging signal or the like for judging the kind of the apparatus of the counterpart system.

When the structure of the reception section 14 shown in FIG. 19 is employed and the timing pulses generated by the frame counter 152 are set not to be timing pulses for detecting SS bits but to be timing pulses for detecting undefined bytes, the kind of the apparatus of the counterpart system can be automatically judged by a similar operation.

Also, in the circuits described in the sections (2) and (3), the kind of the apparatus of the counterpart system is judged utilizing difference in the SS bit information detected by the SS bit detecting unit 153 in the overhead processing unit 143 or the undefined byte information detected by the undefined byte detecting unit 153' in the overhead processing unit 143. However, the kind of the apparatus of the counterpart system may be judged utilizing difference in both the SS bit information detected by the SS bit detecting unit 153 and the undefined byte information detected by the undefined byte detecting unit 153'.

(4) Others

The automatic judgments which have been described in the sections (1)–(3) and which utilize difference in the frame synchronization pattern in a high speed mode equal to or higher than STM-64/STS-192, the SS bits, and the unidentified bytes may be used in combination.

For example, when a masking unit 31 and priority order units 32–34 are provided in the automatic judgment processing unit 144 (SDH/SONET judging unit 155), it becomes possible to select a result of judgment having the highest priority among the results of mode judgment which are obtained by utilizing difference in the frame synchronization pattern in a high speed mode equal to or higher than STM-64/STS-192, the SS bits, and the unidentified bytes.

When reception data has a transmission speed (mode) lower than that of STM-64/STS-192, the frame synchronization pattern of the overhead information is the same in both the SDH mode and the SONET mode, as shown in FIG. 23. Therefore, the masking unit 31 invalidates a result of mode judgment obtained based on difference in the frame pattern (hereinafter referred to as a "result of the frame pattern judgment"), thereby removing it from the judging conditions. Unlike the frame synchronization pattern, SDH and SONET differ from each other in the standard regarding unidentified byte information and SS bit information of the LOH/SOH, as shown in FIG. 23, whether the transmission speed of the reception signal is equal to or higher/lower than that of STM-64/STS-192.

The priority order unit 32 puts the order of priority on the result of mode judgment obtained utilizing the fact that SDH and SONET differ from each other in undefined bytes of the LOH (hereinafter referred to as a "result of the LOH undefined byte judgment") and the result of mode judgment obtained utilizing difference in SS bit information (hereinafter referred to as a "result of the SS bit judgment"). The priority order unit 32 then outputs a judgment result having a higher priority as an effective result of mode judgment. The priority order unit 33 puts the order of priority on the result of mode judgment which is outputted with priority from the priority order unit 32 and the result of mode judgment obtained utilizing difference in unidentified bytes of the SOH. The priority order unit 33 then outputs a judgment result having a higher priority as an effective result of mode judgment in a manner similar to the above.

The priority order unit 34 puts the order of priority on the result of mode judgment which is outputted with priority from the priority order unit 33 and the result of mode judgment outputted from the masking unit 31, and outputs a result of judgment having a higher priority as an effective result of mode judgment in a manner similar to the above. When the masking unit 31 is set to a mode for signals lower than the STM-64/STS-192, the result of mode judgment obtained utilizing difference in the frame synchronization pattern is invalidated, so that the result of mode judgment from the priority order unit 33 is outputted as a result of mode judgment having a higher priority.

That is, in the reception section 14 in this case, the overhead processing unit 143 comprises the SS bit detecting unit 153 for detecting SS bit information and the undefined byte detecting unit 153' for detecting undefined byte information, while the automatic judgment processing unit 144 puts the order of priority on the frame pattern detected by the frame synchronization processing unit 142 (see FIG. 9–FIG. 11), SS bit information detected by the SS bit detecting unit 153 in the overhead processing unit 143, undefined byte information detected by the undefined byte detecting unit 153' in the overhead processing unit 143 and judges the kind of the apparatus of the counterpart system by utilizing information having a high priority.

When the received data has a transmission speed equal to or less than that of STM-64/STS-192, the frame pattern detected by the frame synchronization processing unit 142 is the same in SDH and SONET. Therefore, the masking unit 31 of the automatic judgment processing unit 144 is first set to a mode for signals lower than STM-64/STS-192 so as to invalidate the result of the frame pattern judgment.

In the priority order unit 32, the result of the LOH unidentified byte judgment and the result of the SS bit judgment are compared with each other. When they differ from each other, the result of the LOH unidentified byte judgment is given a higher priority and the result is outputted to the priority order unit 33. In the priority order unit 33, the result of the SOH unidentified byte judgment and the result of judgment outputted, with priority, from the priority order unit 32 are compared with each other. When they differ from each other, the result of the SOH unidentified byte judgment is given a higher priority and the result is outputted to the priority order unit 34.

In the priority order unit 34, the frame pattern judgment result and the result of judgment outputted, with priority, from the priority order unit 33 are compared with each other. In this case, since the result of the frame pattern judgment is invalidated by the masking unit 31 because the masking unit 31 is set to a mode for signals lower than the STM-64/STS-192, the result of judgment from the priority order unit 33 is outputted as a result of the SDH/SONET mode automatic judgment.

Accordingly, even when the reception signal has a transmission speed less than that of STM-64/STS-192 and the frame pattern is the same as that of the apparatus of the counterpart system, the kind of the apparatus of the counterpart system can be judged securely and automatically, taking advantage of the fact that SDH and SONET differ from each other in SS bit information and unidentified byte information.

When the reception signal has a transmission speed equal to or greater than that of STM-64/STS-192, i.e., when the reception signal is of a high speed mode, the result of the frame pattern judgment becomes an effective result of mode judgment. However, since SDH and SONET have different frame patterns for signals equal to or higher than STM-64/STS-192, as shown in FIG. 24(c) and FIG. 24(d), the signal pulls out from the synchronized state before the result of the frame pattern judgment is obtained if frame synchronization is established by monitoring two bytes or four bytes at the boundary between the byte A1 and the byte A2 as in an ordinary state. The bytes A1 and A2 indicate the leading position of the frame, and fixed data (A1:F6, A2:28) are always included therein for establishing frame synchronization.

Figure 25:
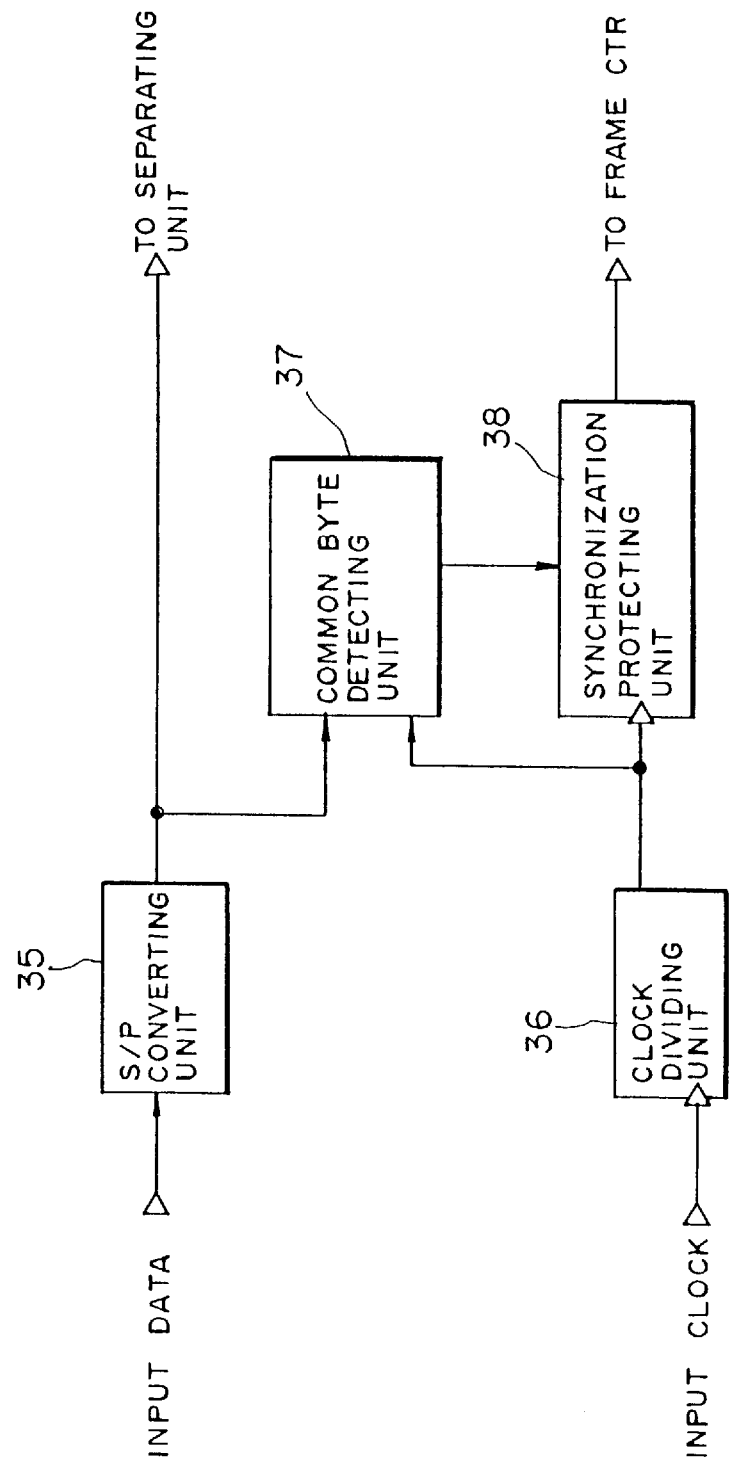
FIG. 25 is a block diagram showing the structure of the multiplexing apparatus in the case where the multiplexing apparatus according to the present embodiment detects only common information of the frame pattern.

In the present embodiment, frame synchronization is established by detecting and monitoring only bytes (common information) A1 and A2, which is common to SDH and SONET and is indicated by arrows (dotted portions) in FIG. 24(c) and FIG. 24(d), among the flame petters (frame synchronization information) which varies between SDH and SONET. Therefore, the frame synchronization processing unit 142 shown in FIG. 9–FIG. 11 (frame detecting circuit 150 in FIG. 18) comprises an S/P (serial/parallel) converting unit 35, a clock dividing unit 36, a common byte detecting unit 37, and a synchronization protecting unit 38 as shown in FIG. 25.

The S/P converting unit 35 converts inputted serial data (reception data: STM or STS) into a plurality sets of parallel data. The clock dividing unit 36 divides the inputted clocks as the speed of the reception data is reduced by the S/P converting unit 35.

The common byte detecting unit 37 detects and monitors alternate bytes of the frame pattern in the reception data, which have undergone serial/parallel conversion by the S/P converting unit 35, in accordance with clocks which are obtained by frequency division by the clock dividing unit 36, and outputs a frame pattern detection signal when a specific frame pattern in which bytes A1 (F6) and A2 (28) appear in this order is found. The synchronization protecting unit 38 performs protection of M stages in forward and N stages in backward (M and N are each a natural number) for the frame pattern detection signal detected by the common byte detecting unit 37, and then performs correct detection of the frame pattern. The result of the detection is transmitted to the frame counter.

Figure 26:
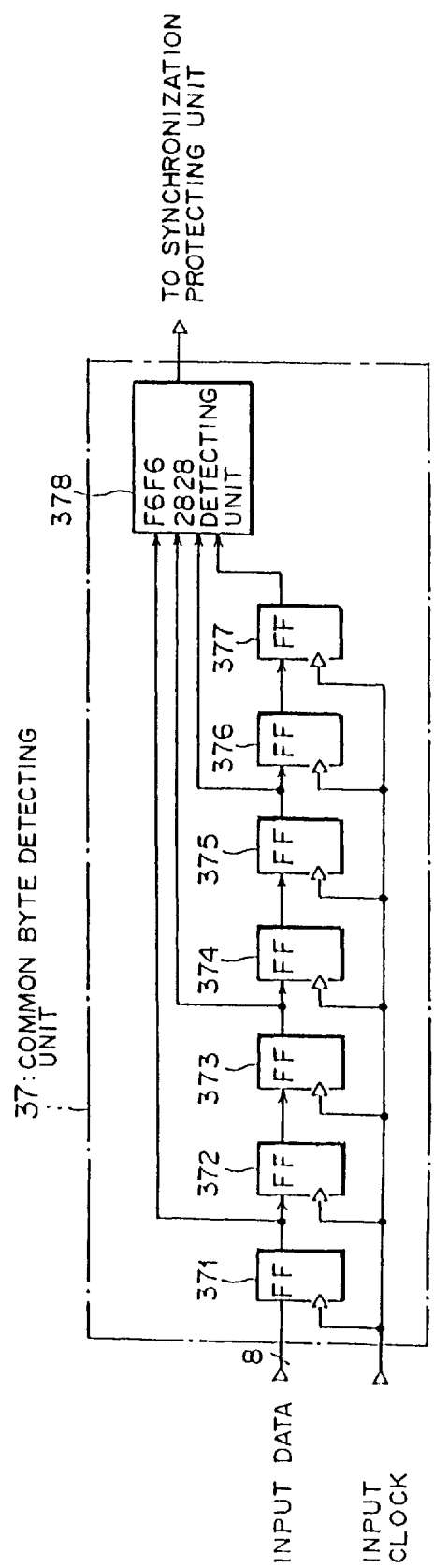
FIG. 26 is a block diagram showing the detailed structure of a common byte detecting unit of the multiplexing apparatus of the present embodiment.

The common byte detecting unit 37 comprises shift registers (FF) 371–377, and a specific frame pattern detecting unit 378, as shown in FIG. 26, so as to monitor alternate bytes of input data and thereby detects the specific frame pattern. Each of the shift registers 371–377 gives input data a shift (delay) corresponding to one byte. The specific frame pattern detecting unit 378 detects whether data at alternate four points among input data which are shifted by the respective shift registers 371–377 form a specific frame pattern in which A1, A1, A2 and A2 (F6F62828) appear in this order.

In the frame synchronization processing unit 142 having the above-described structure, input data (serial data) is first converted into parallel data by the S/P converting unit 35 so as to handle the input data byte by byte. At this time, the clock dividing unit 36 divides the inputted clocks as the speed of the data decreases due to the S/P conversion by the S/P converting unit 35.

The parallel data obtained by the S/P conversion in the S/P converting unit 35 are sent to the separating unit 146. Simultaneously with this, the frame pattern is monitored by the common byte detecting unit 37.

Specifically, in the common byte detecting unit 37, the inputted data are first shifted by the respective registers 371–377 of seven stages. Four sets of data from the shift resister 371 at the first stage (8 bits), the shift resister 373 at the third stage, the shift resister 375 at the fifth stage and the shift resister 377 at the seventh stage among the shift registers 371–377 are inputted to the specific frame pattern detecting unit 378.

When the specific frame pattern detecting unit 378 detects that the four sets of data form a specific frame pattern in which A1, A1, A2 and A2 (F6F62828) appear in this order, it generates a frame pattern detection signal and sends it to the synchronization protecting unit 38. In the synchronization protecting unit 38, protection of M stages in forward and N stages in backward is performed for the detection signal. After that, the frame pattern is correctly detected, and the result of the detection is sent to the frame counter 152 (see FIG. 18 and FIG. 19) so as to continue subsequent processing.

As a result, even when a signal which has a transmission speed equal to or greater than that of the STM-64/STS-192 and for which SDH and SONET have different standards regarding the frame pattern is received, the signal does not pull out of synchronized state. Therefore, the signal from the apparatus of the counterpart system can always be received normally.

Figure 27:
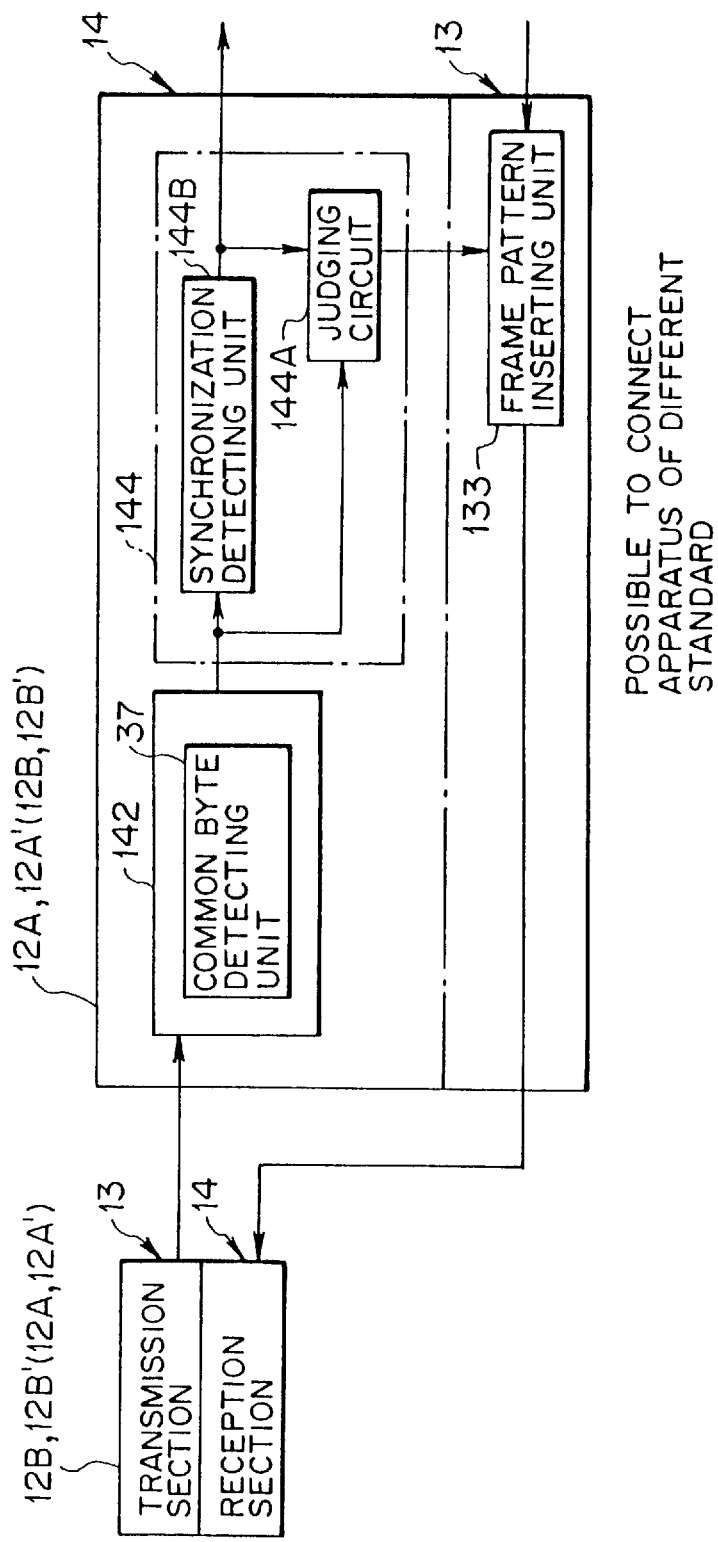
FIG. 27 is a block diagram showing the structure of a main portion of the multiplexing apparatus of the present embodiment in which the common byte detecting unit is utilized.

For example, when the above-described frame synchronization processing unit 142 having the common byte detecting unit 37 is used in the multiplexing apparatus 12A, 12A' (or 12B, 12B': see FIG. 9–FIG. 11), as shown in FIG. 27, frame synchronization can be established normally for both a signal equal to or higher than STM-64 of SDH and a signal equal to or higher than STS-192 of SONET for which SDH and SONET have different standards regarding the frame pattern, without using the SONET frame pattern detecting unit 142A and the SDH frame pattern detecting unit 142B as shown in FIG. 14. Accordingly, the frame synchronization processing unit 142 which can cope with both SDH and SONET can be realized in a simplified structure.

In this case, the operation in the automatic judgment processing unit 144 may be modified such that frame synchronization information (bytes A1 and A2 or inverted bytes $\overline{A1}$ and $\overline{A2}$) or overhead information (SS bit information, undefined byte information) are detected in accordance with pulses [FIG. 28(d)] indicating judging byte positions which are shifted by one byte from the detection pulses [FIG. 28(c)] which are generated for alternate bytes so as to detect common bytes A1 and A2 at positions indicated by dotted portions in FIG. 28(a) and FIG. 28(b). In this case, even when a signal equal to or higher than STM-64 of SDH or a signal equal to or higher than STS-192 of SONET is received, the kind of the apparatus of the counterpart system can be automatically judged, after frame synchronization is normally established, taking advantage of the fact that the frame synchronization information and the overhead information vary between SDH and SONET.

That is, in the multiplexing apparatus 12A, 12A' (12B, 12B') in this case, the frame synchronization processing unit 142 has such a structure as to detect only common bytes A1 and A2 among frame synchronization information which varies between SDH and SONET, such as bytes A1 and A2 and inverted bytes $\overline{A1}$ and $\overline{A2}$, and the automatic judgment processing unit 144 has such a structure as to judge the kind of the apparatus of the counterpart system based on the overhead information (A1 and A2, SS bits or undefined bytes) detected by the overhead processing unit 143 (see FIG. 9–FIG. 11).

Accordingly, even when the frame synchronization information of the reception signal is different from the standard of the apparatus of the system at the same side, the kind of the apparatus of the counterpart system can be judged considerably easily without generating an alarm.

(b3) Format Converting Unit

Next, the format converting unit 136, 147 which has been described with reference to FIG. 9–FIG. 11 will be described in detail.

As has been described in relation to FIG. 9–FIG. 11, format conversion corresponding to an SDH mode/SONET mode previously set by the SDH/SONET mode setting unit 135 or corresponding to a result (SDH mode/SONET mode) of mode judgment in the above-described automatic judgment processing unit 144 is performed in the format converting unit 147 of the reception section 14 or the format converting unit 136 of the transmission section 13. When a signal from the apparatus of the counterpart system is received, the format conversion is performed differently depending on the speed of the signal. As described above, SDH and SONET have different standards regarding bytes A1 and A2 (frame pattern) of LOH (for the case where the reception data is equal to or higher than STM-64/STS-192), SS bit information contained in bytes H1 and H2 of LOH, and undefined byte information in SOH and LOH.

Therefore, when the reception data is equal to or higher than STM-64/STS-192, the format converting units 136 and 147 must convert all of these pattern and information into the format of SDH/SONET. When the reception data is lower than STM-64/STS-192, the format converting units 136 and 147 must convert SS bit information and undefined byte information into the format of SDH/SONET.

Figure 29:
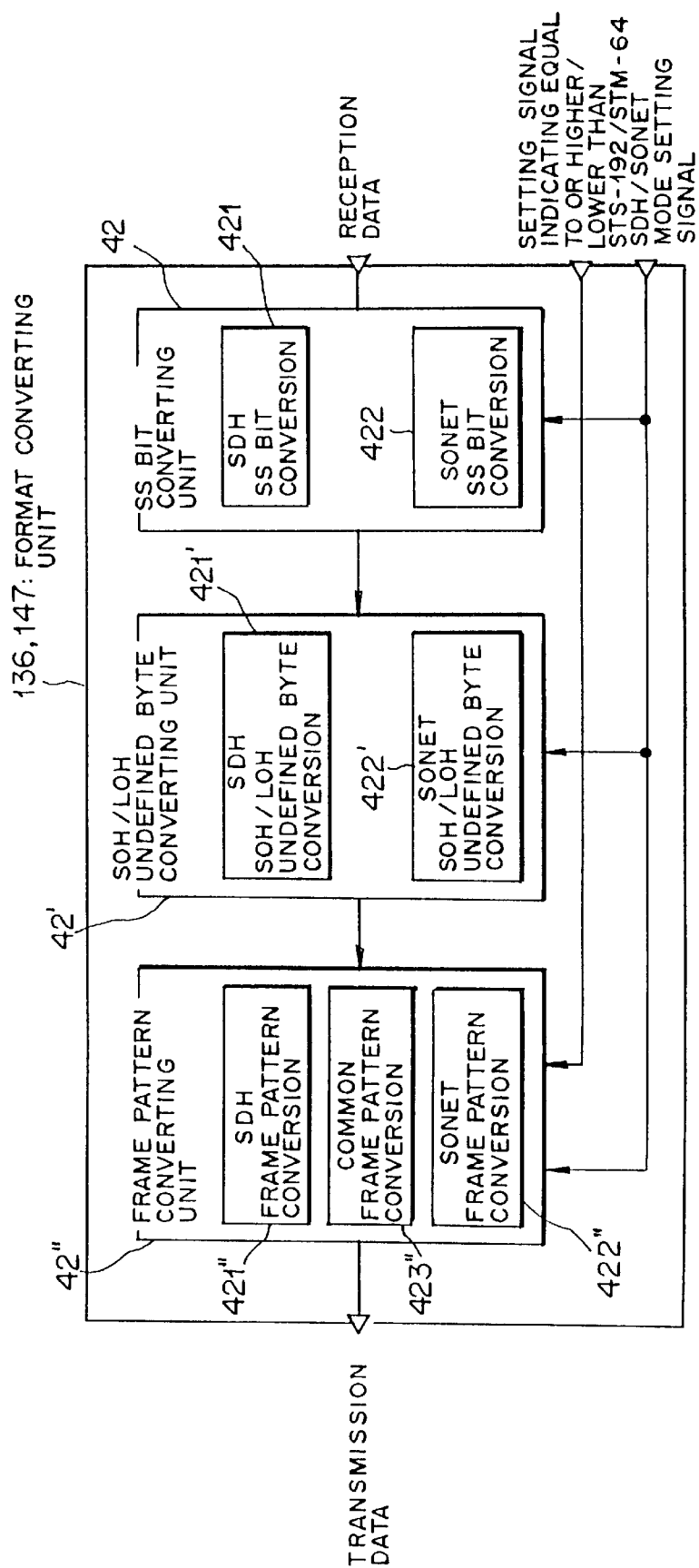
FIG. 29 is a block diagram showing the structure of a format converting unit of the multiplexing apparatus of the present embodiment.

To this end, the format converting unit 136, 147 comprises an SS bit converting unit 42, an SOH/LOH undefined byte converting unit 42', and a frame pattern converting unit 42", as shown in FIG. 29. The SS bit converting unit 42 includes an SDH SS bit converting unit 421 and a SONET SS bit converting unit 422. The SOH/LOH undefined byte converting unit (hereinafter referred to as an "undefined byte converting unit") 42' includes an undefined byte converting unit 421' for SDH and an undefined byte converting unit 422' for SONET. The frame pattern converting unit 42" includes an SDH frame pattern converting unit 421", a SONET frame pattern converting unit 422", and a common frame pattern converting unit 423".

In the SS bit converting unit 42, SS bit information in bytes H1 and H2 included in the LOH of the frame format of reception data (STM-1/STS-3c) is converted into SDH/SONET formats (SDH: "10", SONET: "00") by the SDH SS bit converting unit 421 and the SONET SS bit converting unit 422 in accordance with the SDH/SONET mode setting signal from the SDH/SONET mode setting unit 135 (see FIG. 9–FIG. 11) or the automatic judgment processing unit 144. By this SS bit converting unit 42, the SS bit information in the transmission data can be converted into a format suitable for the apparatus connected to the system on the same side, or a format suitable for the apparatus of the counterpart system.

In the undefined byte converting unit 42', undefined byte information included in the SOH and LOH of the frame format of reception data is converted into SDH/SONET formats (SDH: "1", SONET: "0") by the undefined byte converting units for SDH/SONE 42' and 422' in accordance with the SDH/SONET mode setting signal from the SDH/SONET mode setting unit 135 or the automatic judgment processing unit 144. By this undefined byte converting unit 42', the undefined byte information in the transmission data can be converted into a format suitable for the apparatus connected to the system on the same side, or a format suitable for the apparatus of the counterpart system.

In the format converting unit 42", the frame pattern (bytes A1 and A2) of reception data is converted into SDH/SONET frame patterns by the SDH frame pattern converting unit 421", the SONET frame pattern converting unit 422", and the common frame pattern converting unit 423" in accordance with the SDH/SONET mode setting signal from the SDH/SONET mode setting unit 135 or the automatic judgment processing unit 144 and the setting signal indicating whether the reception data are equal to or higher than STM-64/STS-192 or lower than STM-64/STS-192. When the mode of the reception data is a high speed mode equal to or higher than STM-64/STS-192, format conversion corresponding to the SDH/SONET mode setting signal is performed for the transmission data by the SDH frame pattern converting unit 421" and the SONET frame pattern converting unit 422". When the mode of the reception data is a mode lower than STM-64/STS-192, format conversion corresponding to the SDH/SONET mode setting signal is performed for the transmission data by the common frame pattern converting unit 423".

Next, the SS bit converting unit 42 for performing format conversion of SS bit information and the undefined byte converting unit 42' for performing format conversion of undefined byte information will be described in detail.

Figure 30:
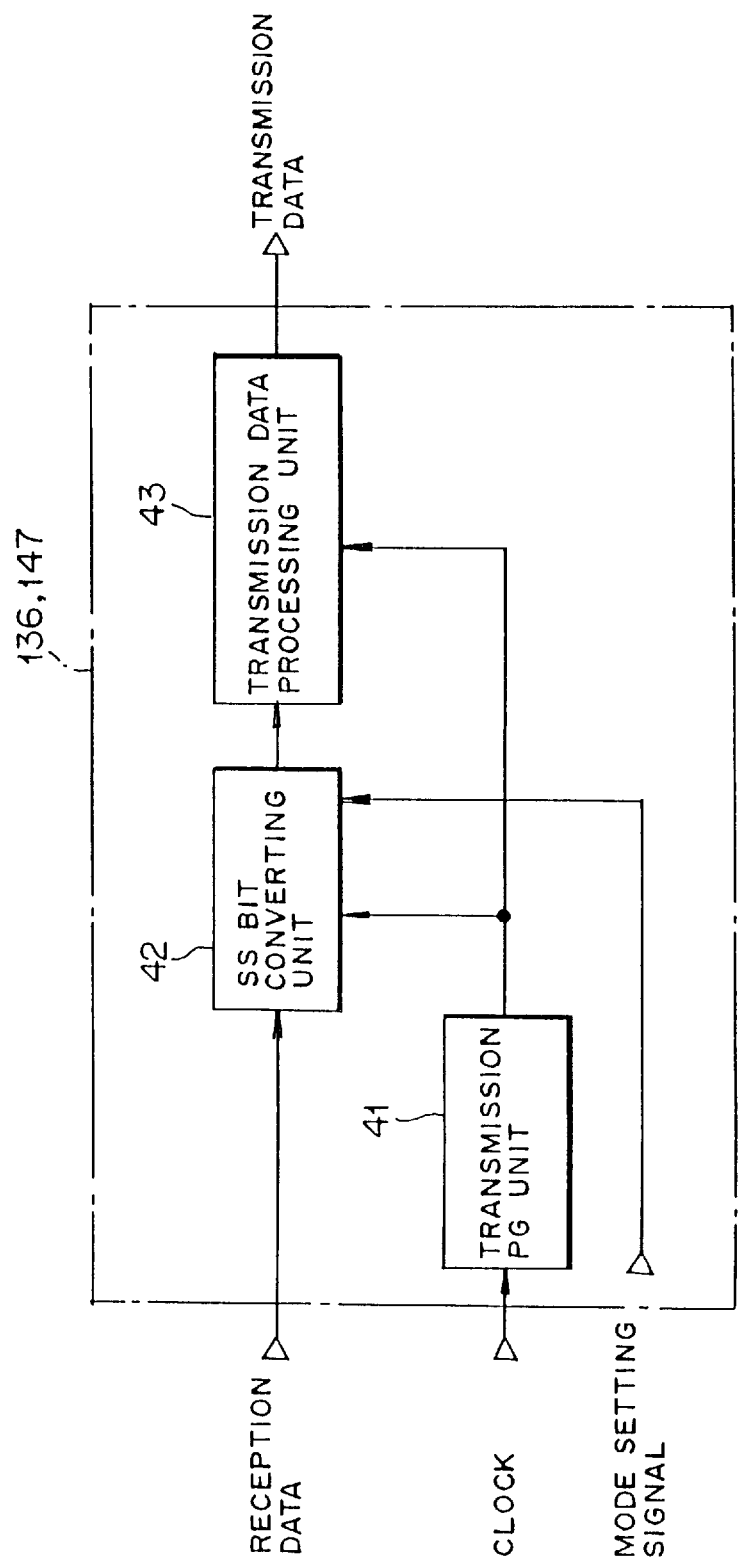
FIG. 30 is a block diagram showing the structure of the format converting unit in the present embodiment which rewrites SS bit information.

When SS bit information is rewritten, the main portions of each of the above-described format converting units 136 and 147 comprises a transmission pulse generating unit (transmission PG unit) 41, an SS bit converting unit 42, and a transmission data processing unit 43, for example, as shown in FIG. 30.

The transmission pulse generating unit 41 generates, in response to input clocks, an SS bit detecting pulse indicating the position of SS bits in bytes H1 and H2 included in the LOH within the frame format of reception data. The SS bit converting unit 42 detects the SS bits by using the SS bit detecting pulses generated by the transmission pulse generating unit 41 and rewrites the detected SS bit in accordance with the transmission data setting signal (the mode setting signal from the SDH/SONET mode setting unit 135 or the result of mode judgment outputted from the automatic judgment processing unit 144).

The transmission data processing unit 43 performs existing data processing for the SS bits, the values of which have been rewritten by the SS bit converting unit 42 and outputs it as transmission data.

Figure 31:
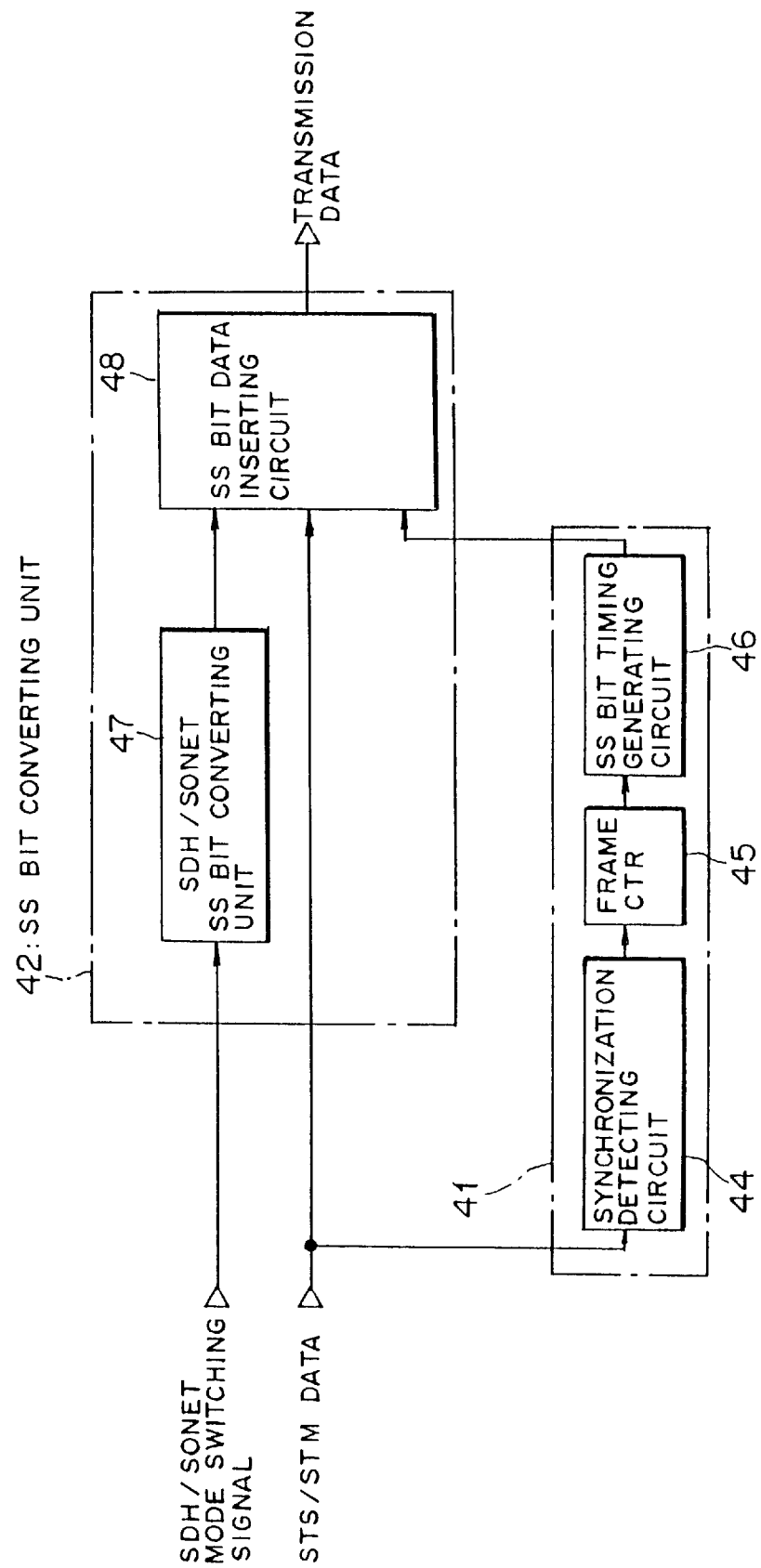
FIG. 31 is a block diagram showing the structure of the format converting unit in the present embodiment which rewrites the SS bit information.

In this case, the transmission pulse generating unit 41 includes a synchronization detecting circuit 44, a frame counter (frame CTR) 45, and an SS bit timing generating circuit 46, for example, as shown in FIG. 31. The SS bit converting unit 42 includes an SDH/SONET SS bit data generating circuit 47, and an SS bit data inserting unit 48.

In the transmission pulse generating unit 41, the synchronization detecting circuit 44 detects the leading position of the frame from reception data (STS/STM). The frame counter 45 generates a frame pulse indicating the frame leading position for each frame leading position detected by the synchronization detecting circuit 44. The SS bit timing generating circuit 46 generates a timing pulse indicating the position of the SS bits and a timing pulse indicating the timing of sending data.

In the SS bit converting unit 42, the SDH/SONET SS bit data generating circuit 47 generates SS bits in accordance with the SDH/SONET mode setting signal (the mode setting signal from the SDH/SONET mode setting unit 135 or the result of mode judgment outputted from the automatic judgment processing unit 144). That is, in the case of SDH mode, SS bits (="10") conforming to the standard of SDH are generated. In the case of SONET mode, SS bits (="00") conforming to the standard of SONET are generated. The SS bit data inserting unit 48 rewrites the SS bits by inserting into the reception data the SS bit data, which are generated by the SDH/SONET SS bit data generating circuit 47, in accordance with the timing pulses from the SS bit timing generating circuit 46.

Figure 32:
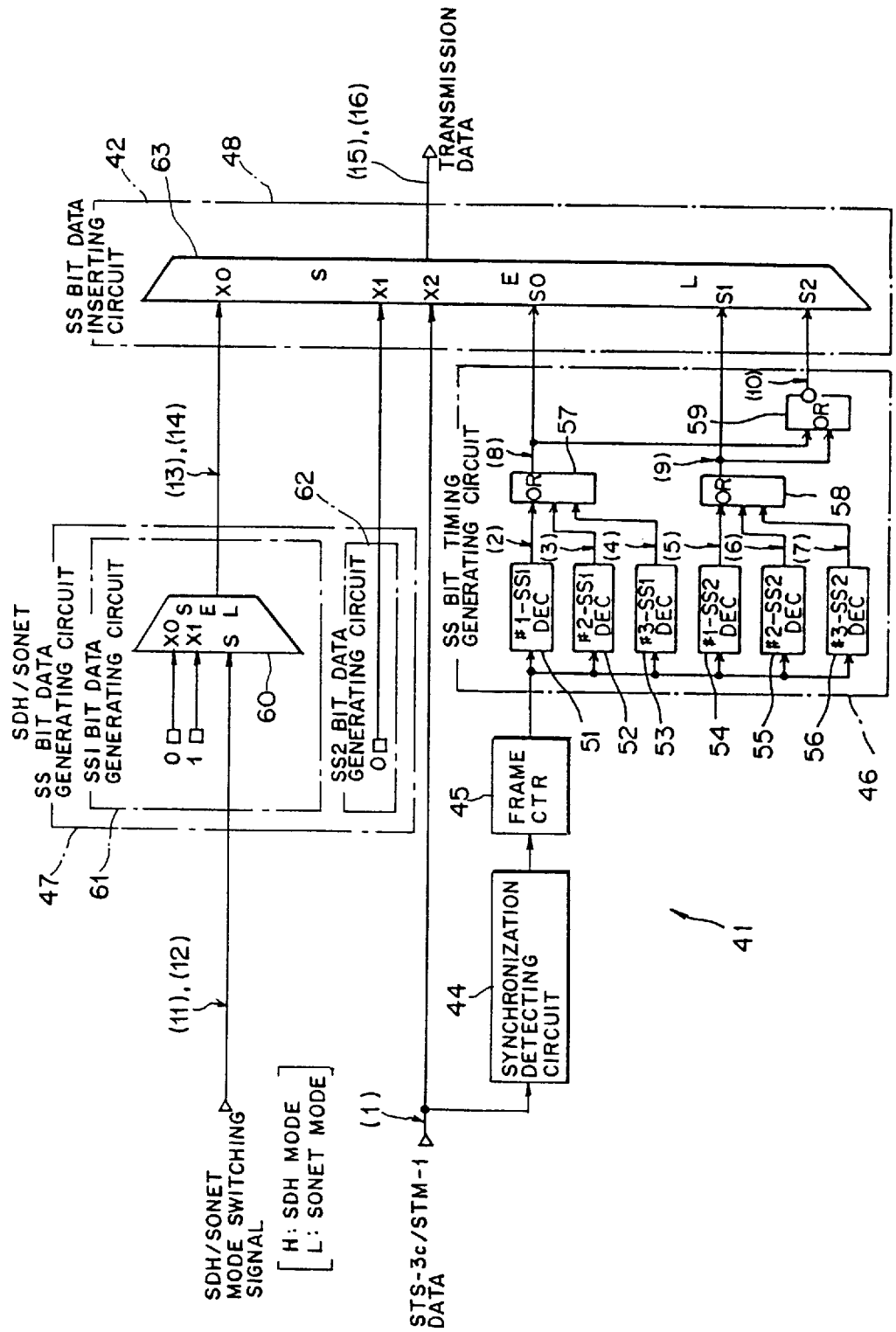
FIG. 32 is a block diagram showing the detailed structure of the format converting unit in the present embodiment which rewrites the SS bit information.

To this end, the SS bit timing generating circuit 46 includes a decoder (DEC) 51–56, OR gates 57 and 58, and a NOR gate 59, for example, as shown in FIG. 32. The SDH/SONET SS bit data generating circuit 47 includes an SS1 bit data generating circuit 61 and an SS2 bit data generating circuit 62. The SS1 bit data generating circuit 61 uses a selector (SEL) 60 for selectively outputting "1" or "0" so as to produce SS bit data for SDH. The SS2 bit data generating circuit 62 constantly produces and outputs "0" so as to produce SS bit data for SONET.

The SS bit data inserting unit 48 accommodates a selector (SEL) 63 which selects the reception data (STS-3c/STM-1), the output of the SS1 bit data generating circuit 61 or the output of the SS2 bit data generating circuit 62, and outputs the selected data, thereby inserting into the reception data the SS bit data produced by the SDH/SONET SS bit data generating circuit 47. This operation is performed in accordance with the timing signals from the SS bit timing generating circuit 46.

Figure 33:
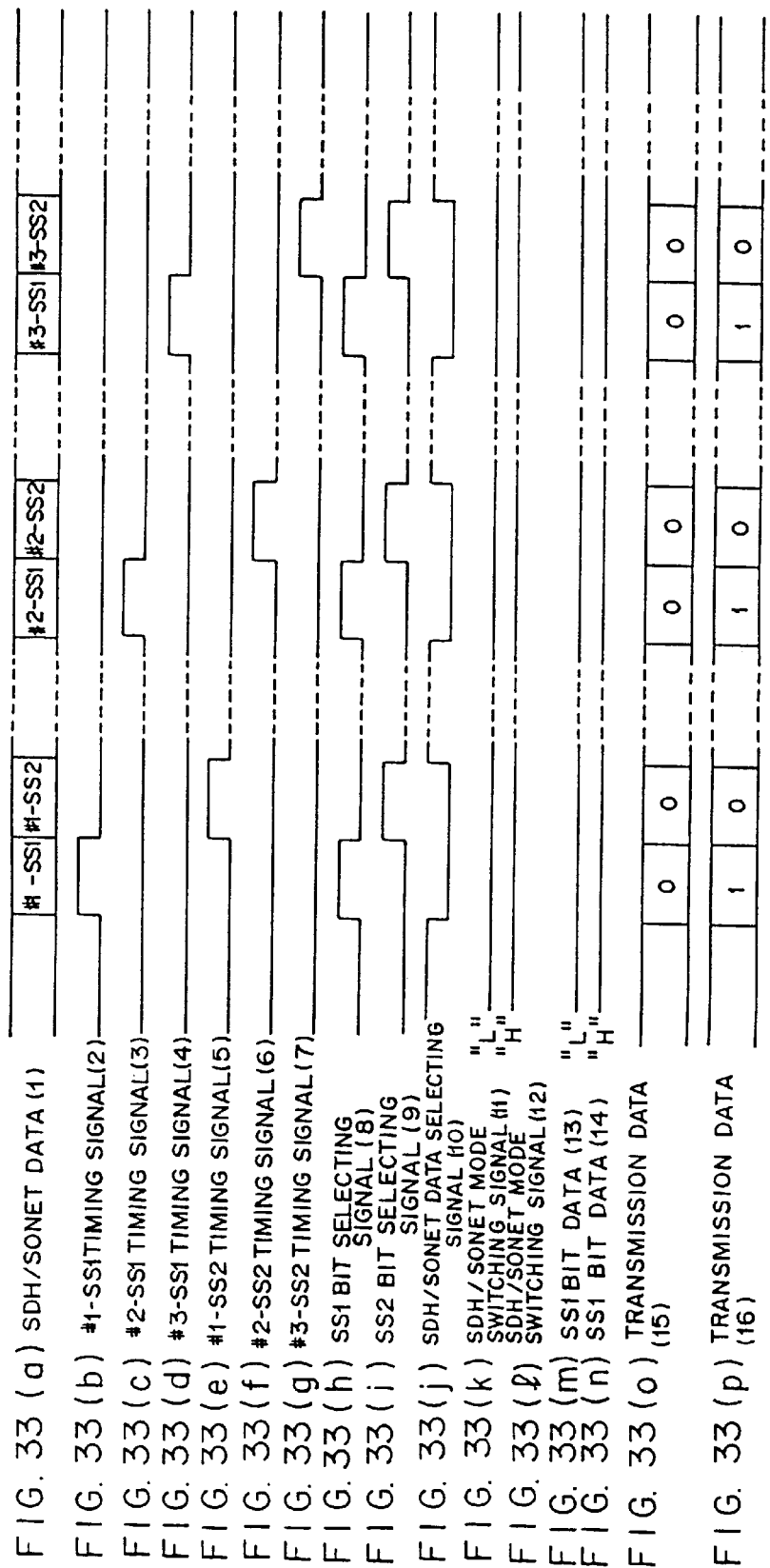
FIG. 33(a)–33(p) are timing charts for explaining the operation for rewriting the SS bit information performed by the format converting unit of the present embodiment.

In the format converting unit 136, 147 having the above-described structure, the leading position of the frame is first detected from the reception data (STS-3c/STM-1: see FIG. 33(*a*)) by the synchronization detecting circuit 44 of the transmission pulse generating unit 41. The detected frame leading position is notified to the frame counter 45.

In the SS bit timing generating circuit 46, SS bit timing signals (2)–(7) shown in FIG. 33(*b*)–FIG. 33(*g*), for example, are generated by the respective decoders 51–56 in accordance with the frame pulse generated by the frame counter 45. Among these timing signals, timing signals (2)–(4) are inputted into the OR gate 57 while timing signals (5)–(7) are inputted into the OR gate 58.

As a result, an SS1 bit select timing signal (8) shown in FIG. 33(*h*) is supplied from the OR gate 57 to the selector 63 of the SS bit data inserting unit 48 while an SS2 bit select timing signal (9) shown in FIG. 33(*i*) and a data selecting signal (10) shown in FIG. 33(*j*) are supplied from the OR gate 58 and the NOR gate 59 to the selector 63.

At this time, in the SDH/SONET SS bit data generating circuit 47, in accordance with the SDH/SONET mode switching signal from the SDH/SONET mode setting unit 135 or the automatic judgment processing unit 144 [mode setting signal: switching signal (11) shown in FIG. 33(*k*) in the case of SDH, switching signal (12) shown in FIG. 29(*l*) in the case of SONET], either SDH SS1 bit data (13) shown in FIG. 33(*m*) or SONET SS1 bit data (14) shown in FIG. 33(*n*) is generated by the SS1 bit data generating circuit 61 and the SS2 bit data generating circuit 62 and is sent out to the SS bit data inserting circuit 48.

In the SS bit data inserting circuit 48, the SS1/SS2 bit data produced by the SS1 bit data generating circuit 61 and the SS2 bit data generating circuit 62 of the SDH/SONET SS bit data generating circuit 47 and the reception data are selectively outputted from the selector 63 in accordance with the SS1 bit selecting signal (8), the SS2 bit selecting signal (9), and data selecting signal (10) supplied from the SS bit timing generating circuit 46, whereby the SS bit data are inserted into the reception data.

As a result, when the SDH/SONET mode setting signal is set to select the SDH mode, the SS bits are rewritten into "10" which conform to the standard of SDH. When the SDH/SONET mode setting signal is set to select the SONET mode, the SS bits are rewritten into "00" which conform to the standard of SONET.

Figure 34:
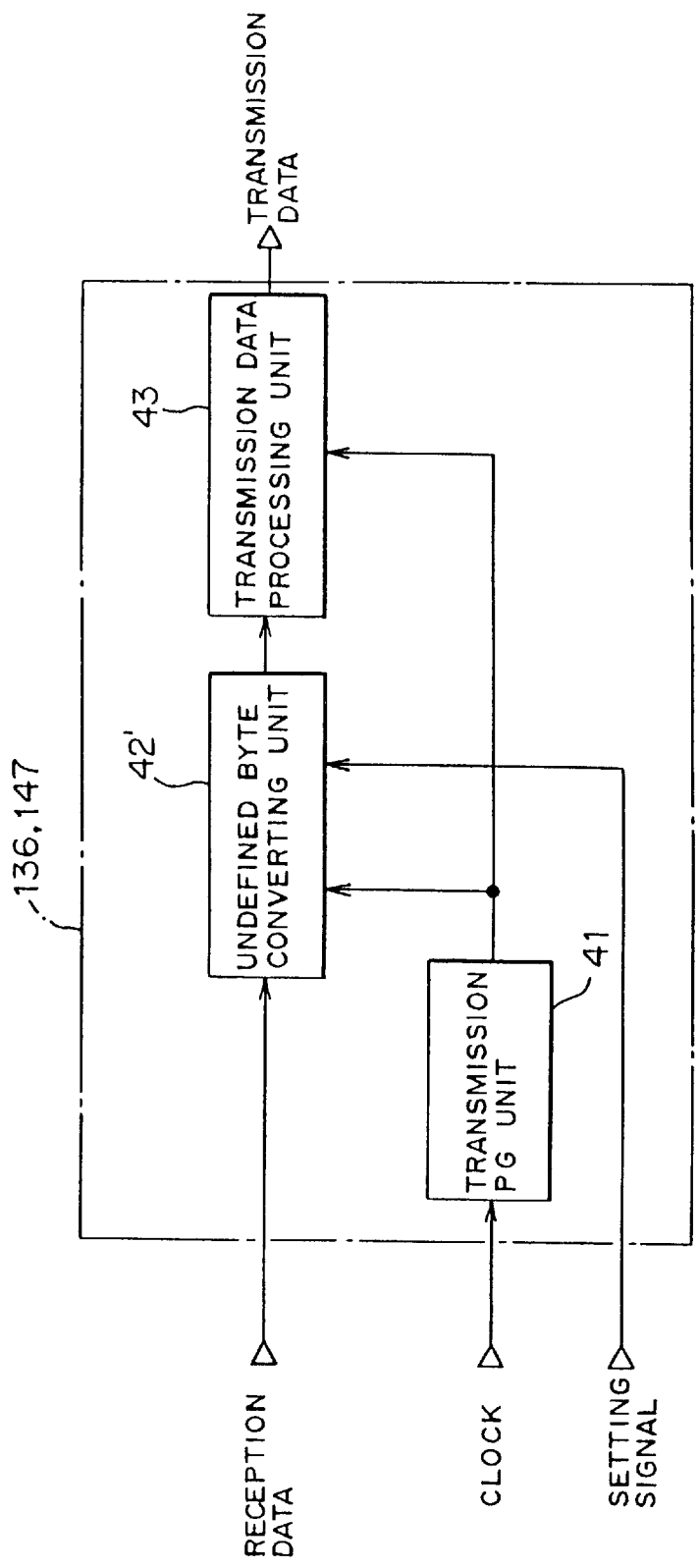
FIG. 34 is a block diagram showing the structure of a format converting unit of the present embodiment which rewrites the information of the undefined byte.

In the case where the unidentified byte information is rewritten, the main portion of the format converting unit 136, 147 includes an unidentified byte converting unit 42', as shown in FIG. 34, instead of the SS bit converting unit 42 shown in FIG. 30. The unidentified byte converting unit 42' rewrites the unidentified byte information included in the SOH and LOH of the reception data (STM-1/STS-3c) in accordance with the SDH/SONET mode setting signal from the SDH/SONET mode setting unit 135 or the automatic judgment processing unit 144.

Therefore, in the format converting unit 136, 147, the undefined bytes are rewritten by the undefined byte converting unit 42' in accordance with the pulse which are generated by the transmission pulse generating unit 41 and which indicate the positions of undefined bytes in the SOH and LOH. That is, when the SDH/SONET mode setting signal is set to select the SDH mode, the undefined bytes are rewritten into "1". When the SDH/SONET mode setting signal is set to select the SONET mode, the undefined bytes are rewritten into "0". The format conversion of the undefined bytes is carried out in this way.

The data undergone format conversion by the undefined byte converting unit 42' are subjected to conventional data processing by the transmission data processing unit 43, and are outputted as transmission data.

As described above, in the format converting unit 136, 147, format conversion processing is performed for the reception data by rewriting SS bit information and/or undefined byte information in accordance with the mode set by the SDH/SONET mode setting unit 135 or the mode determined by the automatic judgment processing unit 144. Accordingly, format conversion processing corresponding to SDH/SONET can be performed securely.

Accordingly, the format of the reception signal can be converted into a format suitable for the apparatus of the system, i.e., a format suitable for SDH or SONET. As a result, a signal which is transmitted from the apparatus of the counterpart different system and which has a different format can be normally received without producing an alarm signal.

(b4) Alarm Processing Unit

Figure 35:
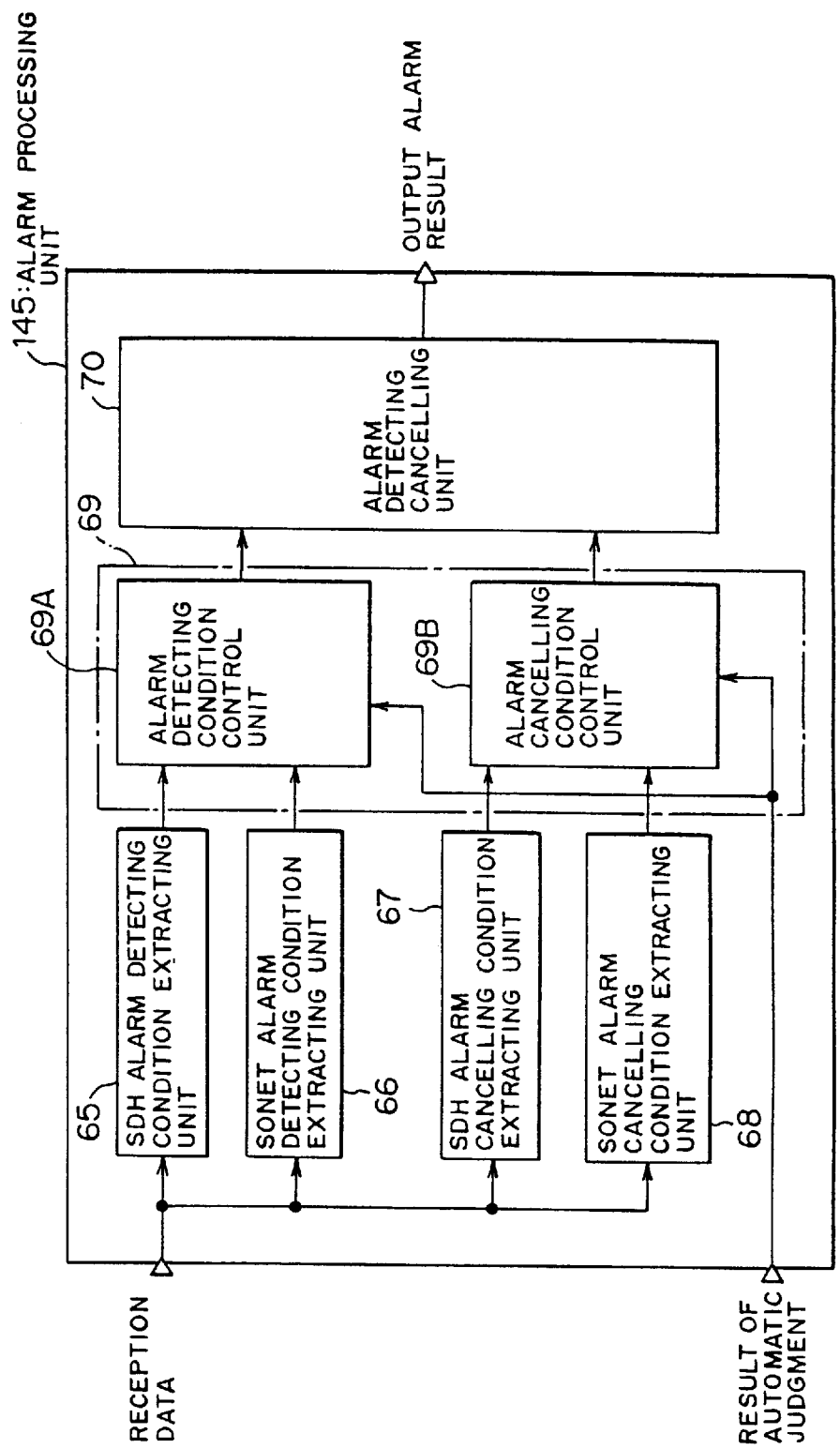
FIG. 35 is a block diagram showing the structure of an alarm processing unit of the multiplexing apparatus of the present embodiment.
Figure 36A:
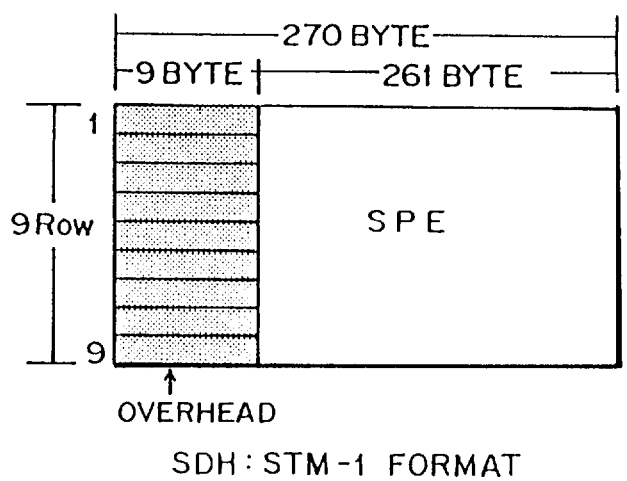
FIG. 36(a) and FIG. 36(b) are diagrams respectively showing examples of the frame formats of STM-1 and STS-3c signals.
Figure 36B:
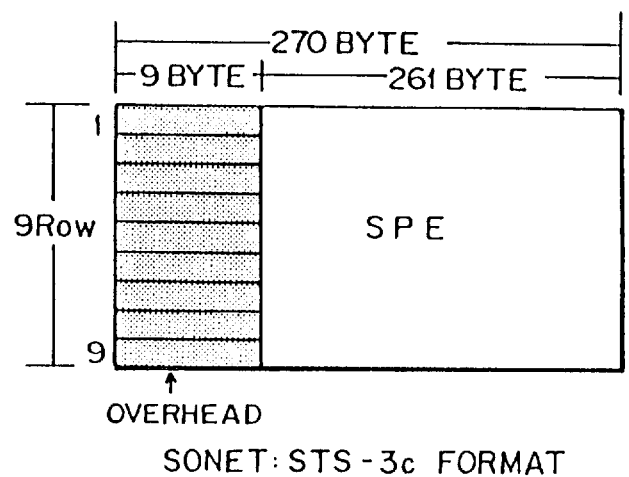
Figure 38:
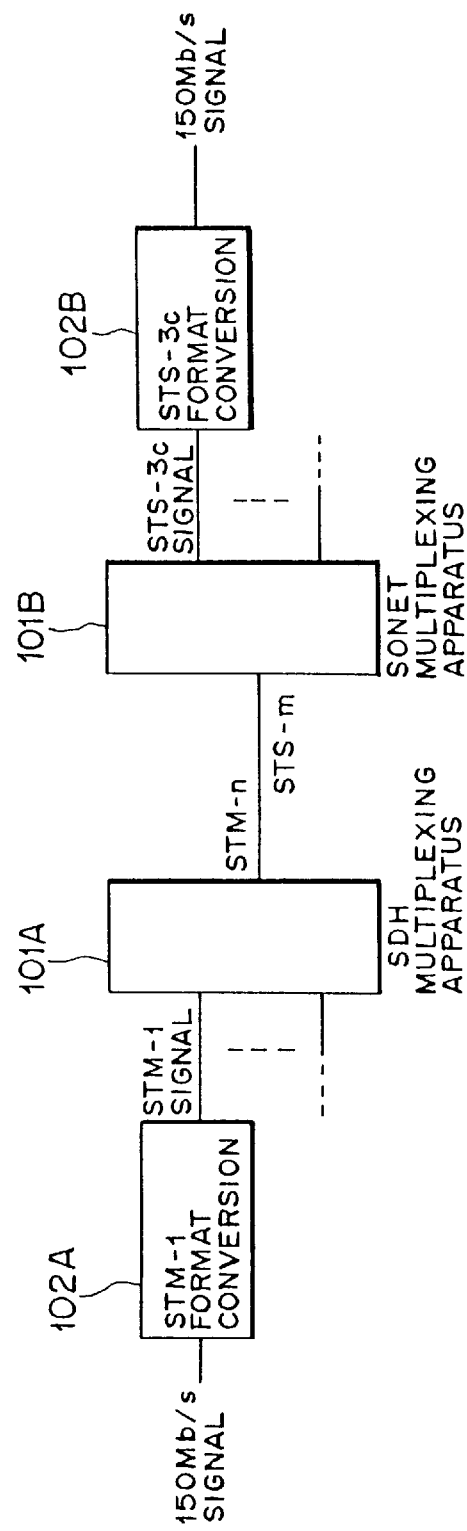
FIG. 38 is a block diagram showing an example of a structure in which an apparatus of the SDH system and an apparatus of the SONET system are connected with each other.
Figure 39:
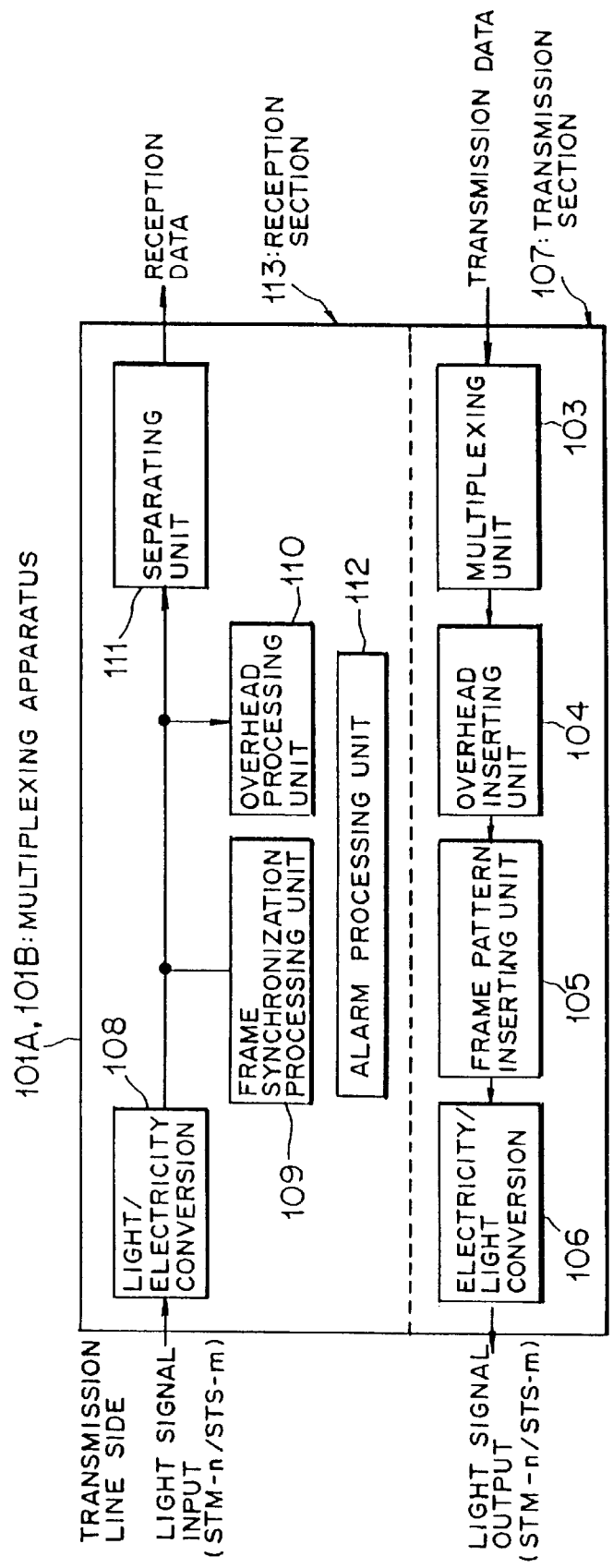
FIG. 39 is a block diagram showing an example of the structure of a multiplexing apparatus which is generally used in SDH/SONET.
Figure 40A:
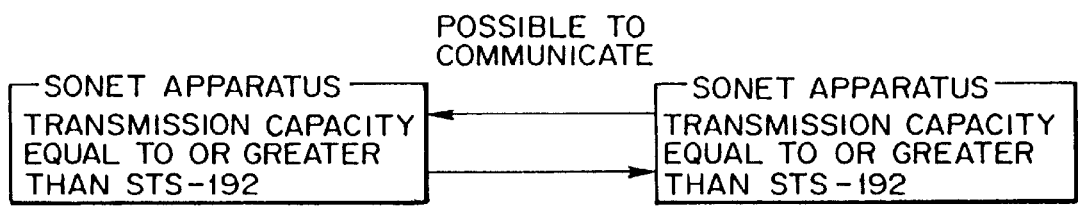
FIG. 40(a)–FIG. 40(c) are diagrams showing examples of communication patterns in which the multiplexing apparatus which is generally used in SDH/SONET can provide interconnection.
Figure 40B:
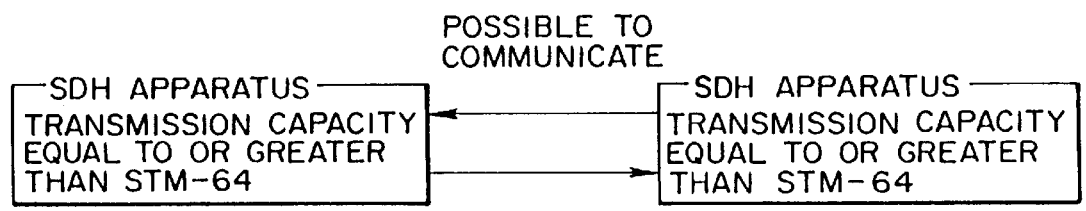
Figure 40C:
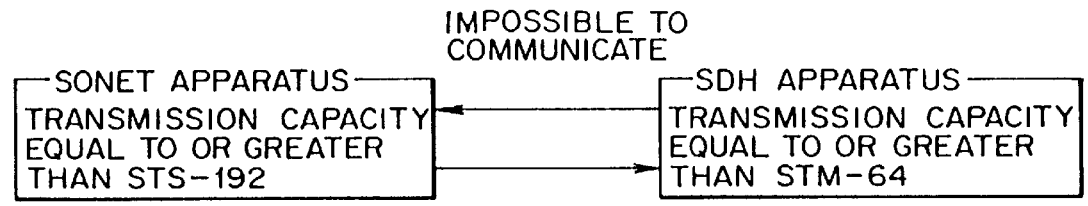

FIG. 35 is a block diagram showing the structure of the alarm processing unit 145 previously described with reference to FIG. 9–FIG. 11. As described above, the alarm processing unit 145 shown in FIG. 35 comprises an SDH alarm detecting condition extracting unit 65, a SONET alarm detecting condition extracting unit 66, an SDH alarm cancelling condition extracting unit 67, a SONET alarm cancelling condition extracting unit 68, an alarm detecting/cancelling condition control unit 69, and an alarm detecting/cancelling unit 70 so as to perform processing for generating an alarm or processing for cancelling the alarm in accordance with the result of the SDH/SONET mode automatic judgment performed by the automatic judgment processing unit 144.

The SDH alarm detecting condition extracting unit 65 extracts an alarm detecting condition for the apparatus of the SDH system from the reception signal (STM-1), and the SONET alarm detecting condition extracting unit 66 extracts an alarm detecting condition for the apparatus of the SONET system from the reception signal (STS-3c). The SDH alarm cancelling condition extracting unit 67 extracts an alarm cancelling condition for the apparatus of the SDH system from the reception signal (STM-1), and the SONET alarm cancelling condition extracting unit 68 extracts an alarm cancelling condition for the apparatus of the SONET system from the reception signal (STS-3c).

The alarm detecting/cancelling condition control unit 69 receives the result of judgment performed within the automatic judgment processing unit 144. When the result of the judgment indicates that the mode is SDH, the alarm detecting/cancelling condition control unit 69 outputs the SDH alarm detecting condition and the SDH alarm cancelling condition extracted by the SDH alarm detecting condition extracting unit 65 and the SDH alarm cancelling condition extracting unit 67. When the result of the judgment indicates that the mode is SONET, the alarm detecting/cancelling condition control unit 69 outputs the SONET alarm detecting condition and the SONET alarm cancelling condition extracted by the SONET alarm detecting condition extracting unit 66 and the SONET alarm cancelling condition extracting unit 68.

To this end, the alarm detecting/cancelling condition control unit 69 includes an alarm detecting condition control unit 69A and an alarm cancelling condition control unit 69B. When the result of the judgment indicates that the mode is SDH, the alarm detecting condition control unit 69A outputs the SDH alarm detecting condition extracted by the SDH alarm detecting condition extracting unit 65 while the alarm cancelling condition control unit 69B outputs the SDH alarm cancelling condition extracted by the SDH alarm cancelling condition extracting unit 67. When the result of the judgment indicates that the mode is SONET, the alarm detecting condition control unit 69A outputs the SONET alarm detecting condition extracted by the SONET alarm detecting condition extracting unit 66 while the alarm cancelling condition control unit 69B outputs the SONET alarm cancelling condition extracted by the SONET alarm cancelling condition extracting unit 68.

The alarm detecting/cancelling unit 70 receives the outputs from the alarm detecting/cancelling condition control unit 69 and outputs an alarm result.

When alarm detection is performed in the alarm processing unit 145 having the above-described structure, the SDH alarm detecting condition and the SONET alarm detecting condition are first extracted from the reception data by the SDH alarm detecting condition extracting unit 65 and the SONET alarm detecting condition extracting unit 66. The result of the extraction is outputted to the alarm detecting condition control unit 69A of the alarm detecting/cancelling condition control unit 69.

The alarm detecting condition control unit 69A outputs the received SDH/SONET alarm detecting conditions to the alarm detecting/cancelling unit 70. The alarm detecting/cancelling unit 70 performs alarm detection in accordance with the alarm detecting conditions and outputs the result of the alarm detection as an alarm result.

The processing for alarm cancellation is performed as follows. First, the SDH alarm cancelling condition and the SONET alarm cancelling condition are first extracted from the reception data by the SDH alarm cancelling condition extracting unit 67 and the SONET alarm cancelling condition extracting unit 68. The result of the extraction is outputted to the alarm cancelling condition control unit 69B of the alarm detecting/cancelling condition control unit 69.

When the result of the SDH/SONET mode automatic judgment performed by the automatic judgment processing unit 144 indicates that the mode is SDH, the alarm cancelling condition control unit 69B sends the SDH alarm cancelling conditions to the alarm detecting/cancelling unit 70. The alarm detecting/cancelling unit 70 performs alarm cancellation in accordance with the alarm cancelling conditions and outputs the result of the alarm cancellation as an alarm result.

When the result of the SDH/SONET mode automatic judgment performed by the automatic judgment processing unit 144 indicates that the mode is SONET, the alarm cancelling condition control unit 69B sends the SONET alarm cancelling conditions to the alarm detecting/cancelling unit 70. The alarm detecting/cancelling unit 70 performs alarm cancellation in accordance with the alarm cancelling conditions and outputs the result of the alarm cancellation as an alarm result.

As described above, in the alarm processing unit 145, the alarm result is outputted from the alarm detecting/cancelling unit 70 in accordance with the result of the SDH/SONET mode automatic judgment performed by the automatic judgment processing unit 144, i.e., the result of judgment as to whether the kind of the apparatus of the counterpart system is SDH or SONET. Accordingly, even when a signal from the apparatus of the different system, which has a different format, is received, processing such as format conversion can be normally continued by securely cancelling the alarm. This makes it possible to interconnect the apparatuses of the different systems so as to operate them.

What is claimed is:

1. An interface apparatus for SDH/SONET interconnection which includes a reception interface section provided at a position where an apparatus of the SDH system and an apparatus of the SONET system face each other and adapted to receive a signal from an apparatus of a different system, said interface apparatus for SDH/SONET interconnection comprising:

a frame synchronization information detecting unit provided in said reception interface section and adapted to detect frame synchronization information from a reception signal;

an overhead information detecting unit provided in said reception interface section and adapted to detect overhead information from the reception signal;

a judging unit for judging the kind of an apparatus of a counterpart system based on the frame synchronization information detected by said frame synchronization information detecting unit and the overhead information detected by said overhead information detecting unit;

an alarm processing unit for generating an alarm or cancelling the alarm based on a result of the judgment performed within said judging unit; and a format conversion processing unit provided in said reception interface section and adapted to cause the reception signal to undergo format conversion processing corresponding to a desired mode.

2. The interface apparatus for SDH/SONET interconnection according to claim 1, wherein in a high speed mode equal to or higher than STM-64/STS-192, said judging unit judges the kind of the apparatus of the counterpart system utilizing difference in the frame synchronization information detected by said frame synchronization information detecting unit.

3. The interface apparatus for SDH/SONET interconnection according to claim 1, wherein said overhead information detecting unit comprises an SS bit detecting unit for detecting SS bit information and an undefined byte detecting unit for detecting undefined byte information, and said judging unit judges the kind of the apparatus of the counterpart system utilizing difference in the SS bit information detected by said SS bit detecting unit of said overhead information detecting unit or difference in the undefined byte information detected by said undefined byte detecting unit of said overhead information detecting unit.

4. The interface apparatus for SDH/SONET interconnection according to claim 1, wherein said overhead information detecting unit comprises an SS bit detecting unit for detecting SS bit information and an undefined byte detecting unit for detecting undefined byte information, and said judging unit judges the kind of the apparatus of the counterpart system utilizing both difference in the SS bit information detected by said SS bit detecting unit of said overhead information detecting unit and difference in the undefined byte information detected by said undefined byte detecting unit of said overhead information detecting unit.

5. The interface apparatus for SDH/SONET interconnection according to claim 1, wherein said overhead information detecting unit comprises an SS bit detecting unit for detecting SS bit information and an undefined byte detecting unit for detecting undefined byte information, and said judging unit puts the order of priority on the frame synchronization information detected by said frame synchronization information detecting unit, the SS bit information detected by said SS bit detecting unit of said overhead information detecting unit, and the undefined byte information detected by said undefined byte detecting unit of said overhead information detecting unit, and judges the kind of the apparatus of the counterpart system utilizing information having a high priority.

6. The interface apparatus for SDH/SONET interconnection according to claim 1, wherein said frame synchronization information detecting unit detects only common information among different frame synchronization information, and said judging unit judges the kind of the apparatus of the counterpart system from the overhead information detected by said overhead information detecting unit.

7. The interface apparatus for SDH/SONET interconnection according to claim 1, wherein said format conversion processing unit performs format conversion processing for the reception signal in accordance with the mode set by a mode setting unit which sets a mode suitable for the apparatus of the counterpart system.

8. The interface apparatus for SDH/SONET interconnection according to claim 1, wherein said format conversion processing unit performs format conversion processing for the reception signal in accordance with the mode judged by said judging unit.

9. The interface apparatus for SDH/SONET interconnection according to claim 1, wherein said format conversion processing unit performs format conversion processing for the reception signal by rewriting SS bit information or undefined byte information.

10. The interface apparatus for SDH/SONET interconnection according to claim 1, wherein said format conversion processing unit performs format conversion processing for the reception signal by rewriting both SS bit information and undefined byte information.

11. The interface apparatus for SDH/SONET interconnection according to claim 1, wherein said alarm processing unit comprises:

an SDH alarm detecting condition extracting unit for extracting an alarm detecting condition for the apparatus of the SDH system from the reception signal;

a SONET alarm detecting condition extracting unit for extracting an alarm detecting condition for the apparatus of the SONET system from the reception signal;

an SDH alarm cancelling condition extracting unit for extracting an alarm cancelling condition for the apparatus of the SDH system from the reception signal;

a SONET alarm cancelling condition extracting unit for extracting an alarm cancelling condition for the apparatus of the SONET system from the reception signal;

an alarm detecting/cancelling condition control unit for outputting the SDH alarm detecting condition and the SDH alarm cancelling condition extracted by said SDH alarm detecting condition extracting unit and said SDH alarm cancelling condition extracting unit when the result of the judgment received from said judging unit indicates that the mode is SDH, and for outputting the SONET alarm detecting condition and the SONET alarm cancelling condition extracted by said SONET alarm detecting condition extracting unit and said SONET alarm cancelling condition extracting unit when the result of the judgment received from said judging unit indicates that the mode is SONET; and an alarm detecting/cancelling unit for receiving the outputs from said alarm detecting/cancelling condition control unit and for outputting an alarm result.

12. An interface apparatus for SDH/SONET interconnection which includes a transmission interface section provided at a position where an apparatus of the SDH system and an apparatus of the SONET system face each other and adapted to transmit a signal toward an apparatus of a different system, and a reception interface section provided at a position where the apparatus of the SDH system and the apparatus of the SONET system face each other and adapted to receive a signal from the apparatus of the different system, said interface apparatus for SDH/SONET interconnection comprising;

a mode setting unit for setting a mode suitable for an apparatus of a counterpart system;

a frame synchronization information inserting unit provided in said transmission interface section and adapted to insert frame synchronization information corresponding to the mode set by said mode setting unit;

an overhead information inserting unit provided in said transmission interface section and adapted to insert overhead information corresponding to the mode set by said mode setting unit;

a frame synchronization information detecting unit provided in said reception interface section and adapted to detect frame synchronization information from a reception signal;

an overhead information detecting unit provided in said reception interface section and adapted to detect overhead information from the reception signal;

a judging unit for judging the kind of an apparatus of a counterpart system based on the frame synchronization information detected by said frame synchronization information detecting unit and the overhead information detected by said overhead information detecting unit;

an alarm processing unit for generating an alarm or cancelling the alarm based on a result of the judgment performed within said judging unit; and a format conversion processing unit provided in said reception interface section and adapted to cause the reception signal to undergo format conversion processing corresponding to a desired mode.

13. The interface apparatus for SDH/SONET interconnection according to claim 12, wherein in a high speed mode equal to or higher than STM-64/STS-192, said judging unit judges the kind of the apparatus of the counterpart system utilizing difference in the frame synchronization information detected by said frame synchronization information detecting unit.

14. The interface apparatus for SDH/SONET interconnection according to claim 12, wherein said overhead information detecting unit comprises an SS bit detecting unit for detecting SS bit information and an undefined byte detecting unit for detecting undefined byte information, and said judging unit judges the kind of the apparatus of the counterpart system utilizing difference in the SS bit information detected by said SS bit detecting unit of said overhead information detecting unit or difference in the undefined byte information detected by said undefined byte detecting unit of said overhead information detecting unit.

15. The interface apparatus for SDH/SONET interconnection according to claim 12, wherein said overhead information detecting unit comprises an SS bit detecting unit for detecting SS bit information and an undefined byte detecting unit for detecting undefined byte information, and said judging unit judges the kind of the apparatus of the counterpart system utilizing both difference in the SS bit information detected by said SS bit detecting unit of said overhead information detecting unit and difference in the undefined byte information detected by said undefined byte detecting unit of said overhead information detecting unit.

16. The interface apparatus for SDH/SONET interconnection according to claim 12, wherein said overhead information detecting unit comprises an SS bit detecting unit for detecting SS bit information and an undefined byte detecting unit for detecting undefined byte information, and said judging unit puts the order of priority on the frame synchronization information detected by said frame synchronization information detecting unit, the SS bit information detected by said SS bit detecting unit of said overhead information detecting unit, and the undefined byte information detected by said undefined byte detecting unit of said overhead information detecting unit, and judges the kind of the apparatus of the counterpart system utilizing information having a high priority.

17. The interface apparatus for SDH/SONET interconnection according to claim 12, wherein said frame synchronization information detecting unit detects only common information among different frame synchronization information, and said judging unit judges the kind of the apparatus of the counterpart system from the overhead information detected by said overhead information detecting unit.

18. The interface apparatus for SDH/SONET interconnection according to claim 12, wherein said format conversion processing unit performs format conversion processing for the reception signal in accordance with the mode set by said mode setting unit.

19. The interface apparatus for SDH/SONET interconnection according to claim 12, wherein said format conversion processing unit performs format conversion processing for the reception signal in accordance with the mode judged by said judging unit.

20. The interface apparatus for SDH/SONET interconnection according to claim 12, wherein said format conversion processing unit performs format conversion processing for the reception signal by rewriting SS bit information or undefined byte information.

21. The interface apparatus for SDH/SONET interconnection according to claim 12, wherein said format conversion processing unit performs format conversion processing for the reception signal by rewriting both SS bit information and undefined byte information.

22. The interface apparatus for SDH/SONET interconnection according to claim 12, wherein said alarm processing unit comprises:

an SDH alarm detecting condition extracting unit for extracting an alarm detecting condition for the apparatus of the SDH system from the reception signal;

a SONET alarm detecting condition extracting unit for extracting an alarm detecting condition for the apparatus of the SONET system from the reception signal;

an SDH alarm cancelling condition extracting unit for extracting an alarm cancelling condition for the apparatus of the SDH system from the reception signal;

a SONET alarm cancelling condition extracting unit for extracting an alarm cancelling condition for the apparatus of the SONET system from the reception signal;

an alarm detecting/cancelling condition control unit for outputting the SDH alarm detecting condition and the SDH alarm cancelling condition extracted by said SDH alarm detecting condition extracting unit and said SDH alarm cancelling condition extracting unit when the result of the judgment received from said judging unit indicates that the mode is SDH, and for outputting the SONET alarm detecting condition and the SONET alarm cancelling condition extracted by said SONET alarm detecting condition extracting unit and said SONET alarm cancelling condition extracting unit when the result of the judgment received from said judging unit indicates that the mode is SONET; and an alarm detecting/cancelling unit for receiving the outputs from said alarm detecting/cancelling condition control unit and for outputting an alarm result.

23. An interface apparatus for SDH/SONET interconnection which includes a transmission interface section provided at a position where an apparatus of the SDH system and an apparatus of the SONET system face each other and adapted to transmit a signal toward an apparatus of a different system, said interface apparatus for SDH/SONET interconnection comprising:

a frame synchronization information detecting unit for detecting frame synchronization information from a reception signal;

an overhead information detecting unit for detecting overhead information from the reception signal;

a judging unit for judging the kind of an apparatus of a counterpart system based on the frame synchronization information detected by said frame synchronization information detecting unit and the overhead information detected by said overhead information detecting unit;

a format conversion processing unit provided in said transmission interface section and adapted to cause the transmission signal to undergo format conversion processing corresponding to the mode judged by said judging unit;

a frame synchronization information inserting unit provided in said transmission interface section and adapted to insert frame synchronization information corresponding to the mode judged by said judging unit; and an overhead information inserting unit provided in said transmission interface section and adapted to insert overhead information corresponding to the mode judged by said judging unit.

24. The interface apparatus for SDH/SONET interconnection according to claim 23, wherein in a high speed mode equal to or higher than STM-64/STS-192, said judging unit judges the kind of the apparatus of the counterpart system utilizing difference in the frame synchronization information detected by said frame synchronization information detecting unit.

25. The interface apparatus for SDH/SONET interconnection according to claim 23, wherein said overhead information detecting unit comprises an SS bit detecting unit for detecting SS bit information and an undefined byte detecting unit for detecting undefined byte information, and said judging unit judges the kind of the apparatus of the counterpart system utilizing difference in the SS bit information detected by said SS bit detecting unit of said overhead information detecting unit or difference in the undefined byte information detected by said undefined byte detecting unit of said overhead information detecting unit.

26. The interface apparatus for SDH/SONET interconnection according to claim 23, wherein said overhead information detecting unit comprises an SS bit detecting unit for detecting SS bit information and an undefined byte detecting unit for detecting undefined byte information, and said judging unit judges the kind of the apparatus of the counterpart system utilizing both difference in the SS bit information detected by said SS bit detecting unit of said overhead information detecting unit and difference in the undefined byte information detected by said undefined byte detecting unit of said overhead information detecting unit.

27. The interface apparatus for SDH/SONET interconnection according to claim 23, wherein said overhead information detecting unit comprises an SS bit detecting unit for detecting SS bit information and an undefined byte detecting unit for detecting undefined byte information, and said judging unit puts the order of priority on the frame synchronization information detected by said frame synchronization information detecting unit, the SS bit information detected by said SS bit detecting unit of said overhead information detecting unit, and the undefined byte information detected by said undefined byte detecting unit of said overhead information detecting unit, and judges the kind of the apparatus of the counterpart system utilizing information having a high priority.

28. The interface apparatus for SDH/SONET interconnection according to claim 23, wherein said frame synchronization information detecting unit detects only common information among different frame synchronization information, and said judging unit judges the kind of the apparatus of the counterpart system from the overhead information detected by said overhead information detecting unit.

29. The interface apparatus for SDH/SONET interconnection according to claim 23, wherein said format conversion processing unit performs format conversion processing for the reception signal by rewriting SS bit information or undefined byte information based on the result of judgment in said judging unit.

30. The interface apparatus for SDH/SONET interconnection according to claim 23, wherein said format conversion processing unit performs format conversion processing for the reception signal by rewriting both SS bit information and undefined byte information based on the result of judgment in said judging unit.

31. The interface apparatus for SDH/SONET interconnection according to claim 23, wherein said alarm processing unit comprises:

an SDH alarm detecting condition extracting unit for extracting an alarm detecting condition for the apparatus of the SDH system from the reception signal;

a SONET alarm detecting condition extracting unit for extracting an alarm detecting condition for the apparatus of the SONET system from the reception signal;

an SDH alarm cancelling condition extracting unit for extracting an alarm cancelling condition for the apparatus of the SDH system from the reception signal;

a SONET alarm cancelling condition extracting unit for extracting an alarm cancelling condition for the apparatus of the SONET system from the reception signal;

an alarm detecting/cancelling condition control unit for outputting the SDH alarm detecting condition and the SDH alarm cancelling condition extracted by said SDH alarm detecting condition extracting unit and said SDH alarm cancelling condition extracting unit when the result of the judgment received from said judging unit indicates that the mode is SDH, and for outputting the SONET alarm detecting condition and the SONET alarm cancelling condition extracted by said SONET alarm detecting condition extracting unit and said SONET alarm cancelling condition extracting unit when the result of the judgment received from said judging unit indicates that the mode is SONET; and an alarm detecting/cancelling unit for receiving the outputs from said alarm detecting/cancelling condition control unit and for outputting an alarm result.

32. An interface apparatus for SDH/SONET interconnection which includes a reception interface section provided at a position where an apparatus of the SDH system and an apparatus of the SONET system face each other and adapted to receive a signal from an apparatus of a different system, said interface apparatus for SDH/SONET interconnection comprising:

a frame synchronization information detecting unit provided in said reception interface section and adapted to detect frame synchronization information from a reception signal;

an overhead information detecting unit provided in said reception interface section and adapted to detect overhead information from the reception signal;

a judging unit for judging the kind of an apparatus of a counterpart system based on the frame synchronization information detected by said frame synchronization information detecting unit and the overhead information detected by said overhead information detecting unit;

an alarm processing unit for generating an alarm or cancelling the alarm based on a result of the judgment performed within said judging unit; and a format conversion processing unit provided in said reception interface section and adapted to cause the reception signal to undergo format conversion processing corresponding to a mode judged by said judging unit.

33. The interface apparatus for SDH/SONET interconnection according to claim 32, wherein in a high speed mode equal to or higher than STM-64/STS-192, said judging unit judges the kind of the apparatus of the counterpart system utilizing difference in the frame synchronization information detected by said frame synchronization information detecting unit.

34. The interface apparatus for SDH/SONET interconnection according to claim 32, wherein said overhead information detecting unit comprises an SS bit detecting unit for detecting SS bit information and an undefined byte detecting unit for detecting undefined byte information, and said judging unit judges the kind of the apparatus of the counterpart system utilizing difference in the SS bit information detected by said SS bit detecting unit of said overhead information detecting unit or difference in the undefined byte information detected by said undefined byte detecting unit of said overhead information detecting unit.

35. The interface apparatus for SDH/SONET interconnection according to claim 32, wherein said overhead information detecting unit comprises an SS bit detecting unit for detecting SS bit information and an undefined byte detecting unit for detecting undefined byte information, and said judging unit judges the kind of the apparatus of the counterpart system utilizing both difference in the SS bit information detected by said SS bit detecting unit of said overhead information detecting unit and difference in the undefined byte information detected by said undefined byte detecting unit of said overhead information detecting unit.

36. The interface apparatus for SDH/SONET interconnection according to claim 32, wherein said overhead information detecting unit comprises an SS bit detecting unit for detecting SS bit information and an undefined byte detecting unit for detecting undefined byte information, and said judging unit puts the order of priority on the frame synchronization information detected by said frame synchronization information detecting unit, the SS bit information detected by said SS bit detecting unit of said overhead information detecting unit, and the undefined byte information detected by said undefined byte detecting unit of said overhead information detecting unit, and judges the kind of the apparatus of the counterpart system utilizing information having a high priority.

37. The interface apparatus for SDH/SONET interconnection according to claim 32, wherein said frame synchronization information detecting unit detects only common information among different frame synchronization information, and said judging unit judges the kind of the apparatus of the counterpart system from the overhead information detected by said overhead information detecting unit.

38. The interface apparatus for SDH/SONET interconnection according to claim 32, wherein said format conversion processing unit performs format conversion processing for the reception signal by rewriting SS bit information or undefined byte information based on the result of judgment in said judging unit.

39. The interface apparatus for SDH/SONET interconnection according to claim 32, wherein said format conversion processing unit performs format conversion processing for the reception signal by rewriting both SS bit information and undefined byte information based on the result of judgment in said judging unit.

40. The interface apparatus for SDH/SONET interconnection according to claim 32, wherein said alarm processing unit comprises:

an SDH alarm detecting condition extracting unit for extracting an alarm detecting condition for the apparatus of the SDH system from the reception signal;

a SONET alarm detecting condition extracting unit for extracting an alarm detecting condition for the apparatus of the SONET system from the reception signal;

an SDH alarm cancelling condition extracting unit for extracting an alarm cancelling condition for the apparatus of the SDH system from the reception signal;

a SONET alarm cancelling condition extracting unit for extracting an alarm cancelling condition for the apparatus of the SONET system from the reception signal;

an alarm detecting/cancelling condition control unit for outputting the SDH alarm detecting condition and the SDH alarm cancelling condition extracted by said SDH alarm detecting condition extracting unit and said SDH alarm cancelling condition extracting unit when the result of the judgment received from said judging unit indicates that the mode is SDH, and for outputting the SONET alarm detecting condition and the SONET alarm cancelling condition extracted by said SONET alarm detecting condition extracting unit and said SONET alarm cancelling condition extracting unit when the result of the judgment received from said judging unit indicates that the mode is SONET; and an alarm detecting/cancelling unit for receiving the outputs from said alarm detecting/cancelling condition control unit and for outputting an alarm result.

41. An interface apparatus for SDH/SONET interconnection which includes a transmission interface section provided at a position where an apparatus of the SDH system and an apparatus of the SONET system face each other and adapted to transmit a signal toward an apparatus of a different system, and a reception interface section provided at a position where the apparatus of the SDH system and the apparatus of the SONET system face each other and adapted to receive a signal from the apparatus of the different system, said interface apparatus for SDH/SONET interconnection comprising:

a frame synchronization information detecting unit provided in said reception interface section and adapted to detect frame synchronization information from a reception signal;

an overhead information detecting unit provided in said reception interface section and adapted to detect overhead information from the reception signal;

a judging unit for judging the kind of an apparatus of a counterpart system based on the frame synchronization information detected by said frame synchronization information detecting unit and the overhead information detected by said overhead information detecting unit;

an alarm processing unit for generating an alarm or cancelling the alarm based on a result of the judgment performed within said judging unit;

a first format conversion processing unit provided in said reception interface section and adapted to cause the reception signal to undergo format conversion processing corresponding to a mode judged by said judging unit;

a second format conversion processing unit provided in said transmission interface section and adapted to cause the transmission signal to undergo format conversion processing corresponding to the mode judged by said judging unit;

a frame synchronization information inserting unit provided in said transmission interface section and adapted to insert frame synchronization information corresponding to the mode judged by said judging unit; and an overhead information inserting unit provided in said transmission interface section and adapted to insert overhead information corresponding to the mode judged by said judging unit.

42. The interface apparatus for SDH/SONET interconnection according to claim 41, wherein in a high speed mode equal to or higher than STM-64/STS-192, said judging unit judges the kind of the apparatus of the counterpart system utilizing difference in the frame synchronization information detected by said frame synchronization information detecting unit.

43. The interface apparatus for SDH/SONET interconnection according to claim 41, wherein said overhead information detecting unit comprises an SS bit detecting unit for detecting SS bit information and an undefined byte detecting unit for detecting undefined byte information, and said judging unit judges the kind of the apparatus of the counterpart system utilizing difference in the SS bit information detected by said SS bit detecting unit of said overhead information detecting unit or difference in the undefined byte information detected by said undefined byte detecting unit of said overhead information detecting unit.

44. The interface apparatus for SDH/SONET interconnection according to claim 41, wherein said overhead information detecting unit comprises an SS bit detecting unit for detecting SS bit information and an undefined byte detecting unit for detecting undefined byte information, and said judging unit judges the kind of the apparatus of the counterpart system utilizing both difference in the SS bit information detected by said SS bit detecting unit of said overhead information detecting unit and difference in the undefined byte information detected by said undefined byte detecting unit of said overhead information detecting unit.

45. The interface apparatus for SDH/SONET interconnection according to claim 41, wherein said overhead information detecting unit comprises an SS bit detecting unit for detecting SS bit information and an undefined byte detecting unit for detecting undefined byte information, and said judging unit puts the order of priority on the frame synchronization information detected by said frame synchronization information detecting unit, the SS bit information detected by said SS bit detecting unit of said overhead information detecting unit, and the undefined byte information detected by said undefined byte detecting unit of said overhead information detecting unit, and judges the kind of the apparatus of the counterpart system utilizing information having a high priority.

46. The interface apparatus for SDH/SONET interconnection according to claim 41, wherein said frame synchronization information detecting unit detects only common information among different frame synchronization information, and said judging unit judges the kind of the apparatus of the counterpart system from the overhead information detected by said overhead information detecting unit.

47. The interface apparatus for SDH/SONET interconnection according to claim 41, wherein said first format conversion processing unit performs format conversion processing for the reception signal by rewriting SS bit information or undefined byte information based on the result of judgment in said judging unit, and said second format conversion processing unit performs format conversion processing for the transmission signal by rewriting SS bit information or undefined byte information based on the result of judgment in said judging unit.

48. The interface apparatus for SDH/SONET interconnection according to claim 41, wherein said first format conversion processing unit performs format conversion processing for the reception signal by rewriting SS bit information and undefined byte information based on the result of judgment in said judging unit, and said second format conversion processing unit performs format conversion processing for the transmission signal by rewriting SS bit information and undefined byte information based on the result of judgment in said judging unit.

49. The interface apparatus for SDH/SONET interconnection according to claim 41, wherein said alarm processing unit comprises:

an SDH alarm detecting condition extracting unit for extracting an alarm detecting condition for the apparatus of the SDH system from the reception signal;

a SONET alarm detecting condition extracting unit for extracting an alarm detecting condition for the apparatus of the SONET system from the reception signal;

an SDH alarm cancelling condition extracting unit for extracting an alarm cancelling condition for the apparatus of the SDH system from the reception signal;

a SONET alarm cancelling condition extracting unit for extracting an alarm cancelling condition for the apparatus of the SONET system from the reception signal;

an alarm detecting/cancelling condition control unit for outputting the SDH alarm detecting condition and the SDH alarm cancelling condition extracted by said SDH alarm detecting condition extracting unit and said SDH alarm cancelling condition extracting unit when the result of the judgment received from said judging unit indicates that the mode is SDH, and for outputting the SONET alarm detecting condition and the SONET alarm cancelling condition extracted by said SONET alarm detecting condition extracting unit and said SONET alarm cancelling condition extracting unit when the result of the judgment received from said judging unit indicates that the mode is SONET; and an alarm detecting/cancelling unit for receiving the outputs from said alarm detecting/cancelling condition control unit and for outputting an alarm result.

* * * * *